(12) United States Patent
Park

(10) Patent No.: US 12,242,132 B2
(45) Date of Patent: Mar. 4, 2025

(54) LENS DRIVING APPARATUS, AND CAMERA MODULE AND OPTICAL DEVICE COMPRISING SAME

(71) Applicant: LG INNOTEK CO., LTD., Seoul (KR)

(72) Inventor: Sang Ok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 980 days.

(21) Appl. No.: 17/290,073

(22) PCT Filed: Nov. 12, 2019

(86) PCT No.: PCT/KR2019/015316
§ 371 (c)(1),
(2) Date: Apr. 29, 2021

(87) PCT Pub. No.: WO2020/111577
PCT Pub. Date: Jun. 4, 2020

(65) Prior Publication Data
US 2021/0396950 A1    Dec. 23, 2021

(30) Foreign Application Priority Data

Nov. 26, 2018 (KR) .................. 10-2018-0147143
Dec. 10, 2018 (KR) .................. 10-2018-0157899

(51) Int. Cl.
*G02B 7/09* (2021.01)
*G02B 7/02* (2021.01)
(Continued)

(52) U.S. Cl.
CPC .............. *G02B 7/09* (2013.01); *G02B 7/023* (2013.01); *G02B 27/64* (2013.01); *G03B 5/06* (2013.01);
(Continued)

(58) Field of Classification Search
CPC . G02B 7/09; G02B 7/023; G02B 7/08; G03B 13/36; G03B 5/00; G03B 30/00;
(Continued)

(56) References Cited

U.S. PATENT DOCUMENTS 11,947,183 B2 *   4/2024   Park ................... G03B 13/36
2012/0147258 A1   6/2012   Park
(Continued)

FOREIGN PATENT DOCUMENTS

CN   106575025 A   4/2017
CN   207114992 U   3/2018
(Continued)

OTHER PUBLICATIONS

Office Action dated Jan. 12, 2024 in Korean Application No. 10-2018-0157899, No translation.
(Continued)

*Primary Examiner* — Collin X Beatty
(74) *Attorney, Agent, or Firm* — Saliwanchik, Lloyd & Eisenschenk

(57) ABSTRACT

The disclosure defined by this invention includes a housing comprising a first to a fourth corner portions, magnets arranged on the first to the fourth corner portions, respectively, a bobbin disposed in the housing, a first coil including a coil, which is disposed on the bobbin and faces the magnets, a position sensor disposed between the first corner portion and the second corner portion of the housing, and a sensing magnet, which is disposed on the bobbin and faces the position sensor, wherein each of the magnets includes a first magnet part including a first N pole and a first S pole, a second magnet part including a second N pole and a second S pole and disposed under the first magnet part, and a partition wall separating the first magnet part and the second magnet part.

18 Claims, 29 Drawing Sheets

(51) Int. Cl.
  *G02B 27/64* (2006.01)
  *G03B 5/06* (2021.01)
  *G03B 13/36* (2021.01)
  *H04N 23/54* (2023.01)
  *H04N 23/68* (2023.01)

(52) U.S. Cl.
  CPC ...... *G03B 13/36* (2013.01); *G03B 2205/0023* (2013.01); *H04N 23/54* (2023.01); *H04N 23/6812* (2023.01); *H04N 23/687* (2023.01)

(58) Field of Classification Search
  CPC . G03B 2205/0069; H04N 23/55; H04N 23/57
  See application file for complete search history.

(56) References Cited

U.S. PATENT DOCUMENTS

| | | |
|---|---|---|
| 2012/0300088 A1 | 11/2012 | Terajima |
| 2014/0009631 A1 | 1/2014 | Topliss |
| 2014/0160311 A1 | 6/2014 | Hwang et al. |
| 2014/0355120 A1 | 12/2014 | Yeo |
| 2016/0154249 A1 | 6/2016 | Yeo |
| 2018/0224631 A1 | 8/2018 | Ichihashi |

FOREIGN PATENT DOCUMENTS

| | | |
|---|---|---|
| CN | 108474923 A | 8/2018 |
| EP | 3 035 109 A1 | 6/2016 |
| EP | 3 070 504 A1 | 9/2016 |
| JP | 2010-281969 A | 12/2010 |
| JP | 2016-509684 A | 3/2016 |
| JP | 2017-510841 A | 4/2017 |
| JP | 2017-207555 A | 11/2017 |
| KR | 10-2016-0020692 A | 2/2016 |
| KR | 10-2017-0024671 A | 3/2017 |
| KR | 10-2017-0033663 A | 3/2017 |
| KR | 10-2018-0000964 A | 1/2018 |
| KR | 10-2018-0010472 A | 1/2018 |
| KR | 10-2018-0036274 A | 4/2018 |
| KR | 10-2018-0039846 A | 4/2018 |
| KR | 10-2018-0067122 A | 6/2018 |
| KR | 10-2018-0094247 A | 8/2018 |
| KR | 10-2018-0110996 A | 10/2018 |
| WO | WO-2010/134706 A2 | 11/2010 |
| WO | 2015/133759 A1 | 9/2015 |

OTHER PUBLICATIONS

International Search Report dated Mar. 2, 2020 in International Application No. PCT/KR2019/015316.

Office Action dated Nov. 15, 2023 in Korean Application No. 10-2018-0147143, No Translation.

Office Action dated Oct. 17, 2023 in Japanese Application No. 2021-529060, No Translation.

Office Action dated Nov. 28, 2022 in Chinese Application No. 201980077317.6.

Supplementary European Search Report dated Nov. 16, 2021 in European Application No. 19891552.2.

* cited by examiner

LENS DRIVING APPARATUS, AND CAMERA MODULE AND OPTICAL DEVICE COMPRISING SAME

CROSS-REFERENCE TO RELATED APPLICATIONS

This application is the U.S. national stage application of International Patent Application No. PCT/KR2019/015316, filed Nov. 12, 2019, which claims the benefit under 35 U.S.C. § 119 of Korean Application Nos. 10-2018-0147143, filed Nov. 26, 2018; and 10-2018-0157899, filed Dec. 10, 2018, the disclosures of each of which are incorporated herein by reference in their entirety.

TECHNICAL FIELD

Embodiments relate to a lens moving apparatus and a camera module and an optical device each comprising the same.

BACKGROUND ART

It is difficult to apply technology of a voice coil motor (VCM) used in existing general camera modules to a sub-miniature, low-power camera module, and therefore research related thereto has been actively conducted.

Demand for and production of electronic products, such as smartphones and mobile phones equipped with cameras have increased. Cameras for mobile phones are trending toward increased resolution and miniaturization. As a result, an actuator has also been miniaturized, increased in diameter, and been made multifunctional. In order to realize a high-resolution camera for mobile phones, improvement in performance of the camera for mobile phones and additional functions thereof, such as autofocusing, handshake correction, and zooming, are required.

DISCLOSURE

Technical Problem

The embodiments provide a lens moving apparatus and a camera module and an optical device each comprising the same, which are capable of reducing the amount of power consumed by the coil during AF operation, reducing magnetic field interference between the sensing magnet and the AF operation magnet, and compensating for tilting of the OIS operation unit caused by drooping of the OIS operation unit.

Technical Solution

A lens moving apparatus according to an embodiment comprises a housing comprising first to fourth corner portions, a magnet disposed on the first to fourth corner portions of the housing, a bobbin disposed in the housing, a first coil disposed on the bobbin and comprising a coil, which faces the magnet, a position sensor disposed between the first corner portion and the second corner portion, and a sensing magnet disposed on the bobbin and facing the position sensor, wherein the magnet comprises a first magnet part comprising a first N pole and a first S pole, a second magnet part comprising a second N pole and a second S pole and disposed under the first magnet part, and a first partition wall separating the first magnet part from the second magnet part.

The sensing magnet may comprise a third magnet part comprising a third N pole and a third S pole, a fourth magnet part comprising a fourth N pole and a fourth S pole and disposed under the third magnet part, and a second partition wall separating the third magnet part from the fourth magnet part.

The magnet may comprise four magnets disposed on the first to fourth corner portions of the housing, the first coil may comprise four coil units, which respectively face the four magnets, and the four coil units may be connected to each other in series.

The lower surface of the position sensor may be lower than the upper surface of the coil, and the lower surface of the sensing magnet may be higher than the lower surface of the position sensor.

The upper surface of the sensing magnet may be lower than the upper surface of the position sensor.

The first magnet part and the second magnet part may be spaced apart from each other in an optical-axis direction, and the third magnet part and the fourth magnet part may be spaced apart from each other in the optical-axis direction.

The coil may be a coil block, which is wound by itself about a reference line, or may have a ring shape, the reference line being perpendicular to the optical axis and being parallel to a direction toward an outer surface of the bobbin, at which the coil is disposed, from the optical axis.

The four coil units may be disposed on first outer surfaces of the bobbin, which face the first to fourth corner portions, the sensing magnet may be disposed on a second outer surface of the bobbin, and the second outer surface of the bobbin may be positioned between two adjacent ones of the first outer surfaces of the bobbin.

The sensing magnet may not overlap the four coil units in the optical-axis direction, and may not overlap the four coil units in a direction parallel to a line that is perpendicular to the optical axis and extends through the optical axis.

The sensing magnet and the four coil units may overlap each other on a plane perpendicular to the optical axis.

The lens moving apparatus may further comprise a first circuit board comprising terminals that are disposed between the first corner portion and the second corner portion of the housing and are conductively connected to the position sensor, an upper elastic member coupled both to an upper portion of the housing and to an upper portion of the bobbin, a lower elastic member coupled both to a lower portion of the housing and to a lower portion of the bobbin, a support member connected to the upper elastic member, a second coil facing the magnet in the optical-axis direction, and a second circuit board conductively connected to the support member.

The coil may face the first N pole of the first magnet part, the first partition wall and the second S pole of the second magnet part.

Advantageous Effects

Embodiments are able to reduce the amount of power consumed by the coil during AF operation, inhibit malfunction of AF operation due to magnetic field interference between the sensing magnet and the AF operation magnet, and compensate for tilting of the OIS operation unit caused by drooping of the OIS operation unit.

BEST MODE

Figure 1:
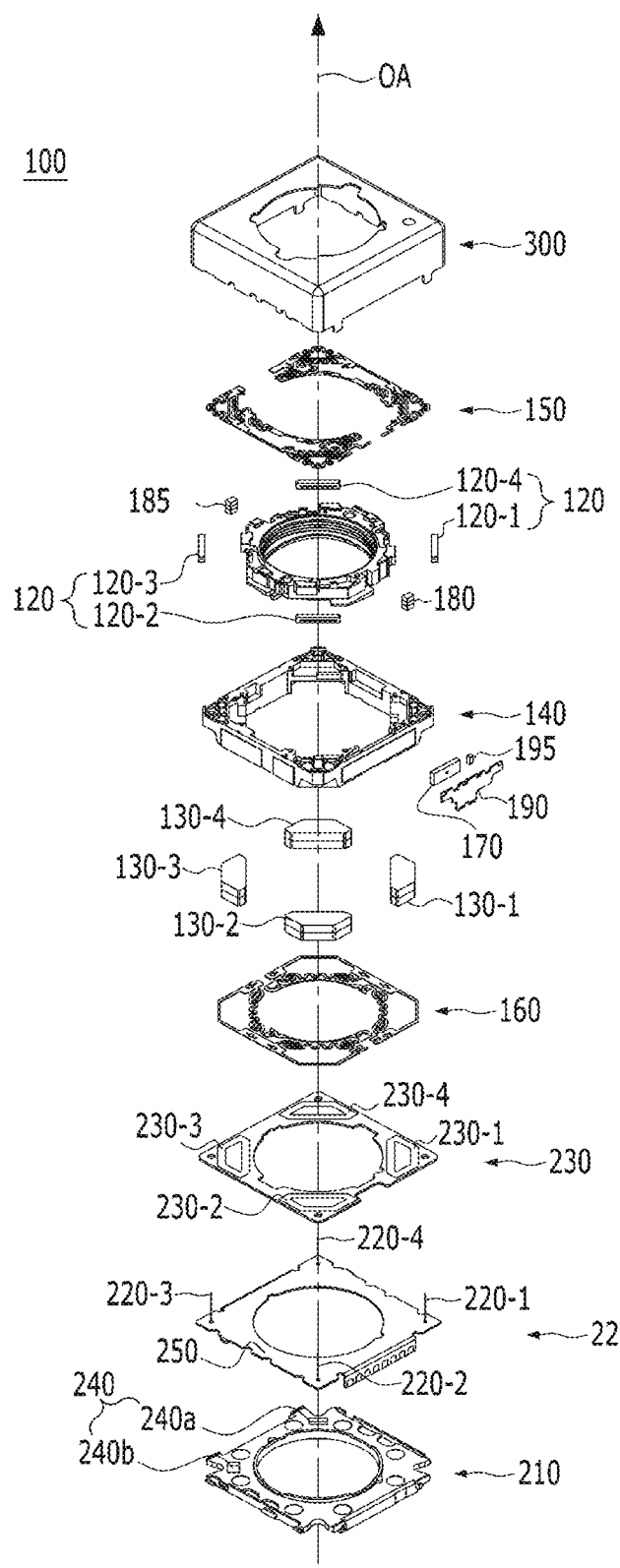
FIG. 1 is an exploded perspective view of a lens moving apparatus according to an embodiment.

Hereinafter, embodiments of the present invention will be described in detail with reference to the accompanying drawings.

The technical idea of the present invention may be embodied in many different forms, and should not be construed as being limited to the following embodiments set forth herein. One or more of components of the embodiments may be selectively combined with each other or replaced without departing from the technical spirit and scope of the present invention.

Unless otherwise particularly defined, terms (comprising technical and scientific terms) used in the embodiments of the present invention have the same meanings as those commonly understood by one of ordinary skill in the art to which this invention belongs. It will be further understood that commonly used terms, such as those defined in dictionaries, should be interpreted as having meanings consistent with their meanings in the context of the relevant art.

The terminology used in the embodiments of the present invention is for the purpose of describing particular embodiments only, and is not intended to limit the present invention. As used in the disclosure and the appended claims, the singular forms are intended to include the plural forms as well, unless the context clearly indicates otherwise. The phrase "at least one (or one or more) of A, B and C" may be interpreted as comprising one or more of all combinations of A, B and C.

Furthermore, when describing the components of the present invention, terms such as "first", "second", "A", "B", "(a)" or "(b)" may be used. Since these terms are provided merely for the purpose of distinguishing the components from each other, they do not limit the nature, sequence or order of the components.

It should be understood that, when an element is referred to as being "linked", "coupled" or "connected" to another element, the element may be directly "linked", "coupled" or "connected" to the another element, or may be "linked", "coupled" or "connected" to the another element via a further element interposed therebetween. Furthermore, it will be understood that, when an element is referred to as being formed "on" or "under" another element, it can be directly "on" or "under" the other element, or can be indirectly disposed with regard thereto, with one or more intervening elements therebetween. In addition, it will also be understood that "on" or "under" the element may mean an upward direction or a downward direction based on the element.

Hereinafter, lens moving apparatuses and a camera modules and camera modules and optical devices comprising the same according to the embodiments will be described with reference to the accompanying drawings. For the convenience of description, although the lens moving apparatus is described using a rectangular coordinate system (x, y, z), the lens moving apparatus may be described using some other coordinate systems, and the embodiments are not limited thereto. In the respective drawings, the X-axis direction and the Y-axis direction mean directions perpendicular to an optical axis, i.e. the Z-axis. The Z-axis direction, which is the optical-axis direction, may be referred to as a "first direction", the X-axis direction may be referred to as a "second direction", and the Y-axis direction may be referred to as a "third direction".

The lens moving apparatus according to an embodiment of the present invention is capable of performing an "auto-focusing function". Here, the "auto-focusing function" serves to automatically focus an image of a subject on an image sensor surface.

In addition, the lens moving apparatus according to the embodiment may perform a function of "handshake correction". Here, the function of "handshake correction" may serve to inhibit the contour line of a captured image from being blurred due to vibration caused by shaking of the user's hand when capturing a still image.

Hereinafter, the term "lens moving apparatus" may be interchangeably used with "lens moving unit", "VCM (voice coil motor)", "actuator" or the like, and the term "coil" may be interchangeably used with "coil unit". Furthermore, the term "elastic member" may be interchangeably used with "elastic unit" or "spring", and the term "support member" may be interchangeably used with "wire" or "spring". The term "terminal" may be interchangeably used with "pad", "electrode", "conductive layer", "bonding portion, or the like, and the term "magnet" may be interchangeably used with "magnet unit".

Figure 2:
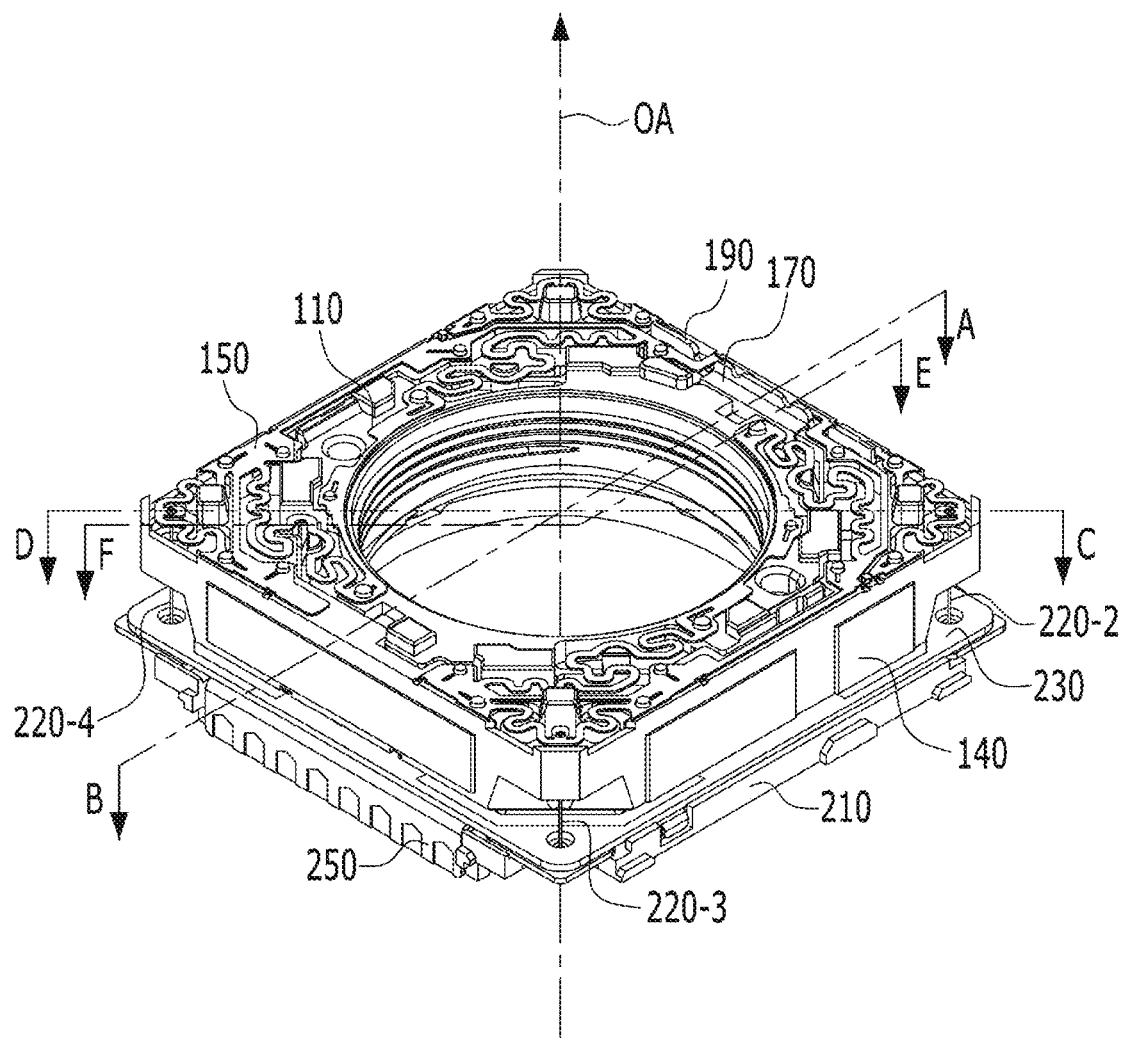
FIG. 2 is an assembled perspective view of the lens moving apparatus shown in FIG. 1, from which a cover member is removed.

FIG. 1 is an exploded perspective of the lens moving apparatus 100 according to an embodiment of the present invention. FIG. 2 is an assembled perspective view of the lens moving apparatus 100, from which a cover member 300 in FIG. 1 is removed.

Referring to FIGS. 1 and 2, the lens moving apparatus 100 includes a bobbin 110, a first coil 120, a first magnet 130, a housing 140, an upper elastic member 150, a lower elastic member 160, a first position sensor 170 and a second magnet 180.

The lens moving apparatus 100 may include a circuit board 190 on which the first position sensor 170 is disposed or mounted.

In order to perform feedback for handshake correction, the lens moving apparatus 100 may include a support member 220, a second coil 230 and a second position sensor 240.

The lens moving apparatus 100 may further include a third magnet 185, a base 210, a circuit board 250 and a cover member 300.

The lens moving apparatus 100 may further include a capacitor 195 mounted on the circuit board 190.

First, the bobbin 110 will be described.

The bobbin 110 may be disposed in the housing 140 so as to be movable in the optical-axis direction OA or the first direction (for example, the Z-axis direction) by the electromagnetic interaction between the first coil 120 and the magnet 130.

Figure 3A:
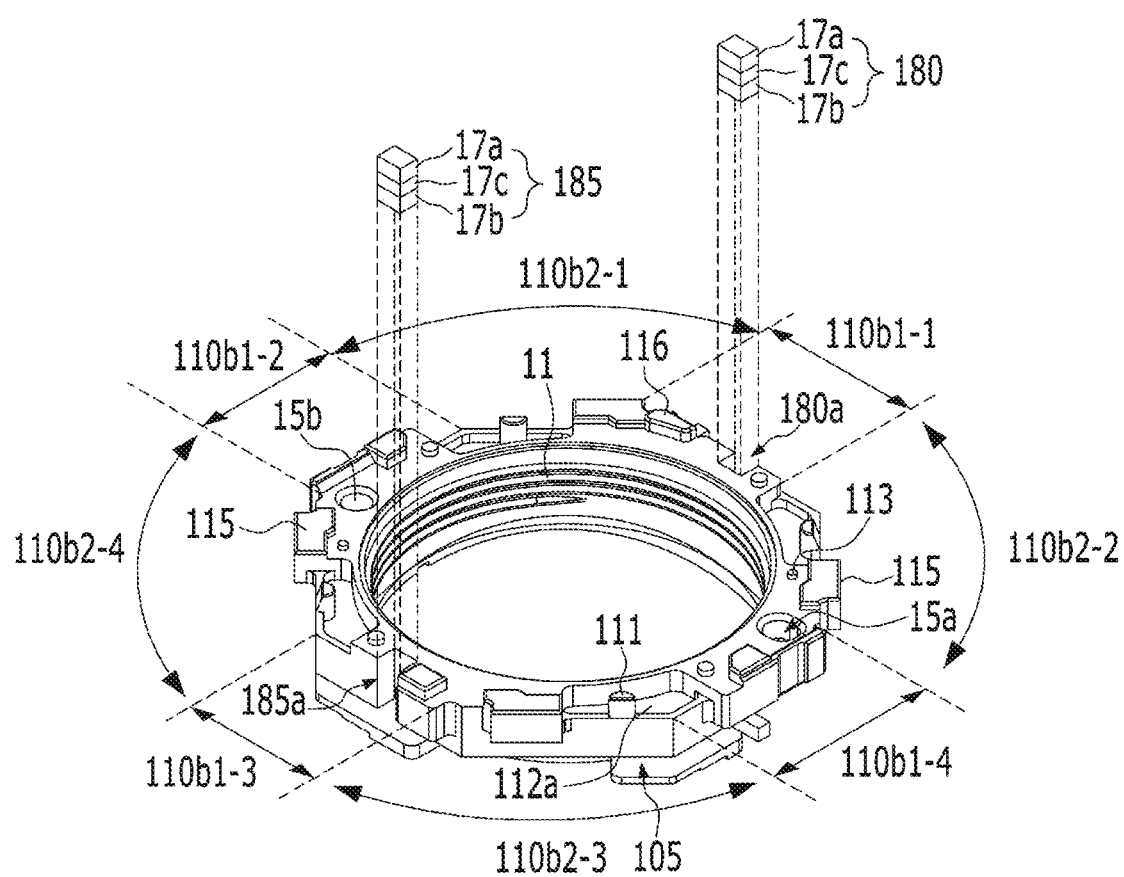
FIG. 3A is a perspective view of the bobbin, the second magnet and the third magnet shown in FIG. 1.
Figure 3B:
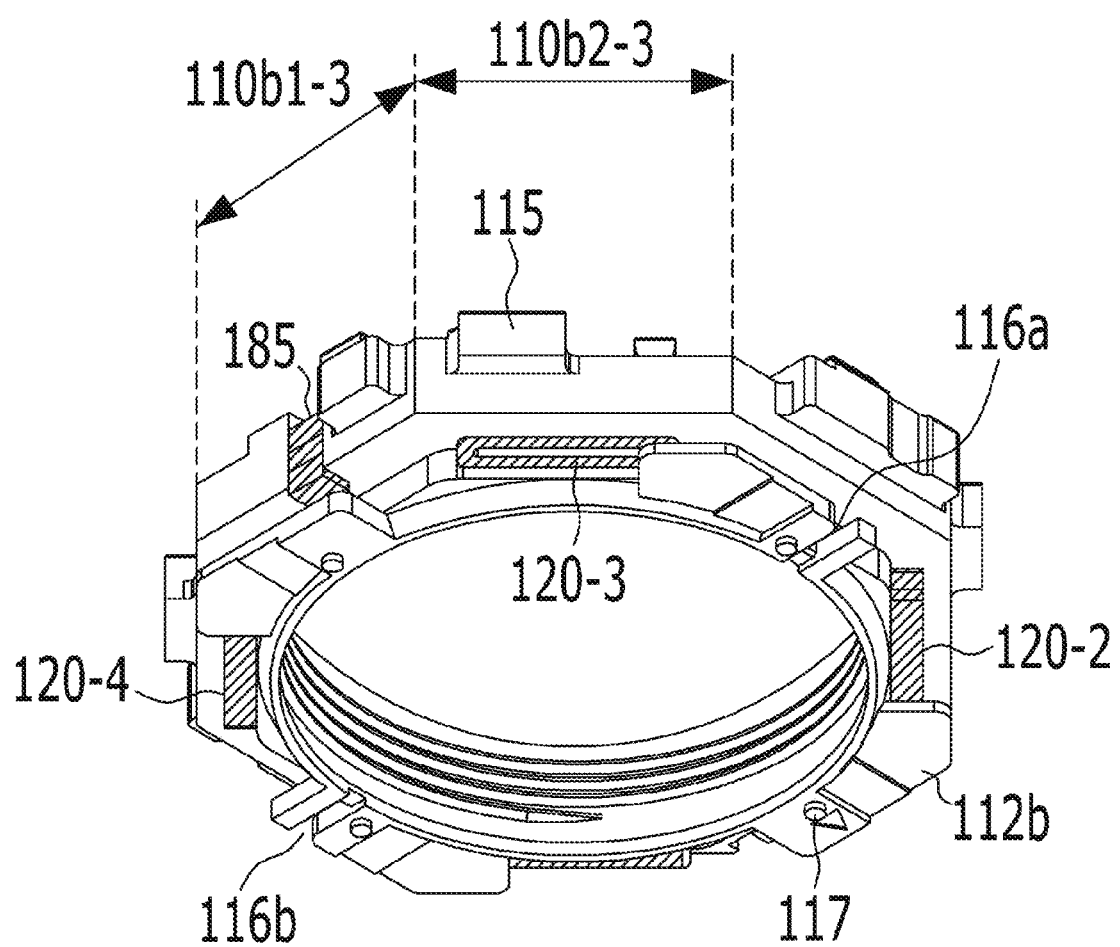
FIG. 3B is a view illustrating the first coil coupled to the bobbin.

FIG. 3A is a perspective view of the bobbin 110, the second magnet 180 and the third magnet 185, which are shown in FIG. 1. FIG. 3B illustrates the first coil 120 coupled to the bobbin 110.

Referring to FIGS. 3A to 3C, the bobbin 110 may have a bore in which a lens or a lens barrel is mounted. For example, the bore in the bobbin 110 may be a through hole formed through the bobbin 110 in the optical-axis direction, and may have a circular shape, an elliptical shape or a polygonal shape without being limited thereto.

Although the bore in the bobbin 110 may be directly provided therein with a lens, the disclosure is not limited thereto. In another embodiment, a lens barrel, to which at least one lens is mounted or coupled, may be coupled or mounted in the bore in the bobbin 110. The lens or the lens barrel may be coupled to the inner circumferential surface (or the inner surface) of the bobbin 110.

The bobbin 110 may include first side portions 110b1-1 to 110b1-4, which are spaced apart from each other, and second side portions 110b2-1 to 110b2-4. Each of the second side portions 110b2-1 to 110b2-4 may connect two adjacent first side portions to each other. For example, the first and second side portions of the bobbin 110 may be alternately disposed or positioned.

Hereinafter, the term "side portion" of the bobbin 110 may be interchangeably used with "outer surface" or "side surface" of the bobbin 110.

For example, although the horizontal or crosswise length of each of the first side portions 110b1-1 to 110b1-4 of the bobbin 110 may be different from the horizontal or crosswise length of each of the second side portions 110b2-1 to 110b2-4 of the bobbin 110.

The bobbin 110 may include a projection 115a provided on the outer surface thereof.

For example, although the projection 115 of the bobbin 110 may be disposed on the outer surface of the second side portions 110b2-1 to 110b2-4 of the bobbin 110, the disclosure is not limited thereto.

The projection 115 of the bobbin 110 may project in a direction that extends through the center of the bore in the bobbin and is parallel to a line perpendicular to the optical axis, but the disclosure is not limited thereto.

The projection 115 of the bobbin 110 may correspond to or face a groove 25a in the housing 140, and may be disposed in the groove 25a in the housing 140 so as to minimize or inhibit rotation of the bobbin 110 about the optical axis beyond a predetermined range.

Furthermore, the projection 115 of the bobbin 110 may serve as a stopper for minimizing or inhibiting direct collision of the lower surface of the bobbin 110 with the base 210, the second coil 230 or the circuit board 250 even when the bobbin 110 is moved beyond a predetermined range in the optical-axis direction (for example, in a direction toward the lower elastic member 160 from the upper elastic member 150) due to external impact or the like.

The bobbin 110 may have formed in the upper surface thereof a first escape groove 112a for avoiding spatial interference with a first frame connector 153 of the upper elastic member 150. Although the first escape groove 112a may be formed, for example, in the second side portions 110b2-1 to 110-b2-4 of the bobbin 110, the disclosure is not limited thereto.

The upper surface of the bobbin 110 may be provided with a guide portion 111 for guiding the mounting position of the upper elastic member 150. As illustrated in FIG. 3A, for example, the guide portion 111 of the bobbin 110 may be disposed in the first escape groove 112a in order to guide the path along which the first frame connector 153 of the upper elastic member 150 extends. For example, the guide portion 111 may project from the bottom surface of the first escape groove 112a in the optical-axis direction.

The bobbin 110 may include a stopper 116 projecting from the upper surface of the bobbin 110.

The stopper 116 of the bobbin 110 may serve to inhibit the upper surface of the bobbin 110 from directly colliding with the inner side of the upper plate of the cover member 300 even when the bobbin 110 is moved beyond a specified range due to an external impact or the like while the bobbin 110 is being moved in the first direction to perform an auto-focusing function.

The bobbin 110 may include first couplers 113, which are intended to be coupled and secured to the upper elastic member 150. Although each of the first couplers 113 of the bobbin 110 shown in FIG. 3A is configured to have a protrusion shape, the disclosure is not limited thereto. In another embodiment, each of the first couplers 113 of the bobbin 110 may be configured to have a groove or flat surface shape.

The bobbin 110 may include second couplers 117, which are intended to be coupled and secured to the lower elastic member 160. Although each of the second couplers 117 of the bobbin 110 shown in FIG. 3B is configured to have a protrusion shape, the disclosure is not limited thereto. In another embodiment, each of the second couplers of the bobbin 110 may be configured to have a groove or flat surface shape.

Although the outer surface of the bobbin 110 may be provided with a seating groove 105 into which the first coil 120 is seated, fitted or disposed, the disclosure is not limited thereto. In another embodiment, in place of the seating groove 105, the bobbin 110 may include a protrusion projecting from the outer surface of the second side portions 110b-2 to 110b2-4, and the coil units 120-1 to 120-4 of the first coil 120 may be coupled to the protrusion of the bobbin.

For example, the seating groove 105 in the bobbin 110 may have a groove structure depressed from the outer surfaces of the second side portions 110b2-1 to 110b2-4 of the bobbin 110, and may have a shape in which the coil units 120-1 to 120-4 of the first coil 120 are capable of being disposed.

In order to suppress separation of the first coil 120 and to guide the two ends of the first coil 120 when the coil units 120-1 to 120-4 of the first coil 120 are connected to the lower elastic members 160-1 to 160-2, the lower surfaces of two first side portions or two second side portions of the bobbin 110, which are positioned opposite each other, may have one or more guide grooves 116a and 116b formed therein.

The outer surface of the bobbin 110 may be provided therein with a seating groove 180a in which the second magnet 180 is seated, fitted, fixed or disposed. For example, the seating groove 180a may be formed in the outer surface of the first side portion 110b1-1 of the bobbin 110 that faces the first side portion 141-1 of the housing 140.

The seating groove 180a in the bobbin 110 may be depressed from the outer surface of the bobbin 110, and may have an opening formed in at least one of the upper surface and the lower surface of the bobbin 110, without being limited thereto.

Furthermore, the outer surface of the bobbin 110 may be provided therein with a seating groove 185a in which the third magnet 185 is seated, fitted, fixed or disposed.

The seating groove 185a in the bobbin 110 may be depressed from the outer surface of the bobbin 110, and may have an opening, which is formed in at least one of the upper surface and the lower surface of the bobbin 110, without being limited thereto.

For example, the seating grooves 180a and 185a in the bobbin 110 may be formed in two first side portions of the bobbin 110 that face each other or are positioned opposite each other.

Since the second magnet 180 and the third magnet 185 are disposed in the seating grooves 180a and 185a formed in two first side portions of the bobbin 110 that are positioned opposite each other, it is possible to achieve weight equilibrium between the second magnet 180 and the third magnet 185, and it is possible to cause the influence on AF driving force due to the magnetic field interference between the first magnet 130 and the second magnet 180 to cancel out the influence on AF driving force due to the magnetic field interference between the first magnet 130 and the third magnet 185, thereby improving accuracy of AF operation.

The bobbin 110 may be provided on the inner circumferential surface thereof with a thread 11 for coupling to a lens or a lens barrel. The thread 11 may be formed in the inner circumferential surface of the bobbin 110 in the state in which the bobbin 110 is held by a jig or the like. The upper surface of the bobbin 110 may have jig-clamping grooves 15a and 15b formed therein. For example, although the jig-clamping grooves 15a and 15b may be formed in the upper surfaces of two first side portions (or two second side portions) of the bobbin 110 positioned opposite each other, the disclosure is not limited thereto. The jig-clamping grooves 15a and 15b may serve as a contaminant collector for collecting contaminants.

Next, the first coil 120 will be described.

The first coil 120 may be disposed on the outer surface of the bobbin 110.

The first coil 120 may include a plurality of coil units 120-1 to 120-4.

For example, the first coil 120 may include first to fourth coil units 120-1 to 120-4.

The first to fourth coil units 120-1 to 120-4 may be connected to one another in series.

For example, one end of the first coil unit 120-1 may be connected to one end of the second coil unit 120-2, the other end of the second coil unit 120-2 may be connected to one end of the third coil unit 120-3, and the other end of the third coil unit 120-3 may be connected to one end of the fourth coil unit 120-4. Here, the two ends of the first coil 120 may be the other end of the first coil unit 120-1 and the other end of the fourth coil unit 120-4.

For example, the first coil 120 may include a first connecting line (not shown) connecting the one end of the first coil unit 120-1 to the one end of the second coil unit 120-2, a second connecting line (not shown) connecting the other end of the second coil unit 120-2 to the one end of the third coil unit 120-3, and a third connecting line (not shown) connecting the other end of the third coil unit 120-3 to the one end of the fourth coil unit 120-4.

Contrary to the case in which a coil is wound or disposed around the outer circumferential surfaces of the first and second side portions of the bobbin 110 so as to surround the outer circumferential surfaces, because the embodiment is constructed such that the coil units are disposed on the second side portions of the bobbin 110, the size of the zone in which the coil is disposed is reduced. Consequently, the resistance of the coil is lowered, and thus the amount of current or power consumed by the coil is reduced. Furthermore, since more space is made available in the first side portions of the bobbin in which the coil is not disposed is improved, design freedom is improved.

By virtue of the interaction between the first to fourth coil units 120-1 to 120-4 and the first to fourth magnets 130-1 to 130-4 corresponding to the first to fourth coil units, the AF operation unit (for example, the bobbin 110) may be moved in the direction of the optical axis OA.

Each of the first to fourth coil units 120-1 to 120-4 may be disposed on a corresponding one of the second side portions 110b2-1 to 110b2-4 of the bobbin 110.

For example, the first to fourth coil units 120-1 to 120-4 may be disposed on side surfaces (or outer surfaces) different from the side surfaces (or the outer surfaces) on which the second and third magnets 180 and 185 are disposed.

Although the first to fourth coil units 120-1 to 120-4 may not overlap the second magnet 180 (and/or the third magnet 185) in a horizontal direction or in a direction parallel to a line which is perpendicular to the optical axis and extends through the optical axis, the disclosure is not limited thereto. In another embodiment, the first to fourth coil units may overlap the second magnet 180 (and/or the third magnet 185).

For example, although the first to fourth coil units 120-1 to 120-4 may be disposed under the projection 115 of the bobbin 110, the disclosure is not limited thereto.

For example, the first to fourth coil units 120-1 to 120-4 may be disposed in the seating groove 105 formed in the second side portions 110b2-1 to 110b2-4 of the bobbin, the second magnet 180 may be fitted or disposed in the seating groove 180a formed in the first side portion 110b-1 of the bobbin 110, and the third magnet 185 may be fitted or disposed in the seating groove 185a formed in the first side portion 110b-3 of the bobbin 110.

For example, each of the second magnet 180 and the third magnet 185, which are disposed on the bobbin 110, may not overlap the first to fourth coil units 120-1 to 120-4 in the direction of the optical axis OA.

For example, each of the second magnet 180 and the third magnet 185 may not overlap in a direction parallel to a line which is perpendicular to the optical axis and extends through the optical axis.

For example, the second and third magnets 180 and 185 and the first to fourth coil units 120-1 to 120-4 may overlap one another on a plane perpendicular to the optical axis OA.

As described above, the second magnet 180 and the third magnet 185 may be disposed on side portions (or outer surfaces) of the bobbin different from the side portions or the outer surfaces of the bobbin 110 on which the coil units 120-1 to 120-4 are disposed.

Each of the first to fourth coil units 120-1 to 120-4 may have a closed-loop shape, a coil block shape or a coil ring shape. For example, each of the coil units 120-1, 120-2, 120-3 and 120-4 may have the form of a block or a ring, which is wound about a reference line in a rotational direction.

Here, the reference line may be a line that is perpendicular to the optical axis OA and extends through the optical axis and which is perpendicular to the outer surfaces of the second side portions of the bobbin 110 on which the coil units 120-1 to 120-4 are disposed.

Alternatively, for example, the reference line may be a line that is perpendicular to the optical axis OA and extends from the optical axis OA toward the outer surface (or the second side portion) of the bobbin 110 at which the coil units are disposed.

Alternatively, for example, the reference line may be a line that is perpendicular to the optical axis OA and is parallel to a direction toward the outer surface (or the second side portion) of the bobbin 110 at which the coil units are disposed.

Electric power or a drive signal may be supplied to the coil 120.

For example, the power or the drive signal supplied to the two ends of the first coil 120 may be a DC signal, an AC signal or a signal containing both DC and AC components, and may be of a voltage type or a current type.

When a drive signal (for example, drive current) is supplied to the first coil 120, it is possible to create electromagnetic force resulting from the interaction between the coil units 120-1 to 120-4 and the magnets 130-1 to 130-4 corresponding to the coil units, thereby moving the bobbin 110 in the direction of the optical axis OA by virtue of the created electromagnetic force.

At the initial position of the AF operation unit, the AF operation unit (for example, the bobbin 110) may be moved upwards or downwards, which is referred to as bidirectional driving of the AF operation unit. Alternatively, at the initial position of the AF operation unit, the AF operation unit (for example, the bobbin 110) may be moved upwards, which is referred to as unidirectional driving.

At the initial position of the AF operation unit, the first coil 120 may be disposed so as to correspond to, face or overlap the first magnet 130 disposed on the housing 140 in a direction parallel to a line which is perpendicular to the optical axis OA and extends through the optical axis.

For example, the first coil 120 may face or overlap the N pole of a first magnet part 30A of the first magnet 130, a partition wall 30C, and the S pole of a second magnet part 30B in a direction parallel to a line that is perpendicular to the optical axis OA and extends through the optical axis OA.

For example, the AF operation unit may include the bobbin 110 and the components (for example, the first coil 120 and the second and third magnets 180 and 185) coupled to the bobbin 110.

The initial position of the AF operation unit may be the original position of the AF operation unit in the state in which no electric power is applied to the first coil 120 or the position at which the AF operation unit is located as the result of the upper and lower elastic members 150 and 160 being elastically deformed due only to the weight of the AF operation unit.

In addition, the initial position of the bobbin 110 may be the position at which the AF operation unit is located when gravity acts in the direction from the bobbin 110 to the base 210 or when gravity acts in the direction from the base 210 to the bobbin 110.

Next, the second magnet 180 and the third magnet 185 will be described.

The second magnet 180 may be referred to as a sensing magnet because the second magnet 180 provides a magnetic field, which is detected by the first position sensor 170, and the third magnet 185 may be referred to as a balancing magnet, which cancels out the influence of the magnetic field of the second magnet 180 and establishes weight equilibrium with respect to the second magnet 180.

The coil units 120-1 to 120-4 may be disposed on the outer surfaces of the first side portions 110b1-1 to 110b-4 of the bobbin 110, and the second magnet 180 may be disposed on the second side portion (or the second outer surface), which is positioned between two adjacent first side portions (for example, the two first outer surfaces), among the first side portions (or the first outer surfaces) of the bobbin 110.

The second magnet 180 may be disposed in the seating groove 180a in the bobbin 110 so as to face the first position sensor 170.

Although the second magnet 180, which faces the first position sensor 170, may be exposed at a portion of one surface thereof from the seating groove 180a, the disclosure is not limited thereto. In another embodiment, the second magnet 180, which faces the first position sensor 170, may not be exposed at a portion of one surface thereof from the seating groove 180a.

For example, each of the second and third magnets 180 and 185 disposed on the bobbin 110 may be configured such that the interface between the N pole and the S pole is parallel to a direction perpendicular to the optical axis OA. For example, although each of the surfaces of the second and third magnets 180 and 185 that face the first position sensor 170 may be divided into the N pole and the S pole, the disclosure is not limited thereto.

In another embodiment, for example, the interface between the N pole and the S pole of each of the second and third magnets 180 and 185 disposed on the bobbin 110 may be parallel to the optical axis OA.

Although each of the second and third magnets 180 and 185 may be a bipolar magnetized magnet, which has two N poles and two S poles, or a tetrapolar magnetized magnet, the disclosure is not limited thereto. In another embodiment, for example, each of the second and third magnets 180 and 185 may be a monopolar magnetized magnet having one N pole and one S pole.

Each of the second and third magnets 180 and 185 may include a first magnet part 17a, a second magnet part 17b disposed under the first magnet part 17a and a partition wall 17c disposed between the first magnet part 17a and the second magnet part 17b. Here, the partition wall 17c may also be alternatively referred to as "nonmagnetic partition wall".

The first magnet part 17a may include an N pole, an S pole and a first interface portion between the N pole and the S pole. The first interface portion may be a portion that has substantially no magnetism and has a zone having almost no polarity, and may be a portion which is naturally formed in order to form a magnet composed of one N pole and one S pole.

The second magnet part 17b may include an N pole, an S pole and a second interface surface between the N pole and the S pole. The second interface portion may be a portion that has substantially no magnetism and has a zone having almost no polarity, and may be a portion that is naturally formed in order to form a magnet composed of one N pole and one S pole.

The partition wall 17c may separate or isolate the first magnet part 17a and the second magnet part 17b from each other, and may be a portion having substantially no magnetism or polarity. For example, the partition wall may be a nonmagnetic material, air or the like. The nonmagnetic partition wall may be considered a "neutral zone" or a "neutral portion".

The partition wall 17c may be a portion that is artificially formed when the first magnet part 17a and the second magnet part 17b are magnetized, and the width of the partition wall 17c may be larger than the width of the first interface portion (or the width of the second interface portion). Here, the width of the partition wall 17c may be the length of the partition wall 17c in a direction toward the second magnet part 17b from the first magnet part 17a. The width of the first interface portion (or the second interface portion) may be the length of each of the first and second magnet parts 17a and 17b toward the S pole from the N pole.

The second magnet 180 may be moved together with the bobbin 110 in the optical-axis direction, and the first position sensor 170 may detect the intensity or magnetic force of the magnetic field of the second magnet 180, which is moved in the optical-axis direction, and may output an output signal (for example, an output voltage) corresponding to the result of the detection.

For example, in accordance with displacement of the bobbin 110 in the optical-axis direction, the intensity or magnetic force of the magnetic field detected by the first position sensor 170 may vary. Consequently, the first position sensor 170 may output an output signal proportional to the detected intensity of the magnetic field, and the displacement of the bobbin 110 in the optical-axis direction may be detected using the output signal from the first position sensor 170.

Since the second magnet 180 is embodied as a bipolar magnetized magnet, the magnetic field interference between the second magnet 180 and the first magnet 130 may be reduced. Consequently, it is possible to reduce tilting of the bobbin 110 caused by the magnetic field interference, and it is possible to inhibit malfunction in AF feedback. Furthermore, when the lens moving apparatus according to the embodiment is applied to a dual camera comprising two or more lens moving apparatuses, outward leakage of a magnetic field from the lens moving apparatus is reduced, thereby reducing magnetic field interference between adjacent lens moving apparatuses. Accordingly, it is possible to inhibit malfunction in AF operation and/or OIS operation due to magnetic field interference of adjacent lens moving apparatuses mounted in the dual camera.

Next, the housing 140 will be described.

The housing 140 accommodates therein the bobbin 110, and supports the first magnet 130, the first position sensor 170, and the circuit board 190.

Figure 4A:
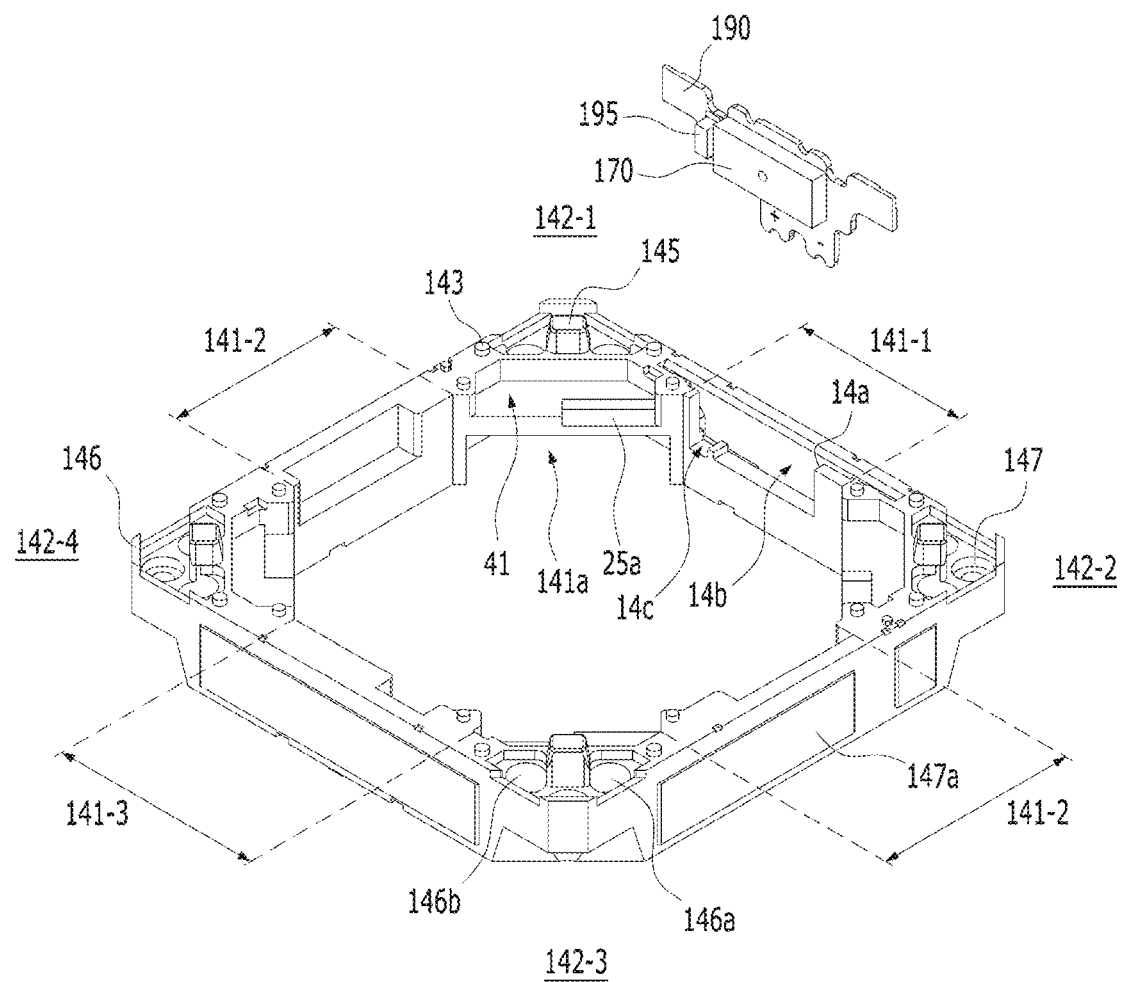
FIG. 4A is a perspective view of the housing, the circuit board, the position sensor, and the capacitor, which are shown in FIG. 1.
Figure 4B:
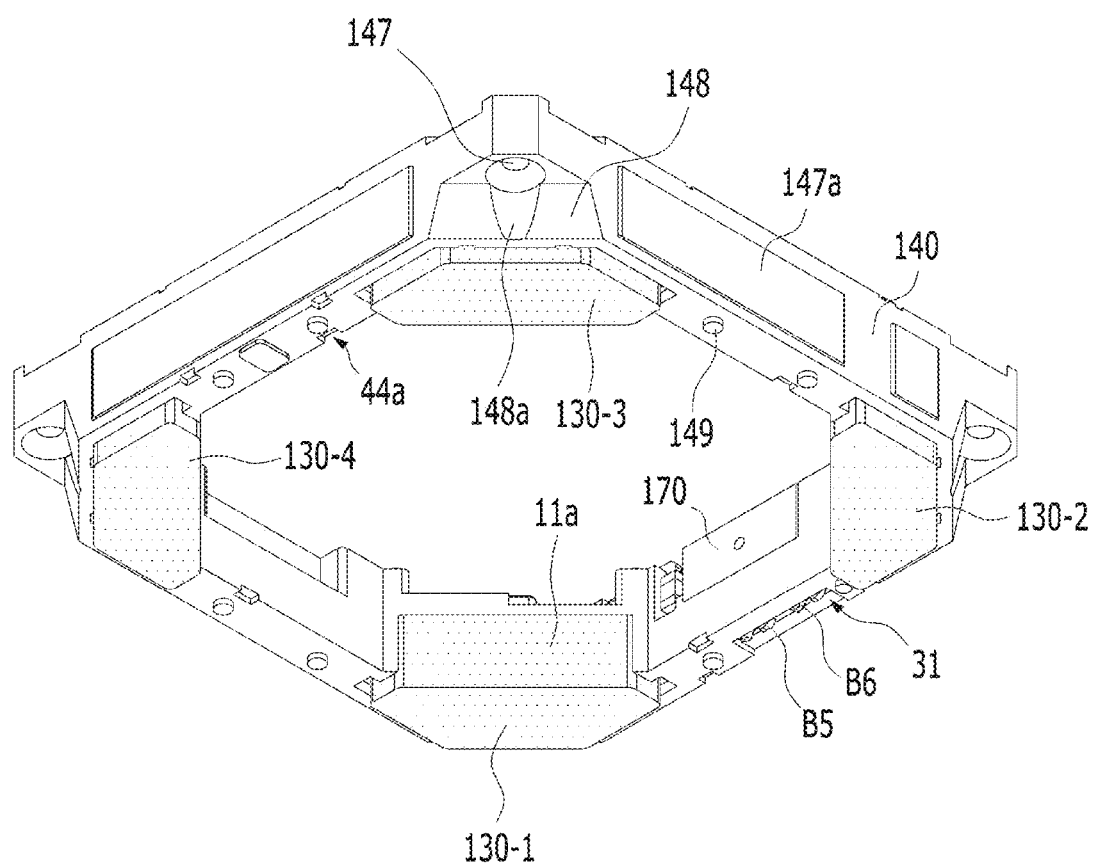
FIG. 4B is an assembled perspective view of the housing, the first magnet, the circuit board, the first position sensor, and the capacitor.
Figure 4C:
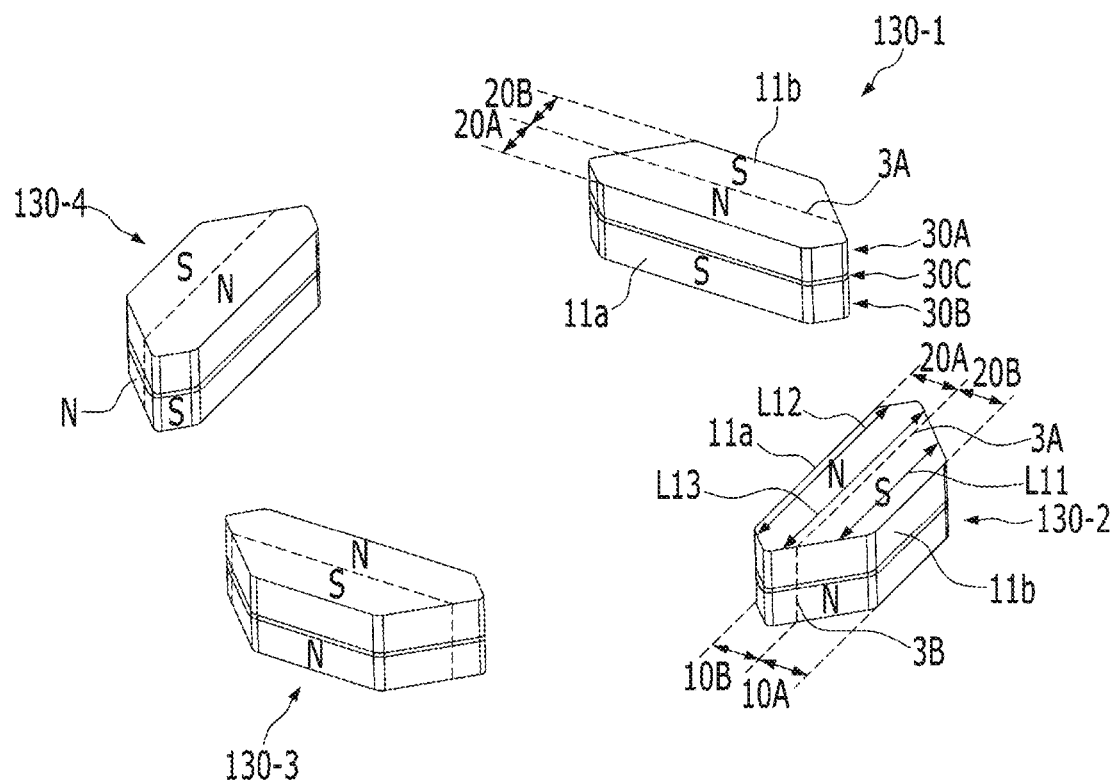
FIG. 4C is a perspective view of the magnets.

FIG. 4A is a perspective view of the housing 140, the circuit board 190, the position sensor 170, and the capacitor 195, which are shown in FIG. 1. FIG. 4B is an assembled perspective view of the housing 140, the first magnet 130, the circuit board 190, the first position sensor 170, and the capacitor 195. FIG. 4C is a perspective view of the magnets 130-1 to 130-4.

Referring to FIGS. 4A and 4B, the housing 140 may be configured to have a hollow column overall. For example, the housing 140 may have a polygonal (for example, a rectangular or octagonal) or circular bore, and the bore in the housing 140 may be a through hole, which is formed through the housing 140 in the optical-axis direction.

The housing 140 may include a plurality of side portions 141-1 to 141-4 and a plurality of corner portions 142-1 to 142-4.

For example, the housing may include first to fourth side portions 141-1 to 141-4, which are spaced apart from each other, and first to fourth corner portions 142-1 to 142-4, which are spaced apart from each other.

Each of the corner portions 142-1 to 142-4 of the housing 140 may be disposed or positioned between two adjacent side portions 141-1 and 141-2, 141-2 and 141-3, 141-3 and 141-4, and 141-4 and 141-1 so as to connect the side portions to each other.

For example, the corner portions 142-1 to 142-4 may be positioned at the corners of the housing 140. For example, although the number of side portions of the housing 140 is four and the number of corner portions is four, the disclosure is not limited thereto. The number of side portions or corner portions may be five or more.

Each of the side portions 141-1 to 141-4 of the housing 140 may be disposed parallel to a corresponding one of side plates of the cover member 300.

For example, the side portions 141-1 to 141-4 of the housing 140 may respectively correspond to the first side portions 110b1-1 to 110b1-4 of the bobbin 110, and the corner portions 142-1 to 142-4 of the housing 140 may respectively correspond to or face the second side portions 110b2-1 to 110b-4 of the bobbin 110.

The first magnet 130 may be disposed or mounted on the corner portions 142-1 to 142-4 of the housing 140.

For example, each of the corners or the corner portions 142-1 to 142-4 of the housing 140 may be provided with a seating portion or a reception portion 141a for receiving the magnet 130 therein.

The seating portion 141a of the housing 140 may be formed in the lower portion or the lower end of at least one of the corner portions 142-1 to 142-4 of the housing 140.

For example, the seating portion 141a in the housing 140 may be formed in an inner portion of the lower portion or the lower end of each of the four corner portions 142-1 to 142-4.

Although each of the seating portion 141a in the housing 140 may have a groove, for example, a recessed groove having a shape corresponding to the first magnet 130, the disclosure is not limited thereto.

For example, a first opening may be formed in a side surface of the seating portion 141a in the housing 140, which faces the first coil 120, and a second opening may be formed in the lower surface of the seating portion 141a in the housing 140, which faces the second coil 230, in order to facilitate mounting of the first magnet 130.

For example, a first surface 11a of the first magnet 130, which is fixed to or disposed in the seating portion 141a in the housing 140, may be exposed through the first opening in the seating portion 141a. Furthermore, a lower surface 11c of the first magnet 130, which is fixed to or disposed in the seating portion 141a in the housing 140, may be exposed through the second opening in the seating portion 141a.

The housing 140 may have an escape groove 41 formed in the upper surface of each of the corner portions in order to avoid spatial interference with the first frame connector 153 of the upper elastic member 150.

For example, the escape groove 41 in the housing 140 may be depressed from the upper surface of the housing 140, and may be positioned closer to the center of the housing 140 than is a stopper 145 or an adhesive injection hole 147. For example, the escape groove 41 may be positioned further inwards than the stopper 145 of the housing 140 in a direction toward the center of the housing 140, and the adhesive injection holes 146a and 146b may be positioned opposite the escape groove 41 with respect to the stopper 145.

Each of the corner portions 142-1 to 142-4 of the housing 140 may have therein the groove 25a, which corresponds to or faces the projection 115 of the bobbin 110. The groove 25a in the housing 140 may be positioned at the seating portion 141a in the housing 140. For example, the groove 25a in the housing 140 may be formed in the bottom surface of the escape groove 41. For example, the bottom surface of the groove 25a may be positioned lower than the bottom surface of the escape groove 41, and the seating groove 141a in the housing 140 may be positioned lower than the bottom surface of the escape groove 41.

Although the first magnet 130 may be fixed to the seating portion 141a by means of an adhesive, the disclosure is not limited thereto.

For example, each of the corner portions 142-1 to 142-4 of the housing 140 may be provided with one or more adhesive injection holes 146a and 146b through which an adhesive is injected. The one or more adhesive injection holes 146a and 146b may be depressed from the upper surface of corresponding corner portions 142-1 to 142-4 of the housing 140.

Each of the adhesive injection holes 146a and 146b may have a through hole, which is formed through a corresponding one of the corner portions 142-1 to 142-4, may be connected to or communicate with the seating groove 141a in the housing 140, and may expose at least a portion of the first magnet 130 (for example, at least a portion of the upper surface of the magnet 130). Since each of the adhesive injection holes 146a and 146b exposes at least a portion of the first magnet 140 (for example, at least a portion of the upper surface of the magnet 130), it is possible to efficiently apply an adhesive to the first magnet 130 and thus to increase the coupling force between the first magnet 130 and the housing 140.

The housing 140 may include at least one stopper 147a projecting from the outer surfaces of the side portions 141-1 to 141-4, and the at least one stopper 147a may serve to inhibit the housing 140 from colliding with the side plate of the cover member 300 when the housing 140 moves in a direction perpendicular to the optical axis.

In order to inhibit the lower surface of the housing 140 from colliding with the base 210 and/or the circuit board 250, the housing 140 may include a stopper (not shown) projecting from the lower surface thereof.

The housing 140 have a mounting groove 14a (or a seating groove) configured to receive the circuit board 190, a mounting groove 14b (or a seating groove) configured to receive the position sensor 170, and a mounting groove 14c (or a seating groove) configured to receive the capacitor 195.

The mounting groove 14a in the housing 140 may be formed in the upper portion or the upper end of one of the side portions 141-1 to 141-4 of the housing 140 (for example, 141-1). The mounting groove 14a may extend to the first and second corner portions 142-1 and 142-2 adjacent to the first side portion 141-1 of the housing 140.

In order to facilitate mounting of the circuit board 190, the mounting groove 14a in the housing 140 may have a groove structure, which is open at the upper surface thereof and has a side surface and a bottom surface and an opening formed in the inner surface thereof so as to be exposed to the inside of the housing 140. The mounting groove 14a in the housing 140 may have a shape that corresponds to or coincides with the shape of the circuit board 190.

The mounting groove 14b may be formed in the inner surface of the first side portion 141-1 of the housing 140, and may be connected to the mounting groove 14a.

A mounting groove 14c in the housing 140 may be formed at a portion of the mounting groove 14b, and a protrusion or a projection may be provided between the mounting groove 14b and the mounting groove 14c so as to separate or isolate the capacitor 195 from the first position sensor 170. The reason for this is to position the capacitor 195 and the position sensor 170 close to each other and to reduce the length of the path for electrical connection between the capacitor 195 and the position sensor 170 in order to reduce noise caused by a long path.

The capacitor 195 may be disposed or mounted on a first surface 19b of the circuit board 190.

The capacitor 195 may be configured to have a chip shape. Here, the chip may include a first terminal, which corresponds to one end of the capacitor 195, and a second terminal, which corresponds to the other end of the capacitor 195. The capacitor 195 may be alternatively referred to as a "capacitive element" or "condenser".

In another embodiment, the capacitor may be embodied as being included in the circuit board 190. For example, the circuit board 190 may include the capacitor comprising a first conductive layer, a second conductive layer, and an insulation layer (for example, a dielectric layer) disposed between the first and second conductive layers.

The capacitor 195 may be conductively connected in parallel to first and second terminals B1 and B2 of the circuit board 190 through which power (or a drive signal) is supplied to the position sensor 170 from the outside.

Alternatively, the capacitor 195 may be conductively connected in parallel to the terminals of the first position sensor 170, which is conductively connected to the first and second terminals B1 and B2 of the circuit board 190.

For example, one end of the capacitor 195 (or the first terminal of the capacitor chip) may be conductively connected to the first terminal B1 of the circuit board 190, and the other end of the capacitor 195 (or the first terminal B1 of the capacitor chip) may be conductively connected to the second terminal B2 of the circuit board 190.

Since the capacitor 195 is conductively connected in parallel to the first and second terminals B1 and B2 of the circuit board 190, the capacitor 195 is capable of serving as a smoothing circuit for eliminating ripple components included in the power signals GND and VDD, which are supplied to the first position sensor 170 from the outside, and is thus capable of supplying stable and consistent power signals to the first position sensor 170.

Furthermore, since the capacitor 195 is conductively connected in parallel to the first and second terminals B1 and B2 of the circuit board 190, it is possible to protect the first position sensor 170 from high-frequency noise, ESD and the like, which is introduced from the outside.

In addition, the capacitor 195 is capable of inhibiting overcurrent, which is caused by high-frequency noise, ESD or the like introduced from the outside, from being applied to the first position sensor 170, and is capable of inhibiting a calibration value or a coordinate code value for displacement of the bobbin 110, which is obtained based on the signal output from the first position sensor 170, from being reset due to the overcurrent.

The mounting groove 14b of the housing 140 may be open at the upper portion thereof in order to facilitate mounting of the first position sensor 170, and may have an opening, which is formed in the inner surface of the first side portion 141-1 of the housing 140 in order to improve the sensitivity of the position sensor 170. The mounting groove 14b in the housing 140 may have a shape corresponding to or coinciding with the shape of the position sensor 170.

For example, the circuit board 190 may be secured in the mounting groove 14a in the housing 140 using an adhesive member. Although the adhesive member may be epoxy or double-sided adhesive tape, the disclosure is not limited thereto.

The corner portions 142-1 to 142-4 of the housing 140 may be respectively provided therein with the support members 220-1 to 220-4.

The corner portions 142-1 to 142-4 of the housing 140 may be respectively provided therein with holes 147, which define paths through which the support members 220-1 to 220-4 extend. For example, the housing 140 may include the holes 147, which are respectively formed through the upper portions of the corner portions 142-1 to 142-4 of the housing 140.

In another embodiment, each of the holes formed in the corner portions 142-1 to 142-4 of the housing 140 may be depressed from the outer surface of the corner portion, and at least a portion of the hole may be open at the outer surface of the corner portion. The number of holes 147 in the housing 140 may be the same as the number of support members.

One end of each of the support members 220 may be connected or bonded to the upper elastic member 150 through the hole 147.

For example, although the diameter of the hole 147 may gradually increase in a direction toward the lower surface from the upper surface of the housing 140 in order to allow a damper to be easily applied, the disclosure is not limited thereto. In another embodiment, the diameter of the hole 147 may be constant.

In order not only to define the paths through which the support members 220-1 to 220-4 extend but also to avoid spatial interference between the support members 220-1 to 220-4 and the corner portions 142-1 to 142-4 of the housing 140, escape grooves 148a may be respectively formed in the outer surfaces 148 of the corner portions 142-1 to 142-4. Although each of the escape grooves 148a may be connected to the hole 147 in the housing 140 and may have a semicircular or semi-elliptical section, the disclosure is not limited thereto. The lower portion or the lower end of the escape groove 148a may be connected to the lower surface of the housing 140.

For example, although the diameter of the escape groove 148a may gradually decrease downwards, the disclosure is not limited thereto.

In order to inhibit the housing 140 from directly colliding with the inner surface of the upper plate of the cover member 300, the housing 140 may be provided at the upper portion, the upper end or the upper surface thereof with the stoppers 145.

For example, although the stoppers 145 may respectively be disposed on the upper surfaces of the corner portions 142-1 to 142-4 of the housing 140, the disclosure is not limited thereto.

In order to inhibit the lower surface of the housing 140 from colliding with the base 210 and/or the circuit board 250, the housing 140 may further be provided at the lower portion, the lower end or the lower surface thereof with stoppers (not shown).

Furthermore, the corners of the upper surfaces of the corner portions 142-1 to 142-4 of the housing 140 may be respectively provided with guide projections 146 in order to inhibit the damper from overflowing.

For example, each of the holes 147 in the housing 140 may be positioned between the corner (for example, the guide projection 146) and the stopper 145 on the upper surface of a corresponding one of the corner portions 142-1 to 142-4 of the housing 140.

The upper portion, the upper end or the upper surface of the housing 140 may be provided with at least one coupler 143, which is coupled to the first outer frame 152 of the upper elastic member 150.

The first coupler 143 of the housing 140 may be disposed on at least one of the side portions 141-1 to 141-4 and the corner portions 142-1 to 142-4 of the housing 140.

The lower portion, the lower end or the lower surface of the housing 140 may be provided with a second coupler 149, which is coupled or secured to the second outer frame 162 of the lower elastic member 160.

Although each of the first and second couplers 143 and 149 of the housing 140 may have a protrusion shape, the disclosure is not limited thereto. In another embodiment, the coupler may have a groove or flat surface shape.

For example, the first coupler 143 of the housing 140 may be coupled to the hole 152a in the first outer frame 152 of the upper elastic member 150 using an adhesive member (for example, solder) or heat fusion, and the second coupler 149 of the housing 140 may be coupled to the hole 162a in the second outer frame 162 of the lower elastic member 160 using an adhesive member (for example, solder) or heat fusion.

In order to avoid spatial interference with the portions at which the second outer frames 162-1 to 162-3 of the lower elastic member 160 meet second frame connectors 163, an escape groove 44a may be formed in the lower surface of at least one of the side portions 141-1 of the housing 140.

Next, the first magnet 130 will be described.

The first magnet 130 may be disposed on at least one of the corners (or the corner portions 142-1 to 142-4) of the housing 140. For example, the first magnet 130 may include the magnets 130-1 to 130-4, which are disposed on the corners (or the corner portions 142-1 to 142-4) of the housing 140.

At the initial position of the AF operation unit, at least a portion of each of the magnets 130-1 to 130-4 may overlap a corresponding one of the first to fourth coil units in a direction parallel to a line that is perpendicular to the optical axis OA and extends through the optical axis OA.

For example, each of the magnets 130-1 to 130-4 may be fitted or disposed in the seating portion 141a in a corresponding one of the corner portions 141-1 to 141-4 of the housing 140.

In another embodiment, the first magnet 130 may be disposed on the outer surfaces of the corner portions 141-1 to 141-4 of the housing 140.

Each of the magnets 130-1 to 130-4 may have a polyhedral shape, which is easily seated on a corresponding one of the corner portions 141-1 to 141-4 of the housing 140.

Figure 15:
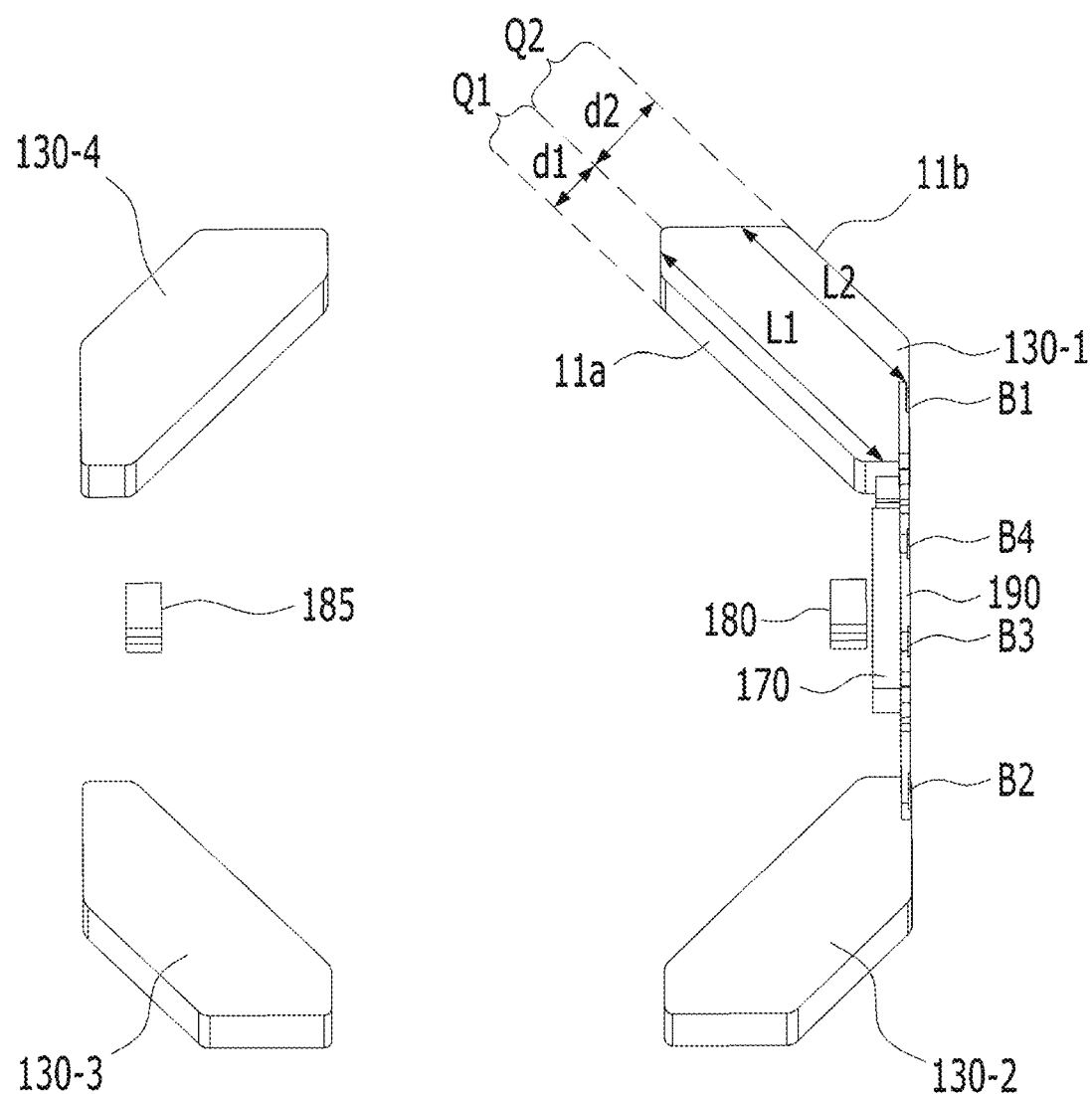
FIG. 15 is a view illustrating the disposition of the first magnet, the second and third magnets, the first position sensor, the capacitor and the circuit board.

For example, the first surface 11a (see FIG. 15) of each of the magnets 130-1 to 130-4 may have a surface area larger than the second surface 11b (see FIG. 15).

The first surface 11a of each of the magnets 130-1 to 130-4 may be a surface, which faces one surface of a corresponding one of the coil units 120-1 to 120-4 (or the outer surface of the bobbin 110), and the second surface 11b may be a surface opposite the first surface 11a.

The crosswise length of the second surface 110b of each of the magnets 130-1 to 130-4 may be less than the crosswise length of the first surface 11a.

For example, the crosswise direction of the first surface 11a of each of the magnets 130-1 to 130-4 may be a direction perpendicular to a direction on the first surface 11a toward the upper surface from the lower surface of each of the magnet. Alternatively, the crosswise direction of the first surface 11a may be a direction on the first surface 11a perpendicular to the optical axis.

The crosswise direction of the second surface 11b of each of the magnets 130-1 to 130-4 may be a direction on the second surface 11b toward the upper surface from the lower surface of each of the magnets 130-1 to 130-4. Alternatively, the crosswise direction of the second surface 11b may be a direction on the second surface 11b that is perpendicular to the optical-axis direction.

For example, each of the magnets 130-1 to 130-4 may include a portion Q2, the crosswise length L2 of which gradually decreases in a direction toward the corner portion 142-1, 142-2, 142-3 or 142-4 of the housing from the center of the housing 140.

For example, each of the magnets 130-1 to 130-4 may include a portion Q2, the crosswise length L2 of which gradually decreases in a direction toward the second surface 11b from the first surface 11a. For example, the crosswise direction of each of the magnets 130-1 to 130-4 may be a direction parallel to the first surface 11a of each of the magnets 130-1 to 130-4.

Each of the magnets 130-1 to 13-4 may be a bipolar magnetized magnet or a tetrapolar magnetized magnet, which includes two N poles and two S poles.

Referring to FIG. 4C, each of the first to fourth magnets 130-1 to 130-4 may include the first magnet part 30A, the second magnet part 30B, and the partition wall 30C disposed between the first magnet part 30A and the second magnet part 30B. Here, the partition wall 30C may be a "nonmagnetic partition wall".

The first magnet part 17a may include an N pole, an S pole and a first boundary portion between the N pole and the S pole. The first boundary portion may be a portion that has substantially no magnetism and has a zone having almost no polarity, and may be a portion that is naturally formed in order to form a magnet composed of one N pole and one S pole.

The second magnet part 17b may include an N pole, an S pole, and a second boundary portion between the N pole and the S pole. The second boundary portion may be a portion that has substantially no magnetism and has a zone having almost no polarity, and may be a portion that is naturally formed in order to form a magnet composed of one N pole and one S pole.

The partition wall 17c may separate or isolate the first magnet part 17a and the second magnet part 17b from each other, and may be a portion having substantially no magnetism or polarity. For example, the partition wall may be constituted by nonmagnetic material, air or the like. The nonmagnetic partition wall may be considered a "neutral zone".

The partition wall 17c may be a portion that is artificially formed when the first magnet part 17a and the second magnet part 17b are magnetized, and the width of the first partition wall 17c may be greater than the width of each of the first boundary portions (the width of the second boundary portion). Here, the width of the first partition wall 17c may be the length in a direction toward the second magnet part 17b from the first magnet part 17a.

The first magnet part 30A and the second magnet part 30B may be disposed such that opposite polarities thereof face each other in the optical-axis direction. For example, the second magnet part 30B may be disposed under the first magnet part 30A in the optical-axis direction.

For example, although the first magnet part 30A and the second magnet part 30B are disposed such that the N pole of the first magnet part 30A and the S pole of the second magnet part 30B face the coil unit, the disclosure is not limited thereto. The reverse disposition is also possible.

For example, the first surface 11a of each of the first to fourth magnets 130-1 to 130-4 may include the N pole of the first magnet part 30A and the S pole of the second magnet part 30B.

The first magnet part 30A may include a first polarity zone 20A and a second polarity zone 20B. For example, although the first polarity zone may be an N pole zone and the second polarity zone may be an S pole zone, the disclosure is not limited thereto. In another embodiment, the reverse disposition of polarities is also possible. The second magnet part 30B may include a first polarity zone 10A and a second polarity zone 10B.

For example, the first polarity zone 10A of the second magnet part 30B may correspond to, face or overlap the second polarity zone 20B of the first magnet part 30A in the optical-axis direction. For example, the second polarity zone 10B of the second magnet part 30B may correspond to, face or overlap the first polarity zone 20A of the first magnet part 30A in the optical-axis direction.

The first surface 11a of each of the magnets 130-1 to 130-4 may include one side surface of the first polarity zone 20A of the first magnet part 30A and one side surface of the second polarity zone 10B of the second magnet part 30B.

The second surface 11b of each of the magnets 130-1 to 130-4 may include one surface of the second polarity zone 20B of the first magnet part 30A and one surface of the first polarity zone 10A of the second magnet part 30B.

The second polarity zone 20B of the first magnet part 30A may be configured such that the crosswise length L11 thereof gradually decreases in a direction toward the second surface 11b from the first surface 11a of the magnet 130, or may include a portion, the crosswise length L11 of which gradually decreases in the direction toward the second surface 11b from the first surface 11a of the magnet 130.

Furthermore, the first polarity zone 10A of the second magnet part 30B may be configured such that the crosswise length thereof gradually decreases in the direction toward the second surface 11b from the first surface 11a of the magnet 130, or may include a portion, the crosswise length of which gradually decreases in the direction toward the second surface 11b from the first surface 11a of the magnet 130.

Furthermore, the first polarity zone 20A of the first magnet part 30A may be configured such that the crosswise length L12 thereof gradually decreases in the direction toward the second surface 11b from the first surface 11a of the magnet 130, or may include a portion, the crosswise length L12 of which gradually decreases in the direction toward the second surface 11b from the first surface 11a of the magnet 130.

Alternatively, the first polarity zone 20A of the first magnet part 30A may be configured such that the crosswise length L12 thereof increases and then decreases in the direction toward the second surface 11b from the first surface 11a of the magnet 130. For example, the first polarity zone 20A of the first magnet part 30A may include a portion, the crosswise length L12 of which gradually increases in the direction toward the second surface 11b from the first surface 11a of the magnet 130, and a portion, the crosswise length L13 of which gradually decreases in the direction toward the second surface 11b from the first surface 11a of the magnet 130.

The second polarity zone 20B of the second magnet part 30B may be configured such that the crosswise length thereof gradually increases in the direction toward the second surface 11b from the first surface 11a of the magnet 130, or may include a portion, the crosswise length of which gradually increases in the direction toward the second surface 11b from the first surface 11a of the magnet 130.

Alternatively, the second polarity zone 20B of the second magnet part 30B may be configured such that the crosswise length thereof increases and then decreases in the direction toward the second surface 11b from the first surface 11a of the magnet 130. For example, the second polarity zone 20B of the second magnet part 30B may include a portion, the crosswise length of which gradually increases in the direction toward the second surface 11b from the first surface 11a of the magnet 130, and a portion, the crosswise length of which gradually decreases in the direction toward the second surface 11b from the first surface 11a of the magnet 130.

For example, the horizontal surface of each of the magnets 130-1 to 130-4 may have a polygonal shape, such as a triangular, pentagonal, hexagonal or rhombus shape.

In the embodiment, since each of the magnets 130-1 to 130-4 is embodied as a bipolar magnetized magnet, magnetic field interference between the second magnet 180 and the first magnet 130 may be reduced. Consequently, it is possible to reduce tilting of the bobbin 110 caused by the magnetic field interference, and it is possible to inhibit malfunction in AF feedback.

Furthermore, when the lens moving apparatus according to the embodiment is applied to a dual camera comprising two or more lens moving apparatuses, outward leakage of a magnetic field from the lens moving apparatus is reduced, thereby reducing magnetic field interference between adjacent lens moving apparatuses. Accordingly, it is possible to inhibit malfunction in AF operation and/or OIS operation due to magnetic field interference of adjacent lens moving apparatuses mounted in the dual camera.

Figure 5:
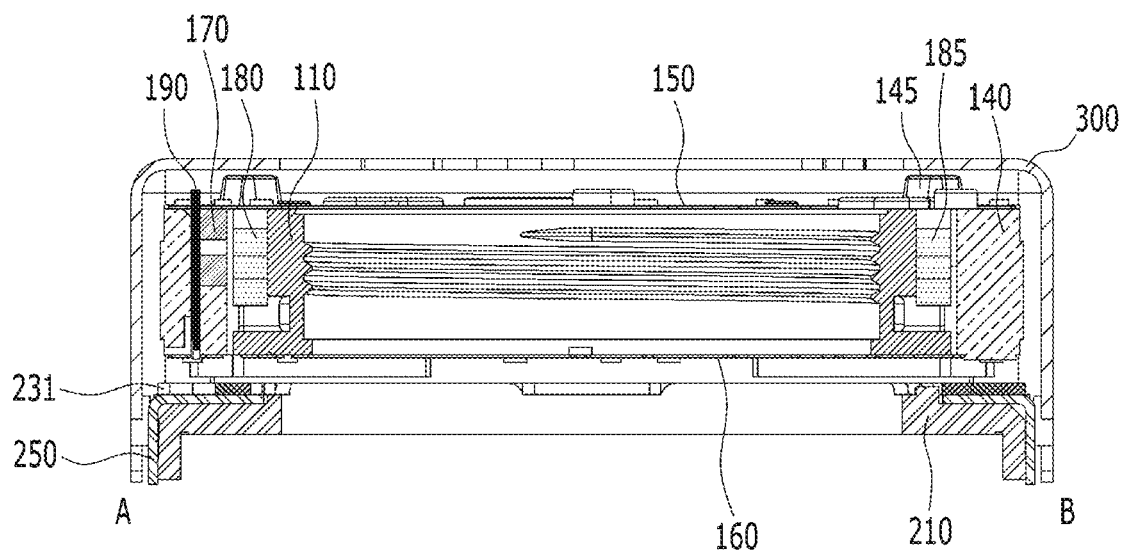
FIG. 5 is a cross-sectional view of the lens moving apparatus, taken along line A-B in FIG. 2.
Figure 6A:
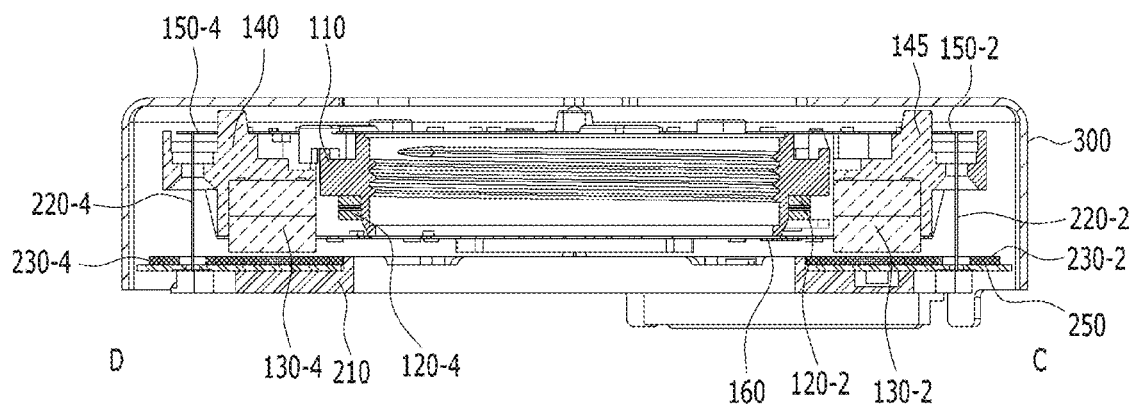
FIG. 6A is a cross-sectional view of the lens moving apparatus, taken along line C-D in FIG. 2.
Figure 6B:
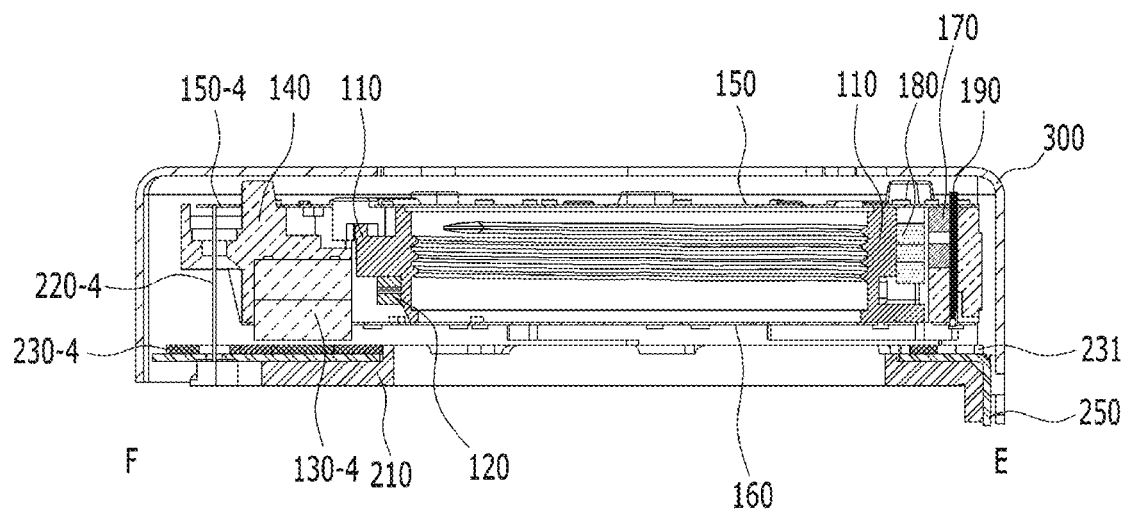
FIG. 6B is a cross-sectional view of the lens moving apparatus, taken along line E-F in FIG. 2.

FIG. 5 is a cross-sectional view of the lens moving apparatus 100 shown in FIG. 2 taken along line A-B. FIG. 6A is a cross-sectional view of the lens moving apparatus 100 shown in FIG. 2 taken along line C-D. FIG. 6B is a cross-sectional view of the lens moving apparatus 100 shown in FIG. 2 taken along line E-F.

Referring to FIGS. 5, 6A and 6B, each of the second and third magnets 180 and 185 may not overlap the coil units 120-1 to 120-4 of the first coil 120 in a direction parallel to a line that is perpendicular to the optical axis OA and extends through the optical axis.

Since the second and third magnets 180 and 185 are disposed on side portions different from the side portions of the bobbin 110 at which the coil units 120-1 to 120-4 are disposed, there is no restriction as to length in the optical-axis direction when the second magnet 180 is disposed on the bobbin 110, thereby making it possible to increase the length of the second magnet 180 in the optical-axis direction. Consequently, since the length of the second magnet 180 in the optical-axis direction is increased, it is possible to increase the output of the first position sensor 170, improve the sensitivity of the first position sensor 170, and easily perform calibration for creating a coordinate code value for displacement of the bobbin 110 corresponding to the output of the first position sensor 170.

At the initial position of the AF operation unit, although the second magnet 180 may overlap or be aligned with the third magnet 185 in a direction perpendicular to the optical axis OA, or in a direction parallel to a line that is perpendicular to the optical axis and extends through the optical axis, the disclosure is not limited thereto.

At the initial position of the AF operation unit, although the first position sensor 170 may overlap the second magnet 180 in a direction perpendicular to the optical axis OA, or in a direction parallel to a line which is perpendicular to the optical axis and extends through the optical axis, the disclosure is not limited thereto. In another embodiment, the first position sensor 170 may not overlap at least one of the second and third magnets 180 and 185.

Furthermore, the first position sensor 170 may not overlap the magnets 130-1 to 130-4 in a direction perpendicular to the optical axis OA, or in a direction parallel to a line that is perpendicular to the optical axis and extends through the optical axis.

For example, the first position sensor 170 may not overlap the magnets 130-1 to 130-4 in a direction toward the first side portions 110b1-1 of the bobbin 110 from the first position sensor 170 or in a direction toward the first side portion 110b1-1 of the bobbin 110 from the first side portion 141-1 of the housing 140.

At the initial position of the AF operation unit, the N pole of the first magnet part 30A and the s pole of the second magnet part 30B of each of the magnets 130-1 to 130-4 may face or overlap a corresponding one of the coil units 120-1 to 120-4 in direction parallel to a line that is perpendicular to the optical axis OA and extends through the optical axis.

Next, the circuit board 190 and the first position sensor 170 will be described.

The circuit board 190 may be disposed on one side portion 141-1 of the housing 140, and the first position sensor 170 may be disposed or mounted on the circuit board 190. For example, the circuit board 190 may be disposed in the first mounting groove 14a in the housing 140.

For example, the circuit board 190 may be disposed between the first corner portion 142-1 and the second corner portion 142-2 of the housing 140, and first to fourth terminals B1 to B4 of the circuit board 190 may be conductively connected to the first position sensor 170.

For example, the circuit board 190 may not overlap an imaginary line, which connects the corner portion (for example, the first corner portion 142-1) or the corner of the housing 140 to the optical axis OA. The reason for this is to inhibit spatial interference between the support member 220 and the circuit board 190.

Figure 7A:
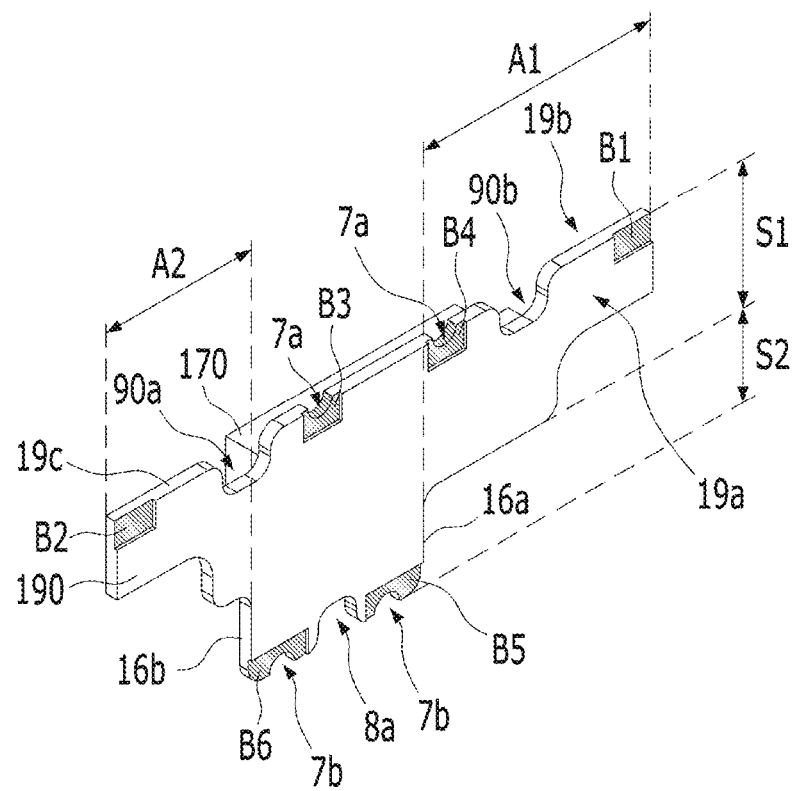
FIG. 7A is an enlarged view of the circuit board and the first position sensor.
Figure 7B:
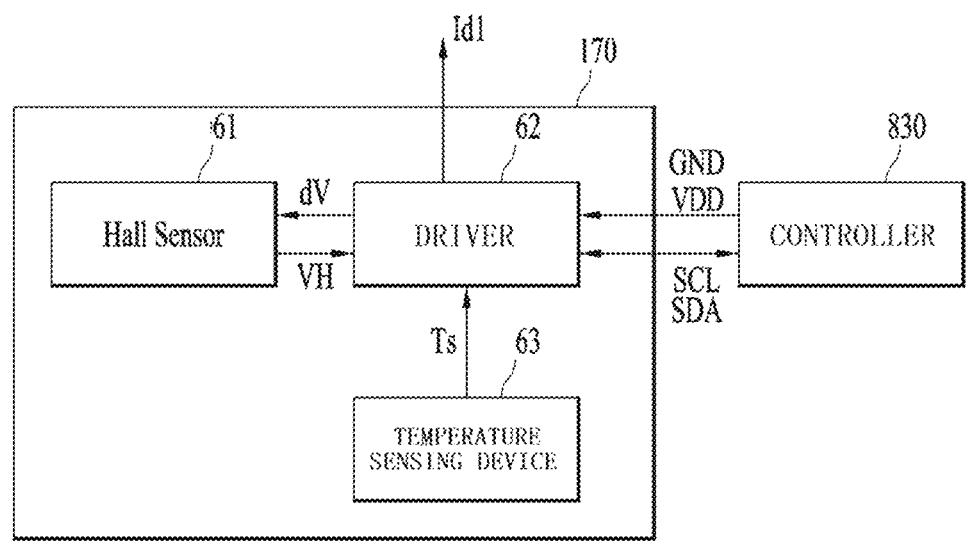
FIG. 7B is a schematic view of an embodiment of the first sensor shown in FIG. 7A.

FIG. 7A is an enlarged view of the circuit board 190 and the first position sensor 170. FIG. 7B is a schematic view of an embodiment of the first sensor 170 shown in FIG. 7A.

Referring to FIGS. 7A and 7B, the circuit board 190 may include terminals B1 to B6, which are to be conductively connected to external terminals or external devices.

The first position sensor 170 may be disposed on the first surface 19b of the circuit board 190, and the terminals B1 to B6 may be disposed on the second surface 19a of the circuit board 190.

Here, the second surface 19a of the circuit board 190 may be the surface opposite the first surface 19b of the circuit board 190. For example, the first surface 19b of the circuit board 190 may be the surface of the circuit board 190 that faces the bobbin 110.

The circuit board 190 may include a body part S1 and an extension part S2, positioned under the body part S1. The body part S1 may be alternatively referred to as an "upper part", and the extension part S2 may be alternatively referred to as a "lower part".

The extension part S2 may extend downwards from the body part S1.

The body part S1 may have a form projecting from side surfaces 16a and 16b of the extension part S2. For example, the side surfaces 16a and 16b of the extension part S2 may be surfaces connecting the first surface 19b to the second surface 19a of the extension part S2.

The body part S1 may include a first extension region A1 extending in a direction toward the first corner portion 142-1 and a second extension region A2 extending in a direction toward the second corner portion 142-2 of the housing 140.

For example, the first extension region A1 may extend or project from the first side surface 16a of the extension part S2, and the second extension region A2 may extend or project from the second side surface 16B of the extension part S2.

For example, although the crosswise length of the first extension region A1 is shown as being greater than the crosswise length of the second extension region A2 in FIG. 7A, the disclosure is not limited thereto. In another embodiment, the crosswise length of the first extension region A1 may be equal to or less than the crosswise length of the second extension region A2.

For example, the crosswise length of the body part S1 of the circuit board 190 may be greater than the crosswise length of the extension part S2.

For example, the first to fourth terminals B1 to B4 of the circuit board 190 may be disposed on the first surface 19b so as to be spaced apart from one another. For example, the four terminals B1 to B4 may be arranged in the crosswise direction of the circuit board 190 in a line.

The first terminal B1 and the second terminal B2 may be disposed adjacent to the two ends of the body part S1 of the circuit board 190. In other words, each of the first terminal B1 and the second terminal B2 may be disposed adjacent to a corresponding one of the two ends of the body part S1 of the circuit board 190.

For example, the first terminal B1 of the circuit board 190 may be disposed on one end (for example, one side of the upper end) of the circuit board 190, and the second terminal B2 may be disposed on the other end of the circuit board 190. The third terminal B3 may be disposed between the first terminal B1 and the second terminal B2, and the fourth terminal B4 may be disposed between the third terminal B3 and the first terminal B1.

The first terminal B1 of the circuit board 190 may be disposed in the first extension region A1 of the body part S1 of the circuit board 190, and the second terminal B2 may be disposed in the second extension region A2 of the body part S1 of the circuit board 190.

The first to fourth terminals B1 to B4 may be disposed closer to the upper surface 19c than to the lower surface of the circuit board 190.

For example, the first to fourth terminals B1 to B4 may be formed so as to abut on both the second surface 19a of the circuit board 190 and the upper surface 19c of the body part S1 of the circuit board 190 abutting on the second surface 19a.

For example, at least one of the first to fourth terminals B1 to B4 may include a groove or a via 7a formed in the upper surface 19c of the circuit board 190.

For example, each of the third terminal B3 and the fourth terminal B4 may include a curved portion, for example, a semicircular via or groove 7a, which is depressed from the upper surface 19c of the circuit board 190.

By virtue of the groove 7a, the contact area between solder and the terminals B3 and B4 is increased, thereby improving adhesive force and solderability.

The fifth terminal B5 and the sixth terminal B6 of the circuit board 180 may be disposed on the first surface 19b of the extension part S2 of the circuit board 190 so as to be spaced apart from each other.

The circuit board 190 may have a groove or hole 8a formed between the fifth terminal B5 and the sixth terminal B6. The groove 8a may be depressed from the lower surface of the circuit board 190, and may be open both at the first surface 19b and at the second surface 19a of the circuit board 190.

The distance between the fifth terminal B5 and the sixth terminal B6 may be less than the distance between two adjacent terminals, among the first to fourth terminals B1 to B4. Accordingly, since solder is not applied to the portion between the fifth terminal B5 and the sixth terminal B6 by virtue of the groove 8a, it is possible to inhibit an electrical short between the fifth terminal B5 and the sixth terminal B6.

For example, at least one of the fifth and sixth terminals B5 and B6 may include a groove or a via 7b formed in the lower surface of the circuit board 190.

For example, the fifth terminal B5 and the sixth terminal B6 may include a curved portion, for example, a semicircular via or a groove, which is depressed from the lower surface of the circuit board 190.

By virtue of the groove 7b, the size of the contact area between the solder and the fifth and sixth terminals B5 and B6 is increased, thereby improving adhesive force and solderability.

The circuit board 190 may include a groove 90a formed between the second terminal B2 and the third terminal B3 and a groove 90b formed between the first terminal B1 and the fourth terminal B4. Here, the grooves 90a and 90b may be alternatively referred to as "escape grooves".

Each of the first groove 90a and the second groove 90b may be depressed from the upper surface 19c of the circuit board 190, and may be open both at the first surface 19b and at the second surface 19a of the circuit board 190.

The first groove 90a in the circuit board 190 may be formed in order to avoid spatial interference with a first outer frame 151 of a third upper elastic unit 150-3, and the second groove 90b in the circuit board 190 may be formed in order to avoid spatial interference with a first outer frame 151 of a fourth upper elastic unit 150-4.

For example, the circuit board 190 may be embodied as a printed circuit board or an FPCB.

The circuit board 190 may include a circuit pattern or a wire (not shown) for conductively connecting the first to sixth terminals B1 to B6 to the first position sensor 170.

The first position sensor 170 may detect the magnetic field or the intensity of the magnetic field of the second sensing magnet 180 mounted on the bobbin 110 during movement of the bobbin 110, and may output an output signal corresponding to the result of the detection.

The first position sensor 170 may be mounted on the circuit board 190 disposed on the housing 140, and may be secured to the housing 140. For example, the first position sensor 170 may be disposed in the mounting groove 14b in the housing 190, and may be moved together with the housing 140 during handshake correction.

The first position sensor 170 may be disposed on the second surface 19a of the circuit board 190. In another embodiment, the first position sensor 170 may be disposed on the first surface 19b of the circuit board 190.

The first position sensor 170 may include a Hall sensor 61 and a driver 62. For example, the driver 62 may be of an IC (integrated circuit) type.

For example, the hall sensor 61 may be made of silicone, and the output VH of the hall sensor 61 may increase as the ambient temperature increases. For example, the ambient temperature may be the temperature of the lens moving apparatus, for example, a temperature of the circuit board 190, the temperature of the hall sensor 61 or the temperature of the driver 62.

In another embodiment, the hall sensor 61 may be made of GaAs, and the output VH of the hall sensor 61 may decrease as the ambient temperature increases. In another embodiment, the output of the hall sensor 61 may have a slope of about −0.06%/□ with respect to an ambient temperature.

The first position sensor 170 may further include a temperature-sensing element 63 capable of detecting an ambient temperature. The temperature-sensing element 63 may output a temperature detection signal Ts, corresponding to the result of detection of the ambient temperature of the first position sensor 170, to the driver 62.

For example, the hall sensor 61 of the first position sensor 190 may generate the output VH corresponding to the result of detection of the intensity of the magnetic force of the second magnet 180. For example, although the VH may be of a voltage type, the disclosure is not limited thereto. In another embodiment, the VH may be of a current type. The VH may be a digital signal. However, the disclosure is not limited thereto, and the VH may be an analog signal.

For example, the intensity of the output of the first position sensor 190 may be proportional to the intensity of the detected magnetic force of the second magnet 180.

The driver 62 may output a drive signal dV for driving the hall sensor 61 and a drive signal Id1 for driving the first coil 120.

For example, the driver 62 may receive a clock signal SCL, a data signal SDA and power signals VDD and GND through data communication using a protocol such as I2C communication. For example, the absolute value of the second power signal VDD may be greater than the absolute value of the first power signal GND.

Here, although the first power signal GND may be a ground voltage or 0V and the second power signal VDD may be a predetermined voltage (for example, a positive voltage of a negative voltage) for driving the driver 62, and may be DC voltage and/or AC voltage, the disclosure is not limited thereto.

The driver 62 may create the drive signal dV, for driving the hall sensor 61 using the clock signal SCL and the power signals VDD and GND, and the drive signal Id1, for driving the first coil 120.

The first position sensor 170 may include the four terminals for sending and receiving the clock signal SCL, the data signal SDA, the power signals VDD and GND, and the two terminals for providing a drive signal to the first coil 120.

Furthermore, the driver 62 may receive the output VH of the hall sensor 61, and may send the clock signal SCL and the data signal SDA pertaining to the output VH of the hall sensor 61 through data communication using a protocol such as I2C communication.

Furthermore, the driver 62 may receive the temperature detection signal Ts as a result of detection by the temperature-sensing element 63, and may send the temperature detection signal Ts to controllers 830 and 780 through the data communication using a protocol such as the I2C communication.

The controllers 830 and 780 may perform temperature compensation for the output VH from the hall sensor 61 based on variation in the ambient temperature detected by the temperature-sensing element 63 of the first position sensor 170.

For example, when the drive signal dV or a bias signal of the hall sensor 61 is 1 mA, the output VH of the hall sensor 61 of the first position sensor 170 may be −20 mV~+20 mV.

In the case of temperature compensation for the output VH of the hall sensor 61, having a negative gradient with respect to variation in ambient temperature, the output VH of the hall sensor 61 of the first position sensor 170 may be 0 mV~+30 mV.

When the output of the hall sensor 61 of the first position sensor 170 is plotted on the x-y coordinate system, the reason why the output range of the hall sensor 61 of the position sensor 170 is represented in the first quadrant (for example, 0 mV~+30 mV) is as follows.

Because the output of the hall sensor 61 in the first quadrant of the x-y coordinate system and the output of the hall sensor 61 in the third quadrant of the x-y coordinate system move in opposite directions depending on variation in ambient temperature, the accuracy and reliability of the hall sensor may decrease when both the first and third quadrant are used as AF operation control zones. Accordingly, in order to accurately compensate for variation in ambient temperature, a specific range in the first quadrant may be considered to be the output range of the hall sensor 61 of the first position sensor 170.

The first position sensor 170 may include the first to fourth terminals for the two power signals VDD and GND, the clock signal SCL and the data SDA, and the fifth and sixth terminals for providing drive signals to the first coil 120.

Each of the first to fourth terminals of the first position sensor 170 may be conductively connected to a corresponding one of the first to fourth terminals B1 to B4 of the circuit board 190, and each of the fifth and sixth terminals of the first position sensor 170 may be conductively connected to a corresponding one of the fifth and sixth terminals B5 and B6 of the circuit board 190.

In another embodiment, the first position sensor 170 may be embodied as only a single position-detecting sensor, such as a hall sensor.

The first to fourth terminals B1 to B4 of the circuit board 190 may be conductively connected to the terminals 251-1 to 251-$n$ (n being a natural number greater than 1 (n>1)) via the upper elastic units 150-1 to 150-4 and the support members 220-1 to 220-4, whereby the first position sensor 170 may be conductively connected to the terminals 251-1 to 251-$n$ (n=4) of the circuit board 250.

The fifth and sixth terminals B5 and B6 of the circuit board 190 may be coupled to the lower elastic units 160-1 and 160-2, and the first position sensor 170 may be conductively connected to the first coil 120 via the lower elastic units 160-1 and 160-2.

For example, the fifth terminal B5 of the circuit board 190 may be coupled to the first lower elastic unit 160-1, and the sixth terminal B6 of the circuit board 190 may be coupled to the second lower elastic unit 160-2.

Next, the upper elastic member 150, the lower elastic member 160 and the support member 220 will be described.

Figure 8:
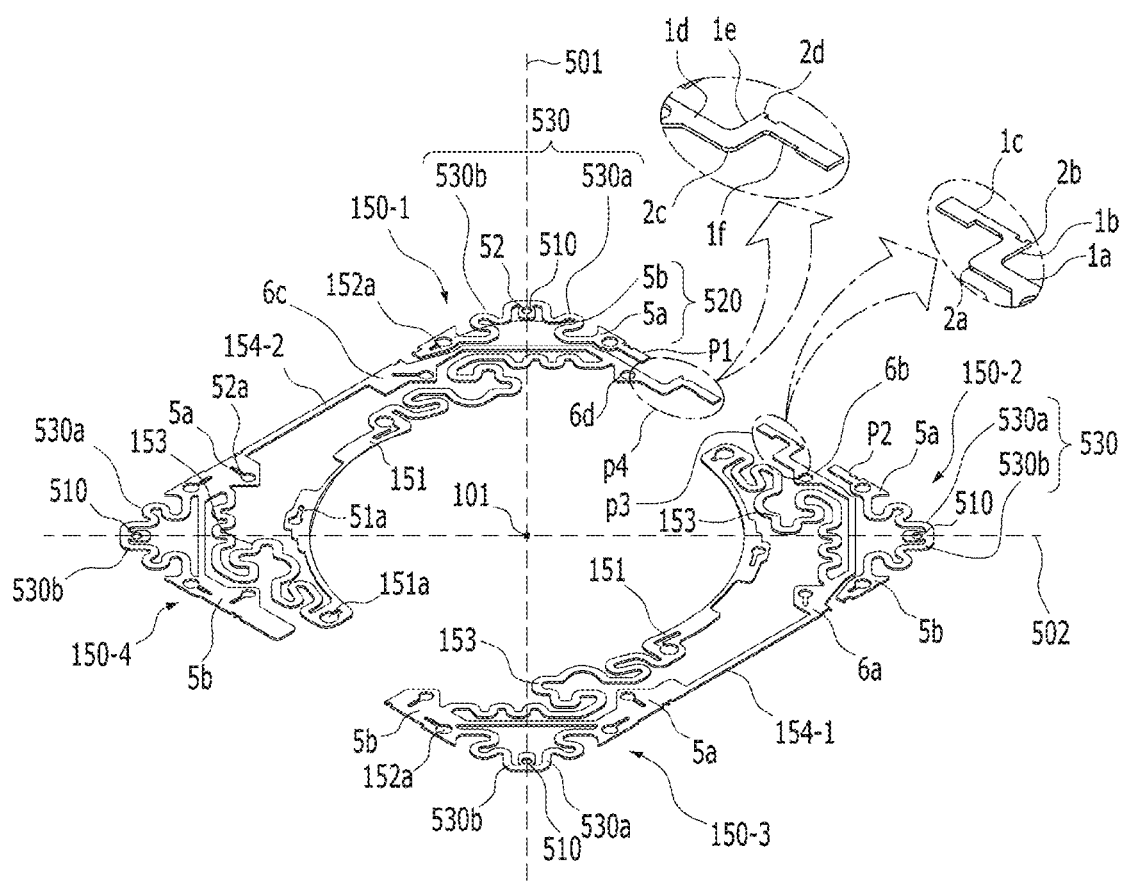
FIG. 8 is a view illustrating the upper elastic member shown in FIG. 1.
Figure 9:
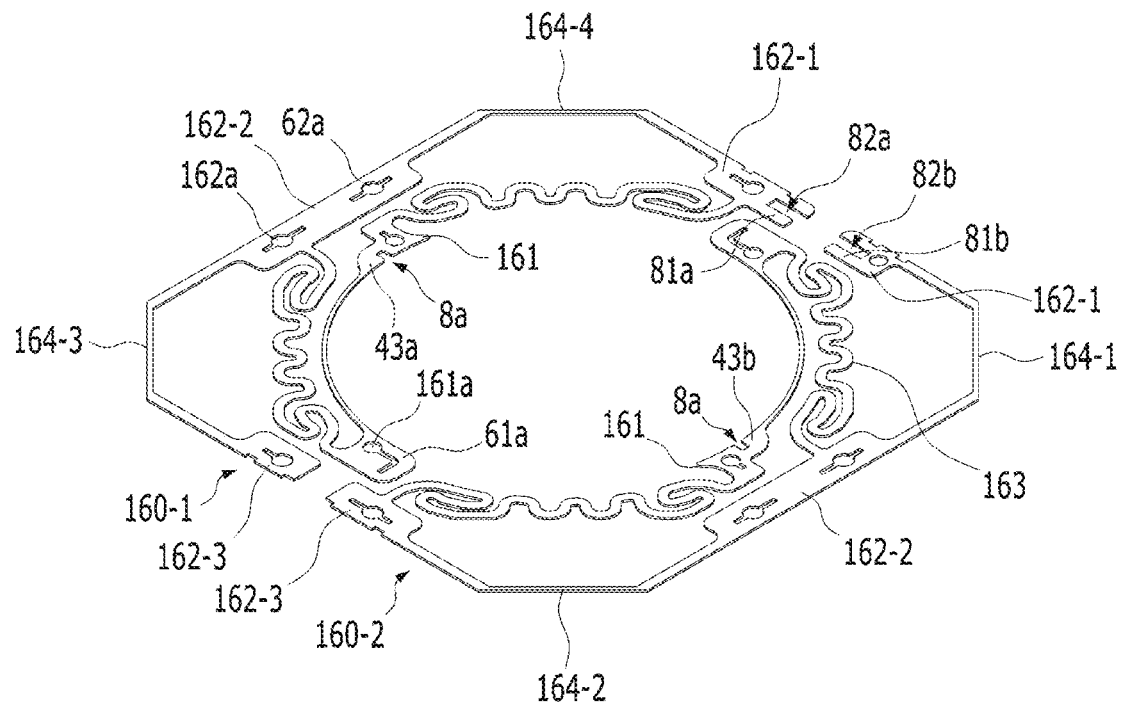
FIG. 9 is a view illustrating the lower elastic member shown in FIG. 1.
Figure 10:
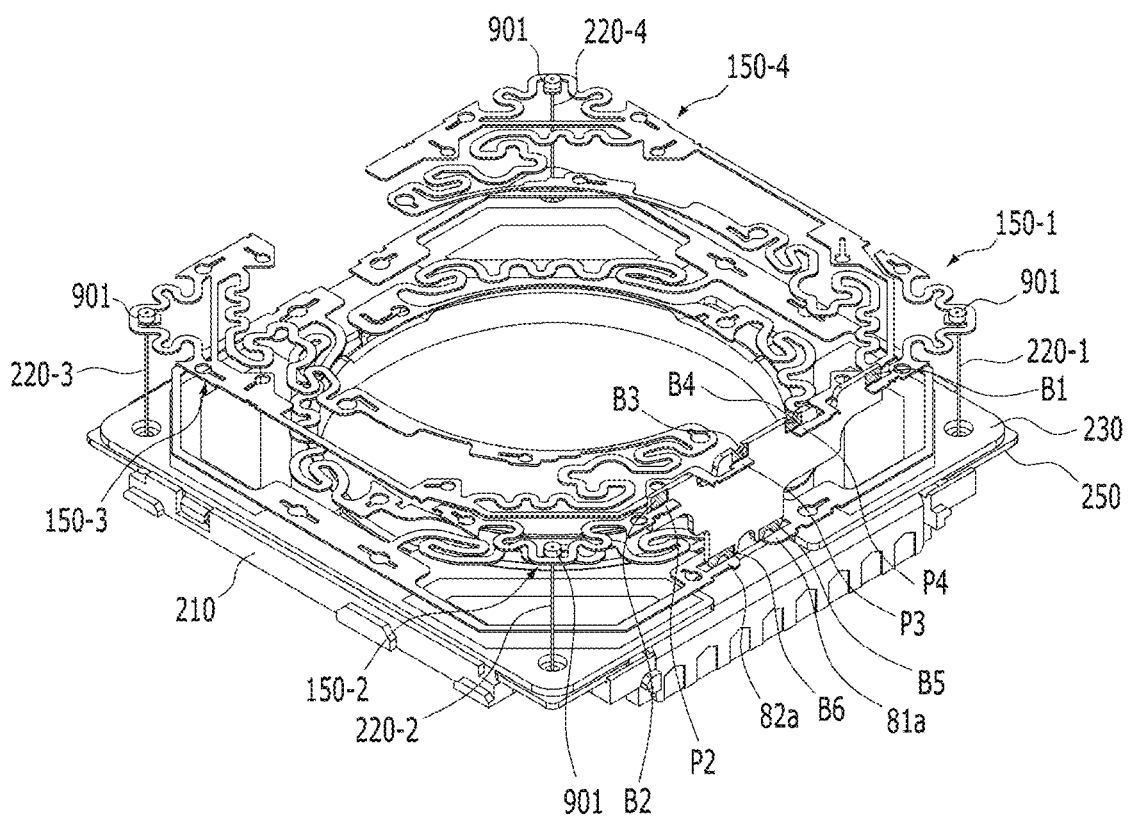
FIG. 10 is an assembled perspective view of the upper elastic member, the lower elastic member, the base, the support member, the second coil and the circuit board.
Figure 11:
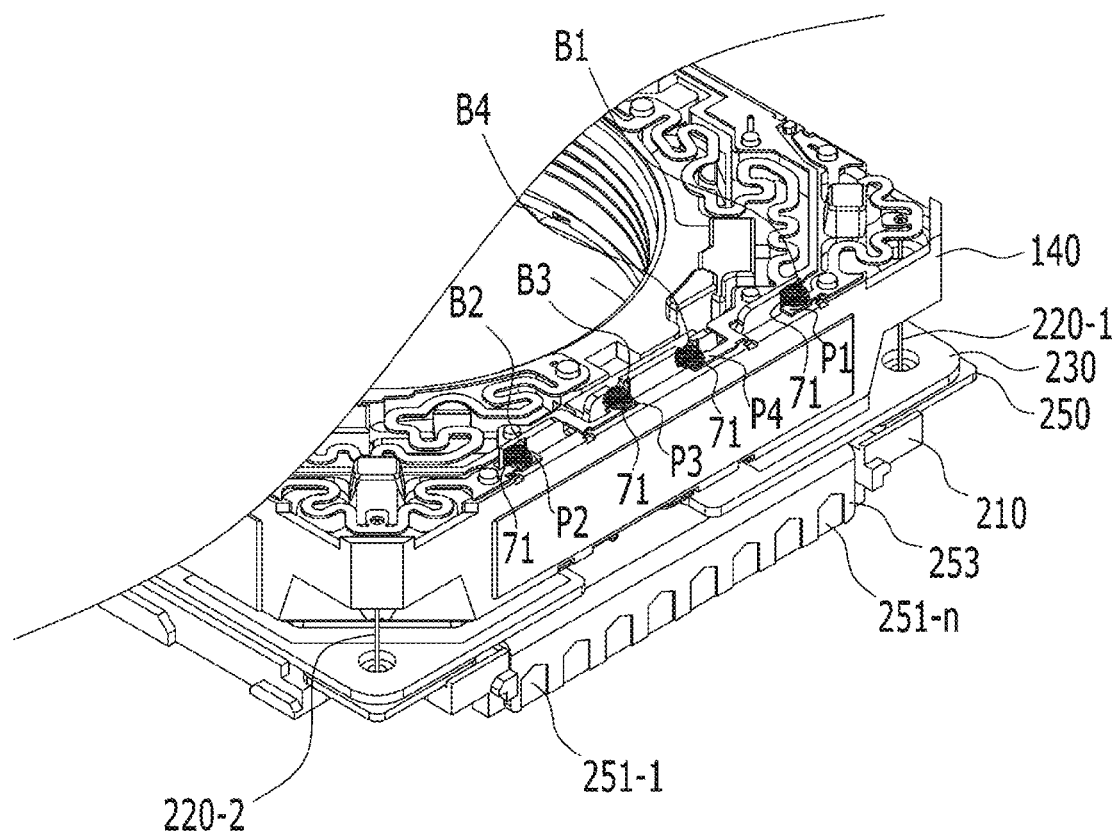
FIG. 11 is a view illustrating the coupling relationship between the first to fourth terminals of the circuit board and the upper elastic units.
Figure 12:
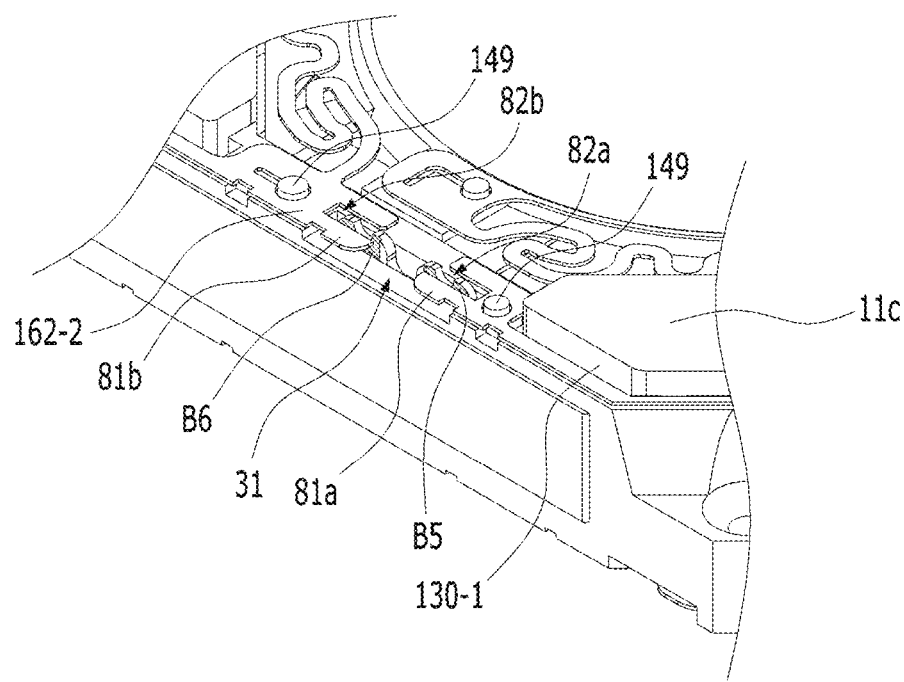
FIG. 12 is a bottom view of the fifth and sixth terminals of the circuit board and the lower elastic units.
Figure 13:
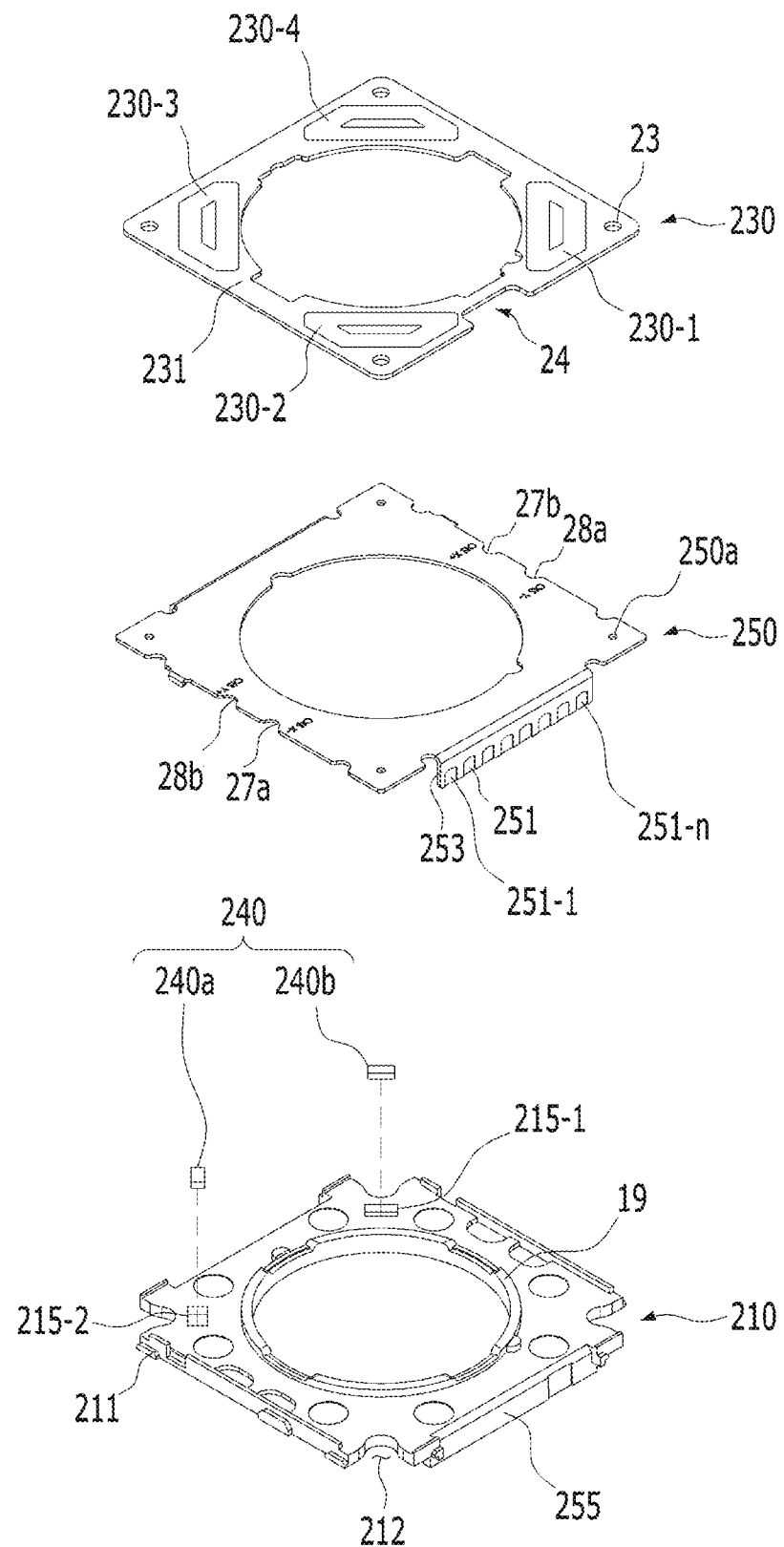
FIG. 13 is an exploded perspective view of the second coil, the circuit board, the base, and the second position sensor.
Figure 14:
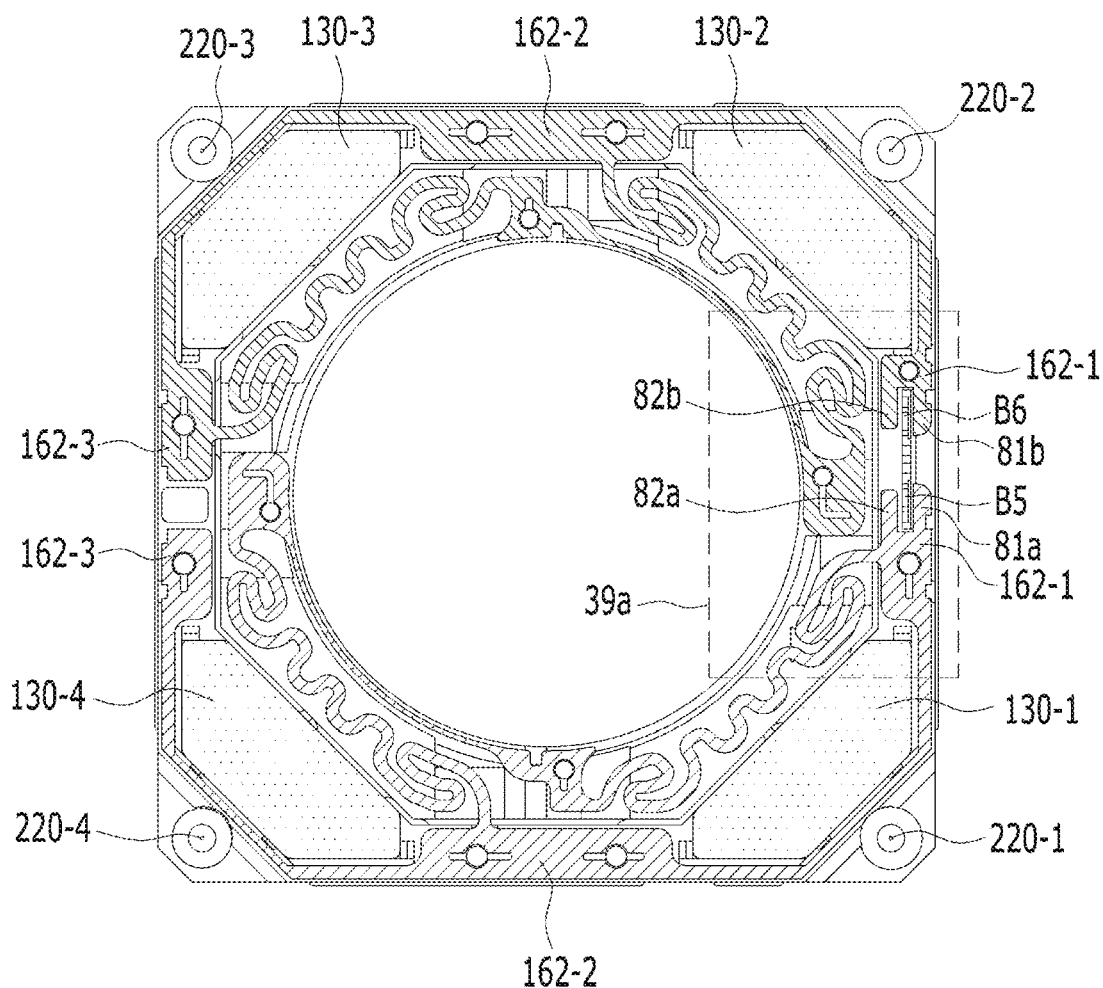
FIG. 14 is a bottom view of the housing, the first magnet, the lower elastic member, and the circuit board.

FIG. 8 is a view illustrating the upper elastic member 150 shown in FIG. 1. FIG. 9 is a view illustrating the lower elastic member 160 shown in FIG. 1. FIG. 10 is an assembled perspective view of the upper elastic member 150, the lower elastic member 160, the base 210, the support member 220, the second coil 230, and the circuit board 250. FIG. 11 is a view illustrating the coupling relationship between the first to fourth terminals B1 to B4 of the circuit board 190 and the upper elastic units 150-1 to 150-4. FIG. 12 is a bottom view of the fifth and sixth terminals B5 and B6 of the circuit board 190 and the lower elastic units 160-1 and 160-2. FIG. 13 is an exploded perspective view of the second coil 230, the circuit board 250, the base 210, and the second position sensor 240. FIG. 14 is a bottom view of the housing 140, the first magnet 130, the lower elastic member 160 and the circuit board 190. FIG. 12 is a perspective view of the dotted area 39a in FIG. 14.

Referring to FIGS. 8 to 14, the upper elastic member 150 and the lower elastic member 160 may be coupled both to the bobbin 110 and to the housing 140 so as to support the bobbin 110.

The upper elastic member 150 may be coupled to the upper portion, the upper end or the upper surface of the bobbin 110, and the lower elastic member 160 may be coupled to the lower portion, the lower end or the lower surface of the bobbin 110.

The upper elastic member 150 and the lower elastic member 160 may elastically support the bobbin 110 with respect to the housing 140.

The support member 220 may support the housing 140 so as to allow the housing 140 to be moved in a direction perpendicular to the optical axis, and may conductively connect at least one of the upper and lower elastic members 150 and 160 to the circuit board 250.

Referring to FIG. 8, the upper elastic member 150 may include a plurality of upper elastic units 150-1 to 150-4, which are conductively isolated from each other. Although FIG. 10 illustrates four upper elastic units, which are conductively isolated from each other, the number of upper elastic units is not limited thereto, and may be three or more.

The upper elastic member 150 may include the first to fourth upper elastic units 150-1 to 150-4, which are directly bonded and thus conductively connected to the first to fourth terminals B1 to B4 of the circuit board 190.

A portion of each of the plurality of upper elastic units may be disposed on the first side portion 141-1 of the housing 140, at which the circuit board 190 is disposed, and at least one upper elastic unit may be disposed on each of the remaining second to fourth side portions 141-2 to 141-4, other than the first side portion 141-1 of the housing 140.

Each of the first to fourth upper elastic units 150-1 to 150-4 may include the first outer frame 152 coupled to the housing 140.

At least one of the first to fourth upper elastic units 150-1 to 150-4 may further include the first inner frame 151, coupled to the bobbin 110, and the first frame connector 153, connecting the first inner frame 151 to the first outer frame 152.

In the embodiment shown in FIG. 8, although each of the first and second upper elastic units 150-1 and 150-2 may include only the first outer frame, without comprising the first inner frame and the first frame connector, and each of the first and second upper elastic units 150-1 and 150-2 may be spaced apart from the bobbin 110, the disclosure is not limited thereto.

Although each of the third and fourth upper elastic units 150-3 and 150-4 may include the first inner frame 151, the first outer frame, and the first frame connector 153, the disclosure is not limited thereto.

For example, although each of the first inner frames 151 of the third and fourth upper elastic units 150-3 and 150-4 may be provided with a hole 151a coupled to the first coupler 113 of the bobbin 110, the disclosure is not limited thereto. For example, the hole 152a in the first inner frame 151 may have at least one slit 51a, through which an adhesive member enters, between the first coupler 113 and the hole 151a.

Each of the first outer frames 152 of the first to fourth upper elastic members 150-1 to 150-4 may have therein a hole 152a coupled to the first coupler 143 of the housing 140.

The first outer frame 151 of each of the first to fourth upper elastic units 150-1 to 150-4 may include a body portion coupled to the housing 140, and connecting terminals P1 to P4, which are connected to a corresponding one of the first to fourth terminals B1 to B4 of the circuit board 190. Here, the connecting terminals P1 to P4 may be alternatively referred to as "extension portions".

The first outer frame 151 of each of the first to fourth upper elastic units 150-1 to 150-4 may include a first coupler 520 coupled to the housing 140, a second coupler 510 coupled to a corresponding one of the support members 220-1 to 220-4, a connector 530 connecting the first coupler 520 to the second coupler 510, and the extension portions P1 to P4, which are connected to the second coupler 510 and extend to the first side portion 141-1 of the housing 140.

The body portion of each of the first to fourth upper elastic units 150-1 to 150-4 may include the first coupler 520. The body portion of each of the first to fourth upper elastic units 150-1 to 150-4 may further include at least one of the second coupler 510 and the connector 530.

For example, using solder or a conductive adhesive member, one end of the first support member 220-1 may be coupled to the second coupler 510 of the first upper elastic unit 150-1, and one end of the second support member 220-2 may be coupled to the second coupler 510 of the second upper elastic unit 150-1. Furthermore, one end of the third support member 220-3 may be coupled to the second coupler 510 of the third upper elastic unit 150-3, and one end of the fourth support member 220-4 may be coupled to the second coupler 510 of the fourth upper elastic unit 150-4.

The second coupler 510 may have a hole 52 through which a corresponding one of the support members 220-1 to 220-4 extends. The one end of the corresponding one of the support members 220-1 to 220-4, which has passed through the hole 52, may be directly coupled to the second coupler 510 via a conductive adhesive member or solder 910 (see FIG. 10) and the second coupler 510 and the support members 220-1 to 220-4 may be conductively connected to each other.

For example, the second coupler 510, which is a region in which the solder 910 is disposed for coupling to the support members 220-1 to 220-4, may include the hole 52 and a region near the hole 52.

The first coupler 520 may include at least one coupling region (for example, 5a or 5b) coupled to the housing (for example, the corner portions 142-1 to 142-4).

For example, the coupling region (for example, 5a or 5b) of the first coupler 520 may have at least one hole 152a coupled to the first coupler 143 of the housing 140.

For example, each of the coupling regions 5a and 5b may have therein at least one hole, and each of the corner portions 142-1 to 142-4 of the housing 140 may be correspondingly provided with at least one first coupler.

For example, in order to support the housing 140 in an equilibrium state, although the coupling regions 5a and 5b of the first coupler 520 of the first to fourth upper elastic units 150-1 to 150-4 may be symmetrically disposed with respect to reference lines (for example, 501 and 502), the disclosure is not limited thereto.

Furthermore, although the first couplers 143 of the housing 140 may be symmetrically disposed with respect to the reference lines (for example, 501 and 502) and may be provided such that two are located on each side of each of the reference lines, the number thereof is not limited thereto.

Each of the reference lines 501 and 502 may be a line that extends between the central point 101 and one of the corners of the corner portions 142-1 to 142-4 of the housing 140. For example, each of the reference lines 501 and 502 may be a line that extends through the central point 101 and two corners, which face each other in a diagonal direction of the housing 140, among the corners of the corner portions 142-1 to 142-4 of the housing 140.

Here, the central point 102 may be the center of the housing 140, the center of the bobbin 110, or the center of the upper elastic member 150. For example, the corner of each of the corner portions of the housing 140 may be a corner that is aligned with or corresponds to the center of a corresponding one of the corner portions of the housing 140.

In the embodiment shown in FIG. 8, although each of the coupling regions 5a and 5b of the first couplers 520 is embodied as having the hole 152a therein, the disclosure is not limited thereto. In another embodiment, each of the coupling regions may be embodied as having various shapes, for example, a groove shape, suitable for coupling to the housing 140.

For example, the hole 152a in the first coupler 520 may have at least one slit 52a through which an adhesive member infiltrates between the first coupler 143 of the housing 140 and the hole 152a.

The connector 530 may connect the second coupler 510 to the first coupler 520.

For example, the connector 530 may connect the second coupler 510 to the coupling regions 5a and 5b of the first coupler 520.

For example, the connector 530 may include a first connector 530a, connecting the first coupling region 5a of the first coupler 520 of each of the first to fourth upper elastic units 150-1 to 150-4 to the second coupler 510, and a second connector 530b, connecting the second coupling region 5b of the first coupler 520 to the second coupler 510.

For example, although the first outer frame 151 may include a connecting region directly connecting the first coupling region 5a to the second coupling region 5b, the disclosure is not limited thereto.

Although each of the first and second connectors 530a and 530b may include a bent portion, which is bent at least once, or a curved portion, which is curved at least once, the disclosure is not limited thereto. In another embodiment, each of the first and second connectors 530a and 530b may be linear.

The width of the connector 530 may be less than the width (or the diameter) of the first coupler 520. Furthermore, the width of the connector 530 may be less than the width (or the diameter) of the second coupler 510. In another embodiment, the width of the connector 530 may be equal to the width of the first coupler 520, and may be equal to the width (or the diameter) of the second coupler 510.

For example, the first couplers 520 may be in contact with the upper surfaces of the corner portions 142-1 to 142-4 of the housing 140, and may be supported thereby. For example, the connector 530 may not be supported by the upper surface of the housing 140, and may be spaced apart from the housing 140. Furthermore, in order to inhibit oscillation caused by vibration, the space between the connector 530 and the housing 140 may be filled with a damper (not shown).

The width of each of the first and second connectors 530a and 530b may be less than the width of the first coupler 520, thereby allowing the connector 530 to be easily moved in the first direction. Consequently, it is possible to distribute the stress applied to the upper elastic units 150-1 to 150-4 and the stress applied to the support members 220-1 to 220-4.

Each of the first and second extension portions P1 and P2 of the first outer frames of the first and second upper elastic units 150-1 and 150-2 may extend toward a corresponding one of the first and second terminals B1 and B2 of the circuit board 190, which are positioned at the first side portion 141-1 of the housing 140, from the first coupler 520 (for example, the first coupling region 5*a*).

The first coupler 520 of the third upper elastic unit 150-3 may further include at least one coupling region 6*a*, 6*b* connected to at least one of the fourth side portion 141-4 and the second corner portion 142-2 of the housing 140.

The first coupler 520 of the fourth upper elastic unit 150-4 may further include at least one coupling region 6*c*, 6*d* connected to at least one of the second side portion 141-2 and the first corner portion 142-1 of the housing 140.

Each of the third and fourth extension portions P3 and P4 of the first outer frames of the third and fourth upper elastic units 150-3 and 150-4 may extend toward a corresponding one of the third and fourth terminals B3 and B4 of the circuit board 190, which are positioned at the first side portion 141-1 of the housing 140, from the first coupler 520 (for example, the coupling region 6*b*, 6*d*).

One end of each of the first to fourth extension portions P1 to P4 may be coupled to a corresponding one of the first to fourth terminals B1 to B4 of the circuit board 190 via solder or a conductive adhesive member.

Each of the first and second extension portions P1 and P2 may have a linear shape.

In order to facilitate coupling to a corresponding one of the third and fourth terminals B3 and B4 of the circuit board 190, each of the third and fourth extension portions P3 and P4 may include a bent or curved portion.

The first outer frame of the third upper elastic unit 150-3 may further include a first extension frame 154-1, which is connected both to the first coupler 520 and to the extension portion P3 and is positioned at the fourth side portion 141-4 and the fourth corner portion 142-4 of the housing 140.

In order to increase the coupling force between the first extension frame 154-1 and the housing 140 to thus inhibit the third upper elastic unit 150-3 from being lifted, the first extension frame 154-1 may include at least one coupling region 6*a*, 6*b* coupled to the housing 140, and each of the coupling regions 6*a* and 6*b* may have a hole for coupling to the first coupler 143.

The first outer frame of the fourth upper elastic unit 150-4 may further include a second extension frame 154-2, which is connected both to the first coupler 520 and to the extension portion P4 and is positioned at the second side portion 141-2 and the first corner portion 142-1 of the housing 140.

In order to increase the coupling force between the second extension frame 154-2 and the housing 140 and thus to inhibit the fourth upper elastic unit 150-4 from being lifted, the second extension frame 154-2 may include at least one coupling region 6*c*, 6*d* coupled to the housing 140, and each of the coupling regions 6*c* and 6*d* may have a hole for coupling to the first coupler 143 of the housing 140.

Although each of the third upper elastic unit 150-3 and the fourth upper elastic unit 150-4 includes two first frame connectors in FIG. 8, the disclosure is not limited thereto. The number of first frame connectors may be one, or three or more.

As described above, each of the first to fourth upper elastic units may include the extension portions P1 to P4 disposed on the first side portion 141-1 of the housing 140. By virtue of the extension portions P1 to P4, the upper elastic units 150-1 to 150-4 may be easily coupled to the first to fourth terminals B1 to B4 provided at the body part S1 of the circuit board 190.

Because the four terminals B1 to B4 provided at the body part S1 of the circuit board 190 disposed on the first side portion 141-1 of the housing 140 are conductively and directly connected to the first to fourth upper elastic units 150-1 to 150-4, a portion of the first outer frame 151 of each of the first to fourth upper elastic units 150-1 to 150-4 may be disposed on the first side portion 141-1 of the housing 140.

Each of the upper elastic units 150-1 to 150-4 may be disposed on a corresponding one of the corner portions 142-1 to 142-4 of the housing 140, and may include the extension portion P1 to P4 extending to the first side portion 141-1 of the housing 140.

Each of the extension portions P1 to P4 of each of the upper elastic units 150-1 to 150-4 may be directly coupled to a corresponding one of the four terminals B1 to B4 provided at the body part S1 of the circuit board 190 via a conductive adhesive member 71 such as solder.

The first outer frame 151 of the first upper elastic unit 150-1 may be disposed on the first corner portion 142-1 of the housing 140, and the first outer frame 151 of the second upper elastic unit 150-2 may be disposed on the second corner portion 142-2 of the housing 140. The first outer frame 151 of the third upper elastic unit 150-3 may be disposed on the third corner portion 142-3 of the housing 140, and the first outer frame 151 of the fourth upper elastic unit 150-4 may be disposed on the fourth corner portion 142-4 of the housing 140.

A portion of the third upper elastic unit 150-3 may be disposed in the first groove 90*a* in the first circuit board 190, and the end of the portion of the third upper elastic unit 150-3 may be coupled to the third terminal B3 of the circuit board 190.

A portion of the fourth upper elastic unit 150-4 may be disposed in the second groove 90*b* in the first circuit board 190, and the end of the portion of the fourth upper elastic unit 150-4 may be coupled to the fourth terminal B4 of the circuit board 190.

The third extension portion P3 of the third upper elastic unit 150-3 may extend toward the third terminal B3 of the circuit board 190 through the first groove 90*a* in the circuit board 190, and may be bent at least twice.

The fourth extension portion P4 of the fourth upper elastic unit 150-4 may extend toward the fourth terminal B4 of the circuit board 190 through the second groove 90*b* in the circuit board 190, and may be bent at least twice.

The third extension portion (or "third connecting terminal") P3 of the third upper elastic unit 150-3 may include at least two bent regions 2*a* and 2*b*.

For example, the third extension portion P3 of the third upper elastic unit 150-3 may include a first portion 1*a* extending from the first coupler 520 (for example, the coupling region 6*b*) of the third upper elastic unit 150-3, the first bent region (or "first bent portion") 2*a* bent at the first portion 1*a*, a second portion 1*b* extending from the first bent region 2*a*, the second bent region (or "second bent portion") 2*b* bent at the second portion 1*b*, and a third portion 1*c* extending toward the third terminal B3 from the second bent region 2*b*.

For example, the second portion 1*b* of the third extension portion (or the third connecting terminal) P3 may be bent at the first portion 1*a*, and the third portion 1*c* may be bent at the second portion 1*b*.

The second portion 1*b* of the third extension portion P3 may be disposed between the first bent region 2*a* and the second bent region 2*b*, and may connect the first and second bent regions 2*a* and 2*b* to each other.

For example, each of the first portion 1*a* and the third portion 1*c* of the third extension portion P3 may extend toward the first corner portion 141-1 from the second corner portion 142-2 of the housing 140. For example, the second portion 1b of the third extension portion P3 may extend toward the outer surface from the inner surface of the housing 140.

A portion (for example, the second portion 1b) of the third extension portion P3 of the third upper elastic unit 150-3 may be positioned in the first groove 90a in the circuit board 190, or may extend through the first groove 90a.

The fourth extension portion (or "fourth connecting terminal") P4 of the fourth upper elastic unit 150-4 may include at least two bent regions 2c and 2d.

For example, the fourth extension portion P4 of the fourth upper elastic unit 150-4 may include a fourth portion 1d extending from a first coupler 520 (for example, the coupling region 6d) of the fourth upper elastic unit 150-4, the third bent region (or "third bent portion") 2c bent at the fourth portion 1d, a fifth portion 1e extending from the third bent region 2c, the fourth bent region (or "fourth bent portion") 2d bent at the fifth portion 1e, and a sixth portion 1f extending toward the fourth terminal B4 from the fourth bent region 2d.

For example, the fifth portion 1e of the fourth extension portion (or the fourth connecting terminal) P4 may be bent at the fourth portion 1d, and the sixth portion 1f may be bent at the fifth portion 1e.

The fifth portion 1e of the fourth extension portion P4 may be disposed between the third bent region 2c and the fourth bent region 2d so as to connect the third and fourth bent regions 2c and 2d to each other.

For example, each of the fourth portion 1d and the sixth portion if of the fourth extension portion P4 may extend toward the second corner portion 141-2 from the first corner portion 142-1 of the housing 140. For example, the fifth portion 1e of the fourth extension portion P4 may extend toward the outer surface from the inner surface of the housing 140.

A portion (for example, the fifth portion 1e) of the fourth extension portion P4 of the fourth elastic unit may be positioned in the second groove 90b in the circuit board 190, or may extend through the second groove 90b.

Referring to FIG. 9, the lower elastic member 160 may include a plurality of lower elastic units 160-1 and 160-2.

For example, each of the first and second lower elastic units 160-1 and 160-2 may include the second inner frame 161 coupled or fixed to the lower portion, the lower surface or the lower end of the bobbin 110, the second outer frames 162-1 to 162-3 coupled or fixed to the lower portion, the lower surface or the lower end of the housing 140, and the second frame connector 163 connecting the second inner frame 161 to the second outer frames 162-1 to 162-3.

The second inner frame 161 may have therein a hole 161a for coupling to the second coupler 117 of the bobbin 110, and the second outer frames 162-1 to 162-3 may have therein holes 162a for coupling to the second coupler 149 of the housing 140.

For example, although each of the first and second lower elastic units 160-1 and 160-2 may include three second outer frames 162-1 to 162-3 and two second frame connectors 163, which are coupled to the housing 140, the disclosure is not limited thereto. In another embodiment, each of the first and second lower elastic units may include at least one second outer frame and at least one second frame connector.

Each of the first and second lower elastic units 160-1 and 160-2 may include connecting frames 164-1 and 164-2, which connect the second outer frames 162-1 and 162-3 to each other.

Although the width of each of the connecting frames 164-1 and 164-2 may be less than the widths of the second outer frames 162-1 to 162-3, the disclosure is not limited thereto.

In order to avoid spatial interference with the second coil 230 and the first magnet 130, the connecting frames 164-1 and 164-2 may be positioned outside the coil units 230-1 to 230-4 of the second coil 230 and the magnets 130-1 to 130-4.

Here, the outside of the coil units 230-1 to 230-4 of the second coil 230 and the magnets 130-1 to 130-4 may be the side opposite the center of the bobbin 110 or the housing 140 with respect to the coil units 230-1 to 230-4 and the magnets 130-1 to 130-4.

For example, although the connecting frames 164-1 and 164-2 may be positioned so as not to overlap the coil units 230-1 to 230-4 and/or the magnets 130-1 to 130-4 in the optical-axis direction, the disclosure is not limited thereto. In another embodiment, at least portions of the connecting frames 164-1 and 164-2 may be aligned with or overlap the coil units 230-1 to 230-4 and/or the magnets 130-1 to 130-4 in the optical-axis direction.

Each of the upper elastic units 150-1 to 150-4 and the upper elastic units 160-1 and 160-2 may be embodied as a leaf spring. However, the upper elastic unit is not limited thereto, and may be embodied as a coil spring or the like. The above-mentioned elastic unit (for example, 150 or 160) may be alternatively referred to as a "spring", and the outer frame (for example, 152 or 162) may be alternatively referred to as an "outer portion". Furthermore, the inner frame (for example, 151 or 161) may be alternatively referred to as an inner portion, and the support member (for example, 220) may be alternatively referred to as a wire.

Next, the support member 220 will be described.

The support member 220 may include a plurality of support members 220-1 to 220-4.

The support members 220-1 to 220-4 may be disposed on the corner portions 142-1 to 142-4 of the housing 140 so as to conductively connect the upper elastic units 150-1 to 150-4 to the circuit board 250.

Each of the support members 220-1 to 220-4 may be coupled to a corresponding one of first to fourth upper elastic units 150-1 to 150-4. Each of the support members 220-1 to 220-4 may conductively connect a corresponding one of the first to fourth upper elastic units 150-1 to 150-4 to a corresponding one of the terminals 251-1 to 251-n (n=4) of the circuit board 250.

The support members 220-1 to 220-4 may be spaced apart from the housing 140, rather than being fixed to the housing 140. One end of each of the support members 220-1 to 220-4 may be directly connected or coupled to the second coupler 510 of a corresponding one of the upper elastic units 150-1 to 150-4 via solder 901.

Although the other ends of the support members 220-1 to 220-4 may be directly connected or coupled to the circuit board 250, the disclosure is not limited thereto.

Each of the support members 220-1 to 220-4 may be disposed on a corresponding one of the corner portions 142-1 to 142-4 of the housing 140.

For example, although the support members 220-1 to 220-4 may extend through the holes 147 formed in the corner portions 142-1 to 142-4 of the housing 140, the disclosure is not limited thereto. In another embodiment, the support members may be disposed adjacent to the boundary line between the side portions 141-1 to 141-4 and the corner portions 142-1 to 142-4 of the housing 140, and may not extend through the corner portions 142-1 to 142-4 of the housing 140.

Each of the coil units 120-1 to 120-4 of the first coil 120 may be directly connected or coupled to a corresponding one of the second inner frames of the first and second lower elastic units 160-1 and 160-2.

For example, the second inner frame 161 of the first lower elastic unit 160-1 may include a first bonding portion 43a coupled to one end of the first coil 120, and the second inner frame 161 of the second lower elastic unit 160-2 may include a second bonding portion 43b coupled to the other end of the first coil 120. Each of the first and second bonding portions 43a and 43b may have a groove 8a for guiding the coil 120.

The first support member 220-1 may be disposed on the first corner portion 142-1 of the housing 140, and may be coupled to the second coupler 510 of the first upper elastic unit 150-1.

The second support member 220-2 may be disposed on the second corner portion 142-2 of the housing 140, and may be coupled to the second coupler 510 of the second upper elastic unit 150-2.

The third support member 220-3 may be disposed on the third corner portion 142-3 of the housing 140, and may be coupled to the second coupler 510 of the third upper elastic unit 150-3.

The fourth support member 220-4 may be disposed on the fourth corner portion 142-4 of the housing 140, and may be coupled to the second coupler 510 of the fourth upper elastic unit 150-4.

The first terminal B1 of the circuit board 190 may be conductively connected to the first support member 220-1, and the second terminal B2 of the circuit board 190 may be conductively connected to the second support member 220-2. The third terminal B3 of the circuit board 190 may be conductively connected to the third support member 220-3, and the fourth terminal B4 of the circuit board 190 may be conductively connected to the fourth support member 220-4.

Each of the first to fourth support members 220-1 to 220-4 may be conductively connected to a corresponding one of the first to fourth terminals 251-1 to 151-$n$ (n=4) of the circuit board 250. The power signals VDD and GND, the clock signal SCL and the data signal SDA for the first position sensor 170 may be supplied through the first to fourth terminals 251-1 to 251-4 of the circuit board 250.

The power signals VDD and GND, the clock signal SCL and the data signal SDA may be supplied to the first position sensor 170 from the circuit board 250 through the first to fourth support members 220-1 to 220-4 and the first to fourth upper elastic units 150-1 to 150-4.

For example, the power signals VDD and GND may be supplied to the first and second support members 220-1 and 220-2 through the first and second terminals 251-1 and 251-2 of the circuit board 250.

The power signals VDD and GND may be supplied to the first and second terminals B1 and B2 of the circuit board 190 through the first and second support members 220-1 and 220-2 and the first and second upper elastic units 150-1 and 150-2. The first position sensor 170 may receive the power signals VDD and GND through the first and second terminals B1 and B2 of the circuit board 190.

For example, the first terminal B1 of the circuit board 190 may be one of a VDD terminal and a GND terminal, and the second terminal B2 of the circuit board 190 may be the other of the VDD terminal and the GND terminal.

Furthermore, the clock signal SCL and the data signal SDA may be supplied to the third and fourth support members 220-3 and 220-4 through the third and fourth terminals 251-3 and 251-4 of the circuit board 250. The clock signal SCL and the data signal SDA may be supplied to the third and fourth terminals B3 and B4 through the third and fourth support members 220-3 and 220-4 and the third and fourth upper elastic units 150-3 and 150-4. The first position sensor 170 may receive the clock signal SCL and the data signal SDA through the third and fourth terminals B3 and B4 of the circuit board 190.

For example, the power signal VDD may be supplied to the first position sensor 170 through the first terminal 251-1 of the circuit board 250, the first support member 220-1, the first upper elastic unit 150-1, and the first terminal B1 of the circuit board 190. The power signal GND may be supplied to the first position sensor 170 through the second terminal 251-2 of the circuit board 250, the second support member 220-2, the second upper elastic unit 150-2, and the second terminal B2 of the circuit board 190.

For example, the clock signal SCL may be supplied to the first position sensor 170 through the third terminal 251-3 of the circuit board 250, the third support member 220-3, the third upper elastic unit 150-3, and the third terminal B3 of the circuit board 190. The data signal SDA may be supplied to the first position sensor 170 through the fourth terminal 251-4 of the circuit board 250, the fourth support member 220-4, the fourth upper elastic unit 150-4, and the fourth terminal B4 of the circuit board 190.

Each of the fifth and sixth terminals B5 and B6 of the circuit board 190 may be connected or coupled to the second outer frame 162-1 of a corresponding one of the first and second lower elastic units 160-1 and 160-2.

The second outer frame 162-1 of the first lower elastic unit 160-1 may include a first bonding portion 81a, to which the fifth terminal B5 of the circuit board 190 is coupled via solder or a conductive adhesive member.

The second outer frame 162-1 of the second lower elastic unit 160-2 may include a second bonding portion 81b, to which the sixth terminal B6 is coupled via solder or a conductive adhesive member.

For example, the second outer frame 162-1 of the first lower elastic unit 160-1 may include a first hole (or a first groove) 82a, in which the fifth terminal B5 of the circuit board 190 is inserted or disposed, and the second outer frame 162-1 of the second lower elastic unit 160-2 may include a second hole (or a second groove) 82b, in which the sixth terminal B6 of the circuit board 190 is inserted or disposed.

For example, although each of the first and second holes 82a and 82b may be formed through the second outer frame 162-1 and may have an opening, which is open at one side of the second outer frame 162-1, the disclosure is not limited thereto. In another embodiment, each of the first and second holes 82a and 82 may not have the opening in one side of the second outer frame 162-1.

Since the fifth terminal B5 (or the sixth terminal B6) is coupled to the first bonding portion 81a (or the sixth bonding portion 81b), in which the first groove 82a (or the second groove 82b) is formed, in the state in which the fifth terminal B5 (or the sixth terminal B6) of the circuit board 190 is inserted into the first groove 82a (or the second groove 82b) in the second outer frame 162-1 of the first lower elastic unit 160-1, it is possible to increase the coupling area and thus to increase the coupling force and improve solderability between the terminal and the bonding portion.

Referring to FIG. 12, one end (for example, the lower end or the lower surface) of each of the fifth and sixth terminals B5 and B6 may be positioned lowered than the lower end or the lower surface of the second outer frame 162-1 of the first and second lower elastic units 160-1 and 160-2. Because FIG. 12 is a bottom view, the lower surface of each of the fifth and sixth terminals B5 and B6 may be shown as being positioned lower than the lower end or the lower surface of the second outer frame 162-1. The reason for this is to improve solderability between one end of each of the fifth and sixth terminals B5 and B6 and the first and second bonding portions 81a and 81b of the first and second lower elastic units 160-1 and 160-2.

Referring to FIG. 12, the housing 140 may have a groove 31, which is depressed from the lower surface of the first side portion 141-1. For example, the bottom surface of the groove 31 in the housing 140 may have a height difference with respect to the lower surface of the housing 140 in the optical-axis direction. For example, the bottom surface of the groove 31 in the housing 140 may be positioned higher than the lower surface of the housing 140.

The groove 31 in the housing 140 may overlap the first and second bonding portions 81a and 81b of the first and second lower elastic units 160-1 and 160-2 in the optical-axis direction.

Furthermore, the groove 31 in the housing 140 may overlap the holes 82a and 82b in the second outer frames 162-1 of the first and second lower elastic units 160-1 and 160-2 in the optical-axis direction.

By virtue of the groove 31 in the housing 140, it is possible to increase the surface area of the fifth and sixth terminals B5 and B6 that is exposed through the housing, and it is possible to ensure a space in which to seat solder or a conductive adhesive member. Consequently, it is possible to improve solderability and to reduce the distance that the solder projects downwards from the lower surface of the second outer frame 162-1, whereby it is possible to suppress or inhibit spatial interference with the second coil 230, the circuit board 250 or the base 210 disposed under the lower elastic unit.

Although the lower surface 11c of the first magnet 130 disposed in the seating portion 141a in the housing 140 may be positioned lower than the lower surface of the housing 140 and/or the lower surfaces of the second outer frames 162-1 to 162-3 of the first and second lower elastic units 160-1 and 160-2, the disclosure is not limited thereto. In another embodiment, the lower surface 11c of the first magnet 130 may have a height that is higher than or equal to the height of the lower surface of the housing 140.

In order to space the first magnet 130 apart from the second coil 230 and the circuit board 250, the other end of the support member 220 may be coupled to the circuit board 250 (or the circuit member 231) at a level lower than the lower surface 11c of the first magnet 130.

Each of the support members 220 may be embodied as a member that is conductive and offers elastic support, for example, a suspension wire, a leaf spring, or a coil spring. In another embodiment, the support members 220 may be integrally formed with the upper elastic member 150.

Next, the base 210, the circuit board 250, and the second coil 230 will be described.

Referring to FIG. 13, the base 210 may have a bore corresponding to the bore in the bobbin 110 and/or the bore in the housing 140, and may have a shape corresponding to or coinciding with that of the cover member 300, for example, a square shape. For example, the bore in the base 210 may be a through hole, which is formed through the base 210 in the optical-axis direction.

The base 210 may include a step 211, to which an adhesive is applied when the cover member 300 is secured to the base 210 via adhesion. Here, the step 211 may guide the side plate of the cover member 300, which is coupled to the upper side of the base, and the lower end of the side plate of the cover member 300 may be in contact with the step 211. The step 211 of the base 210 may be bonded or fixed to the lower end of the side plate of the cover member 300 via an adhesive or the like.

The region of the base 210 that faces the terminal member 253 at which terminals 151-1 to 251-n of the circuit board 250 are provided, may be provided with a support 255. The support 255 may support the terminal member 253 of the circuit board 250 at which the terminals 251-1 to 251-n of the circuit board 250 are formed.

The base 210 may have recesses 212 in corner regions thereof corresponding to the corners of the cover member 300. When the corners of the cover member 300 have projections, the projections of the cover member 300 may be coupled to the second recesses 212.

The upper surface of the base 210 may be provided with seating grooves 215-1 and 215-2 in which the second position sensors 240 are disposed. The lower surface of the base 210 may be provided with a seating portion (not shown) to which the filter 610 of the camera module 200 is mounted.

The upper surface of the base 210 around the bore may be provided with a projection 19, which is coupled to the bore in the circuit board 250 and the bore in the circuit member 231.

The second coil 230 may be disposed on the circuit board 250, and the OIS position sensors 240a and 240b may be disposed in the seating grooves 215-1 and 215-2 in the base 210 positioned under the circuit board 250.

The second position sensor 240 may include the first and second OIS position sensors 240a and 240b, and the OIS position sensors 240a and 240b may detect displacement of the OIS operation unit in a direction perpendicular to the optical axis. Here, the OIS operation unit may include the AF operation unit and the components mounted on the housing 140.

For example, the OIS operation unit may include the AF operation unit and the housing 140. In some embodiments, the OIS operation unit may further include the first magnet 130. For example, the AF operation unit may include the bobbin 110 and components that are mounted on the bobbin 110 and are moved therewith. For example, the AF operation unit may include the bobbin 110, as well as the lens (not shown), the first coil 120, the second magnet 180, and the third magnet 185, which are mounted on the bobbin 110.

The circuit board 250 may be disposed on the upper surface of the base 210, and may have therein the bore corresponding to the bore in the bobbin 110, the bore in the housing 140 and/or the bore in the base 210. The bore in the circuit board 250 may be a through hole.

The circuit board 250 may have a shape coinciding with or corresponding to the upper surface of the base 210, for example, a quadrilateral shape.

The circuit board 250 may include at least one terminal member 253, which is bent from the upper surface of the circuit board and which is provided with a plurality of terminals 251-1 to 251-n (n being a natural number) or pins to which electrical signals are supplied from the outside.

The second coil 230 may be disposed under the bobbin 110.

The second coil 230 may include the coil units 230-1 to 230-4, which respectively correspond to or face the magnets 130-1 to 130-4 disposed on the housing 140.

The coil units 230-1 to 230-4 of the second coil 230 may be disposed on the upper portion or the upper surface of the circuit board 250.

Each of the coil units 230-1 to 230-4 of the second coil 230 may be disposed so as to face or overlap a corresponding one of the magnets 130-1 to 130-4 disposed on the corner portions 142-1 to 142-4 of the housing 140 in the optical-axis direction.

For example, the second coil 230 may include the circuit member 231 and a plurality of coil units 230-1 to 230-4 formed at the circuit member 231. Here, the circuit board 231 may also be referred to as a "board", "circuit board", or "coil board".

For example, the four coil units may be disposed or formed at the corners or the corner regions of the polygonal (for example, rectangular) circuit board 231.

For example, although the second coil 230 may include two coil units 230-1 and 230-3, which face each other in a first horizontal direction (or in a first diagonal direction), and two coil units 230-2 and 230-4, which face each other in a second horizontal direction (or in a second diagonal direction), the disclosure is not limited thereto. For example, although the two coil units 230-1 and 230-3, which face each other in the first horizontal direction (or in the first diagonal direction), may be connected to each other in series, and the two coil units 230-2 and 230-4, which face each other in the second horizontal direction (or in the second diagonal direction), may be connected to each other in series, the disclosure is not limited thereto. In another embodiment, at least one of the coil units may be driven separately.

For example, the coil units 230-1 and 230-3 may be disposed on two corner regions of the circuit member 231, which face each other in the first diagonal direction of the circuit member 231, and the coil units 230-2 and 230-4 may be disposed on the other two corner regions, which face each other in the second diagonal direction of the circuit member 231. The first diagonal direction may be a direction perpendicular to the second diagonal direction.

In another embodiment, the second coil 230 may include only one coil unit in the first diagonal direction and only one coil unit in the second diagonal direction, or may include four or more coil units.

The second coil 230 may be provided with power or drive signals from the circuit board 250. For example, the two coil units 230-1 and 230-3, which are connected to each other in series, may be provided with a first drive signal, and the two coil units 230-2 and 230-4, which are connected to each other in series, may be provided with a second drive signal.

The power or drive signals supplied to the second coil 230 may be DC or AC signals, or may include both DC and AC components, and may be of a current type or a voltage type.

By virtue of the interaction between the magnets 130-1 to 130-4 and the second coil units 230-1 to 230-4, the housing 140 may be moved in the second direction and/or in the third direction, for example, in an x-axis direction and/or in a y-axis direction, thereby performing handshake correction.

The coil units 230-1 to 230-4 of the second coil 230 may be conductively connected to respective terminals 251-1 to 251-$n$ of the circuit board 250 in order to receive drive signals from the circuit board 250.

The circuit board 250 may include pads 27a, 27b, 28a and 28b, which are conductively connected to the coil units 230-1 to 230-4. Here, the pads 27a, 27b, 28a and 28b may be alternatively referred to as "terminals" or "bonding portions".

For example, the coil units 230-1 and 230-3, which are connected to each other in series, may be conductively connected at one end thereof to the first pad 28a of the circuit board 250, and may be conductively connected at the other end thereof to the second pad 28b of the circuit board 250.

Furthermore, for example, the coil units 230-2 and 230-4, which are connected to each other in series, may be conductively connected at one end thereof to the third pad 27a of the circuit board 250, and may be conductively connected at the other end thereof to the fourth pad 27b of the circuit board 250.

The first and second pads 28a and 28b of the circuit board 250 may be conductively connected to two corresponding terminals, among the terminals 251-1 to 251-$n$ of the circuit board 250, and the coil units 230-1 and 230-3, which are connected to each other in series via two corresponding terminals of the circuit board 250, may be provided with the first drive signal.

The third and fourth pads 27a and 27b of the circuit board 250 may be conductively connected to the other two corresponding terminals, among the terminals 251-1 to 251-$n$ of the circuit board 250, and the coil units 230-2 and 230-4, which are connected to each other in series via the other two corresponding terminals of the circuit board 250, may be provided with the second drive signal.

Although the coil units 230-1 to 230-4 are embodied so as to have a circuit pattern form, for example, an FP coil form formed at the circuit member 231, rather than the circuit board 250, the disclosure is not limited thereto. In another embodiment, the coil units 230-1 to 230-4 may be embodied so as to have a ring-shaped coil block form or a circuit pattern formed at the circuit board 250, for example, an FP coil form, without the circuit member 231.

The circuit member 231 may have an escape groove 24 for avoiding spatial interference with the fifth and sixth terminals B5 and B6 of the circuit board 190. The escape groove 24 may be formed in one side of the circuit member 231. For example, the escape groove 24 may be positioned between the first coil unit 230-1 and the second coil unit 230-2.

Although the circuit board 250 and the circuit board 231 are described as individual components, the disclosure is not limited thereto. In another embodiment, the circuit board 250 and the circuit member 231 may be collectively referred to as a "circuit member" or "board". In this case, the other ends of the support members may be coupled to the "circuit member (for example, the lower surface of the circuit member)".

In order to avoid spatial interference with the support member 220, the corners of the circuit member 231 may be provided therein with holes (for example, through holes) 23 through which the support members 220 extend. In another embodiment, the corners of the circuit member 231 may be provided therein with grooves in place of the through holes.

The first OIS position sensor 240a may overlap one of the two magnets 130-1 and 130-3, which face each other in the first diagonal direction. For example, the first OIS position sensor 240a may overlap the magnet 130-4 in the optical-axis direction.

The second OIS position sensor 240b may overlap one of the two magnets 130-2 and 130-4, which face each other in the second diagonal direction.

Each of the OIS position sensors 240a and 240b may be a Hall sensor, and any sensor may be used as the OIS position sensor, as long as it is capable of detecting the intensity of a magnetic field. For example, each of the OIS position sensors 240a and 240b may be embodied as a position-detecting sensor, such as a Hall sensor, alone, or may be embodied as a drive comprising a Hall sensor.

The terminal member 253 of the circuit board 250 may be provided with the terminals 251-1 to 251-n.

Via the plurality of terminals 251-1 to 251-n provided at the terminal member 253 of the circuit board 250, the signals SCL, SDA, VDD and GND for data communication with the first position sensor 190 may be transmitted and received, the drive signals may be supplied to the OIS position sensors 240a and 240b, and the signals output from the OIS position sensors 240a and 240b may be received and output to the outside.

In the embodiment, although the circuit board 250 may be an FPCB, the disclosure is not limited thereto, and the terminals of the circuit board 250 may be directly formed on the surface of the base 210 through surface electrode technology.

The circuit board 250 may have holes 250a through which the support members 220-1 to 220-4 extend. The positions and number of holes 250a may correspond to or coincide with the positions and number of the support members 220-1 to 220-4.

Although the support members 220-1 to 220-4 may be conductively connected to pads (or a circuit pattern) formed on the lower surface of the circuit board 250 through the holes 250a in the circuit board 250 via solder or a conductive adhesive member, the disclosure is not limited thereto.

In another embodiment, the circuit board 250 may not have holes formed therein, and the support members 220-1 to 220-4 may be conductively connected to a circuit pattern or to pads formed on the upper surface of the circuit board 250 via solder, a conductive adhesive member or the like.

In a further embodiment, the support members 220-1 to 220-4 may connect the upper elastic units 150-1 to 150-4 to the circuit member 231, and the circuit member 231 may be conductively connected to the circuit board 250.

Since the embodiment is constructed such that drive signals are directly supplied to the first coil 120 from the first position sensor 170, it is possible to reduce the number of support members and to simplify the conductive connecting structure, compared to the case in which drive signals are directly supplied to the first coil 120 via the circuit board 250.

Furthermore, since the first position sensor 170 is capable of being embodied as a drive IC capable of detecting temperature, it is possible to improve the accuracy of AF operation, regardless of temperature variation, by compensating the output of the hall sensor so as to minimize a change thereof in response to variation in temperature or by compensating the output of the Hall sensor so as to change linearly with changes in temperature.

The cover member 300 may accommodate the bobbin 110, the first coil 120, the magnet 130, the housing 140, the upper elastic member 150, the lower elastic member 160, the first position sensor 170, the second magnet 180, the circuit board 190, the support member 220, the second coil 230, the second position sensor 240 and the circuit board 150 in the space defined between the cover member 300 and the base 210.

The cover member 300 may be configured to have a box shape, which is open at the lower face thereof and includes the upper plate and the side plates. The lower portion of the cover member 300 may be coupled to the upper portion of the base 210. The upper plate of the cover member 300 may have a polygonal shape, for example, a square shape, an octagonal shape, or the like.

The cover member 300 may have a bore, which exposes a lens (not shown) coupled to the bobbin 110 to external light. Although the cover member 300 may be made of made of a nonmagnetic material such as stainless steel so as to inhibit a phenomenon in which the cover member 300 is attracted to the first magnet 130, the disclosure is not limited thereto. The cover member 300 may also be made of a magnetic material so as to serve as a yoke for increasing the electromagnetic force between the first coil 120 and the first magnet 130.

Figure 16:
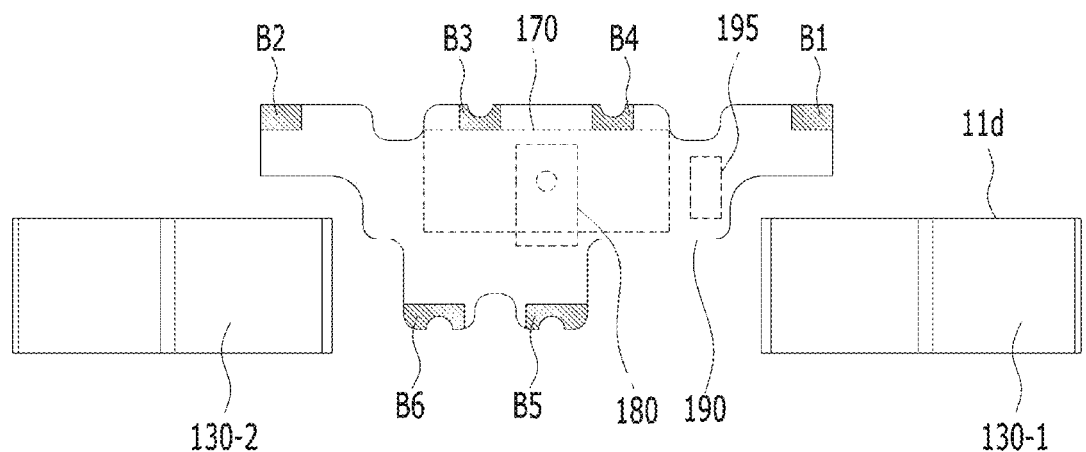
FIG. 16 is a side view of FIG. 15.
Figure 17:
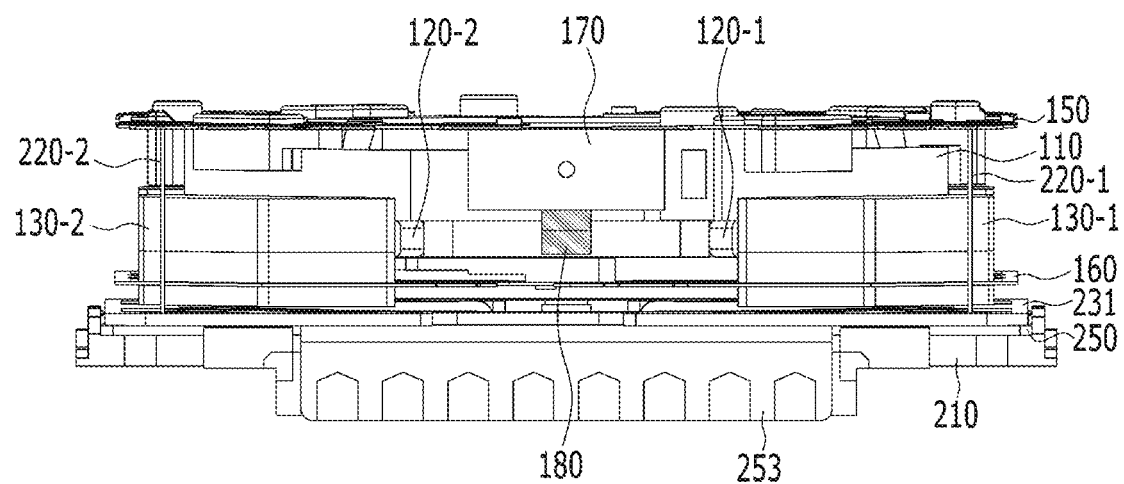
FIG. 17 is a view illustrating the disposition of the first position sensor, the second magnet, and the coil units.

FIG. 15 is a view illustrating the disposition of the first magnet 130 (130-1 to 130-4), the second and third magnets 180 and 185, the first position sensor 170, the capacitor 195, and the circuit board 190. FIG. 16 is a side view of FIG. 15. FIG. 17 is a view illustrating the disposition of the first position sensor 170, the second magnet 180, and the coil units 120-1 to 120-4.

Referring to FIGS. 15 to 17, the first magnet (for example, 130-1) may be configured such that the crosswise length of the first magnet (for example, 130-1) increases and then decreases in a direction toward the second surface 11b of the first magnet (for example, 130-1) from the first surface 11a of the first magnet (for example, 130-1).

For example, the first magnet 130 may include a first portion Q1, the crosswise length L1 of which increases in a direction toward the second surface 11b of the first magnet (for example, 130-1) from the first surface 11a of the first magnet 130, and a second portion Q2, the crosswise length L2 of which decreases in a direction toward the second surface 11b from the first surface 11a.

The first portion Q1 of the first magnet 130 may include the first surface 11a, or may abut the first surface 11a. The second portion Q2 of the first magnet 130 may include the second surface 11b, or may abut the second surface 11b.

The reason why the crosswise length L2 of the second portion Q2 of the first magnet 130 decreases is because the first magnet 130 is disposed on the corner portions 142-1 to 142-4 of the housing 140.

The reason why the length of the first portion Q1 of the first magnet 130 increases is to inhibit the first magnet 130, disposed in the seating portion 141a in the housing 140 from being separated toward the inside of the housing 140. Since the crosswise length L1 of the first portion Q1 decreases in a direction toward the first surface 11a from the second surface 11b, it is possible to reduce the influence of magnetic field interference between the first magnet 130 and the second magnet 180 and magnetic field interference between the first magnet 130 and the third magnet 185.

The length d1 of the first portion Q1 in a direction toward the second surface 11b from the first surface 11a may be less than the length d2 of the second portion Q2 of the first magnet 130 in a direction toward the second surface 11b from the first surface 11a (d1<d2). The reason for this is because, when d1>d2 is true, the surface area of the first surface 11a decreases and thus the electromagnetic force resulting from the interaction between the first coil 120 and the first magnet 130 decreases, thereby making it impossible to obtain desired electromagnetic force.

For example, the first to fourth terminals B1 to B4 of the circuit board 190 may be positioned higher than the upper surface 11d of the first magnet 130.

For example, the fifth and sixth terminals B5 and B6 of the circuit board 190 may be positioned between the two first magnets 130-1 and 130-2 disposed on the two corner portions 142-1 and 142-2 of the housing 140 adjacent to the first side portion 141-1 of the housing 140 at which the first position sensor 170 is disposed.

The upper surface of the first position sensor 170 may be positioned higher than the upper surface 11$d$ of the first magnet 130, and the lower surface of the first position sensor 170 may be positioned at a level equal to or higher than the upper surface 11$d$ of the first magnet 130. In another embodiment, the lower surface of the first position sensor 170 may be positioned lower than the upper surface of the first magnet 130.

The first terminal B1 of the circuit board 190 may overlap the first magnet 130-1 disposed on the first corner portion 142-1 of the housing 140 in the optical-axis direction, and the second terminal B2 of the circuit board 190 may overlap the first magnet 130-2 disposed on the second corner portion 142-2 of the housing 140 in the optical-axis direction.

At the initial position of the bobbin 110, the upper surface of the second magnet 180 (and/or the upper surface of the third magnet 185) may be positioned higher than the upper surface 11$d$ of the first magnet 130, and the lower surface of the second magnet 180 (and/or the lower surface of the third magnet 185) may be positioned lower than the upper surface 11$d$ of the first magnet 130.

In another embodiment, the lower surface of the second magnet 180 (or the lower surface of the third magnet 185) may be positioned at a level higher than or equal to the upper surface 11$d$ of the first magnet 130.

In order to reduce the length of the path along which the power signals GND and VDD are transmitted to the first position sensor 170, the embodiment may be constructed as follows.

First, since the first and second terminals B1 and B2 of the circuit board 190, to which the power signals GND and VDD are supplied, are conductively connected to the first and second support members 220-1 and 220-2 disposed on the two corner portions 142-1 and 142-2 adjacent to the first side portion 141-1 of the housing 140 at which the first position sensor 170 is disposed, it is possible to reduce the length of the path.

Furthermore, since the first and second terminals B1 and B2 of the circuit board 190 are disposed on the body part S1 of the circuit board 190, it is possible to reduce the length of the path.

In addition, since the first terminal B1 is disposed on one end of the circuit board 190 so as to overlap the first corner portion 142-1 of the housing 140 in the optical-axis direction and the second terminal B2 is disposed on the other end of the circuit board 190 so as to overlap the second corner portion 142-2 of the housing 140 in the optical-axis direction, it is possible to reduce the length of the path.

The distance (for example, the shortest distance) between the first terminal B1 of the circuit board 190 and the first support member 220-1 may be less than the distance (for example, the shortest distance) between the third terminal B3 of the circuit board 190 and the first support member 220-1 and the distance (for example, the shortest distance) between the fourth terminal B4 of the circuit board 190 and the first support member 220-1.

Furthermore, the distance (for example, the shortest distance) between the second terminal B2 of the circuit board 190 and the second support member 220-2 may be less than the distance (for example, the shortest distance) between the third end B3 of the circuit board 190 and the second support member 220-2 and the distance (for example, the shortest distance) between the fourth terminal B4 of the circuit board 190 and the second support member 220-1.

Because the path is reduced for the above-mentioned reason, it is possible to reduce the length of each of the first and second extension portions P1 and P2 and thus to lower the resistance of the path (for example, the resistance of the first and second upper elastic units 1501- and 150-2).

Because each of the first upper elastic unit 150-1 connected to the first terminal B1 of the circuit board 190 and the second upper elastic unit 150-2 connected to the second terminal B2 of the circuit board 190 includes the first outer frame coupled to the housing 140 but does not include the first inner frame 151 and the first frame connector, it is possible to lower the resistance, compared to the second and fourth upper elastic units 150-2 and 15-4.

For the reason mentioned above, because the embodiment reduces the length of the path along which the power signals GND and VDD are transmitted to the first position sensor 170, it is possible to lower the resistance of the path (for example, the resistance of the first and second upper elastic units 150-1 and 150-2) and thus to inhibit reduction in the magnitude of the power signals GND and VDD. Consequently, it is possible to reduce the consumption of power and to lower the operating voltage of the drive IC of the first position sensor 170.

According to the embodiment, in order to facilitate soldering for the conductive coupling to the first to fourth extension portions P1 to P4 of the upper elastic units 150-1 to 150-4 to thus improve solderability, the first to sixth terminals P1 to P6 may be disposed on the first surface 19$b$ of the circuit board 190.

If the first to sixth terminals B1 to B6 are disposed on the second surface 19$a$ of the circuit board 190, soldering may be made difficult, and solderability may be deteriorated. Furthermore, foreign substances (for example, contaminant) generated by the soldering may enter the lens moving apparatus, and thus malfunction of the lens moving apparatus may be caused.

Because the third and fourth terminals B3 and B4 are disposed between the first terminal B1 and the second terminal B2 and the circuit board 190 extends or projects toward the first corner portion 142-1 and the second corner portion 142-2 of the housing 140, a portion (for example, the third extension portion P3 or the fourth extension portion P4) of each of the third upper elastic unit 150-3 and the fourth upper elastic unit 150-4 may be coupled to a corresponding one of the third and fourth terminals B3 and B4 through the circuit board 190.

The fifth and sixth terminals B5 and B6 of the circuit board 190 may be disposed on the extension part S2 of the circuit board 190 in order to facilitate the coupling to lower elastic units 160-1 and 160-2.

According to the embodiment, because magnetic field interference between the second and third magnets 180 and 185 and the first magnet 130 is reduced, it is possible to inhibit reduction of AF driving force caused by the magnetic field interference, and thus it is possible to obtain desired AF driving force even when an additional yoke is not provided.

As described above, the embodiment is able to reduce the number of support members and thus to reduce the size of the lens moving apparatus by virtue of the reduction in the number of support members.

Since the number of support members is reduced and thus the resistance of the support members is lowered, it is possible to reduce consumption of current and to improve the sensitivity of OIS operation.

Furthermore, because the number of support members is reduced, it is possible to increase the thickness of the support members in order to obtain the same elasticity. Hence, because the thickness of the support members is increased, it is possible to reduce the influence of external impacts on the OIS operation unit.

Referring to FIG. 17, the first height of the lower end or the lower surface of the second magnet 180 in the optical-axis direction may be lower than or equal to the second height of the lower end or the lower surfaces of the coil units 120-1 to 120-4. In another embodiment, the first height may be higher than the second height.

For example, the first distance between the lower surface of the bobbin 110 and the lower end or the lower surface of the second magnet 180 may be less than or equal to the second distance between the lower surface of the bobbin 110 and the lower ends or the lower surfaces of the coil units 120-1 to 120-4. In another embodiment, the first distance may be greater than the second distance.

For example, the height of the lower surface of the first position sensor 170 may be higher than the upper surfaces of the coil units 120-1 to 120-4. In another embodiment, the height of the lower surface of the first position sensor 170 may be lower than or equal to the height of the upper surface of the coil units 120-1 to 120-4.

The height of the lower end or the lower surface of the second magnet 180 may be lower than the height of the lower end or the lower surface of the first position sensor 170. For example, the distance between the lower surface of the bobbin 110 and the lower surface of the sensing magnet 180 may be less than the distance between the lower surface of the bobbin 110 and the lower surface of the first position sensor 170. Consequently, it is possible to increase the output of the first position sensor 170 corresponding to the result of detection of the magnetic field of the first position sensor 180.

In another embodiment, the height of the lower end or the lower surface of the second magnet 180 may be equal to the height of the lower end or the lower surface of the first position sensor 170.

For example, although the height of the upper surface of the second magnet 180 may be lower than the height of the upper surface of the first position sensor 170, the disclosure is not limited thereto. In another embodiment, the two heights may be the same.

For example, the height of the upper surface of the second magnet 180 may be higher than the height of the upper surface of the magnet 130, and the height of the lower surface of the second magnet 180 may be lower than the height of the upper surface of the magnet 130 but higher than the lower surface of the magnet 130.

Figure 18:
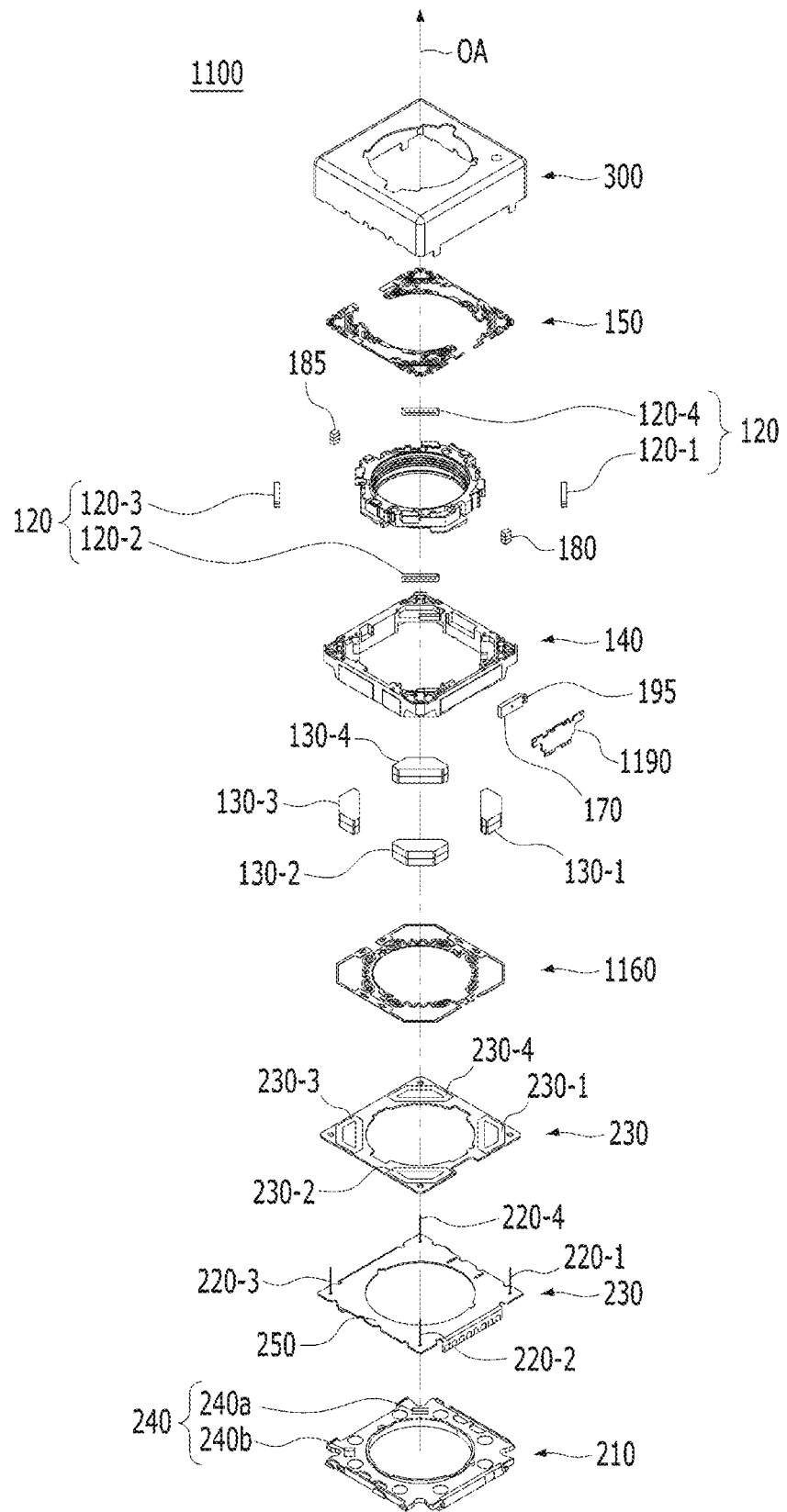
FIG. 18 is an exploded perspective view of a lens moving apparatus according to another embodiment.
Figure 19:
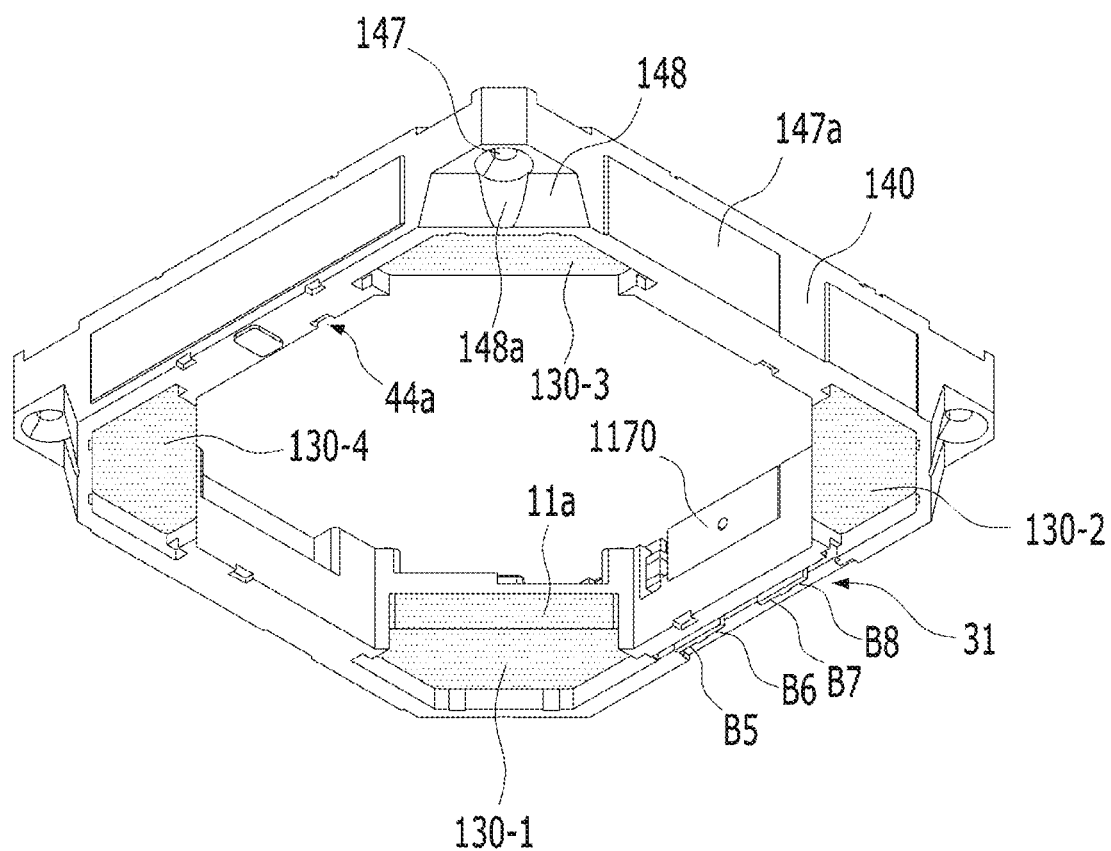
FIG. 19 is an assembled perspective view of the housing, the first magnet, a circuit board, a first position sensor and the capacitor, which are shown in FIG. 18.
Figure 20A:
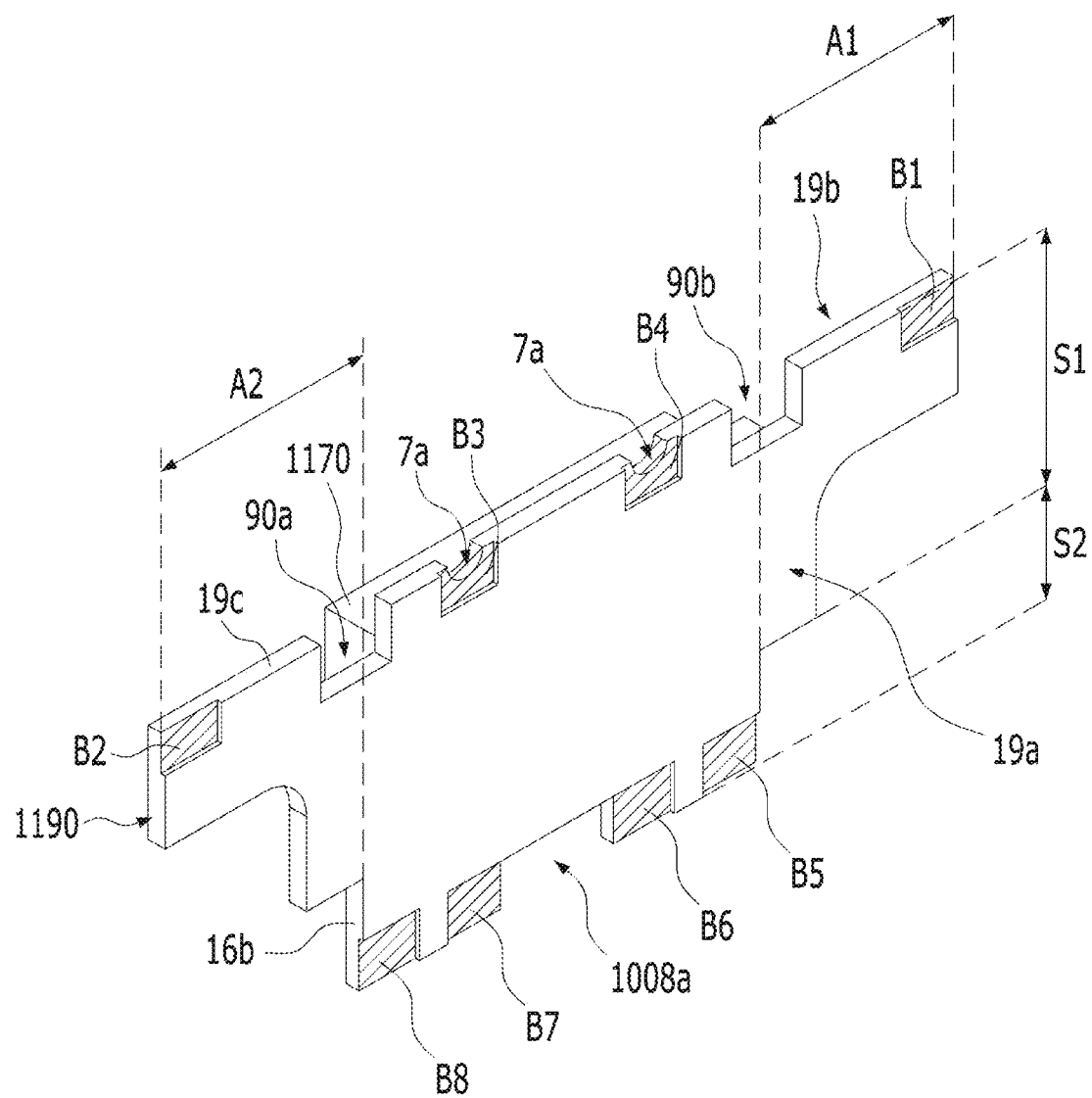
FIG. 20A is an enlarged view of the circuit board and the first position sensor shown in FIG. 18.
Figure 20B:
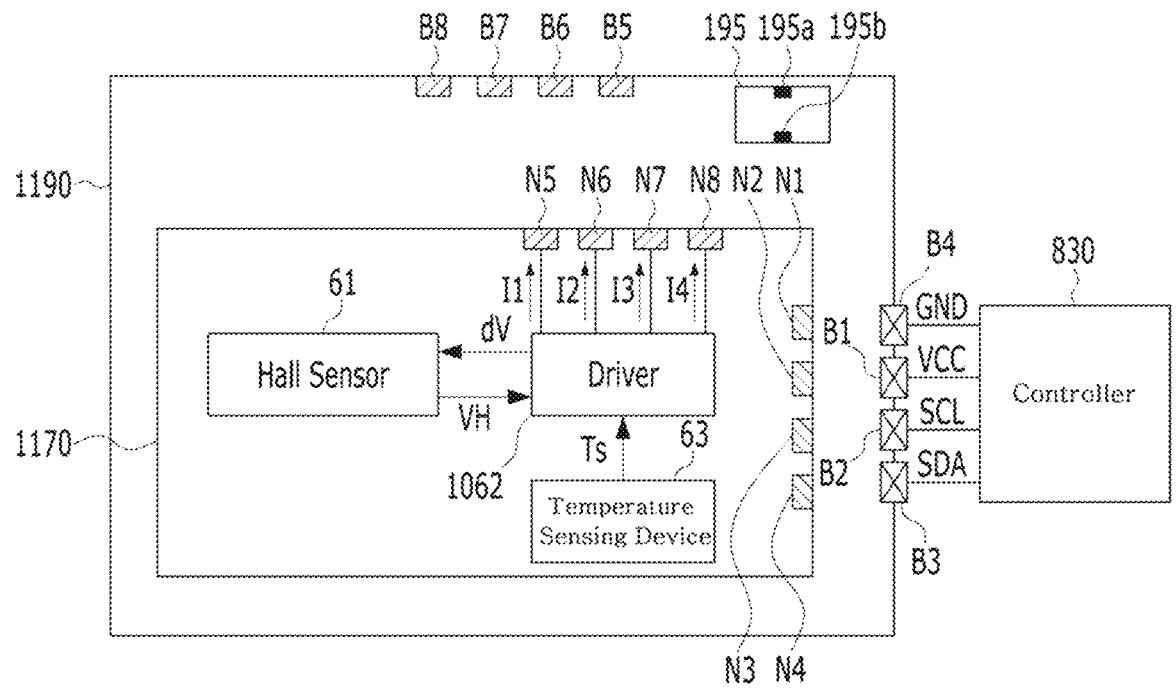
FIG. 20B is a schematic view of an embodiment of the first position sensor shown in FIG. 20A.
Figure 21:
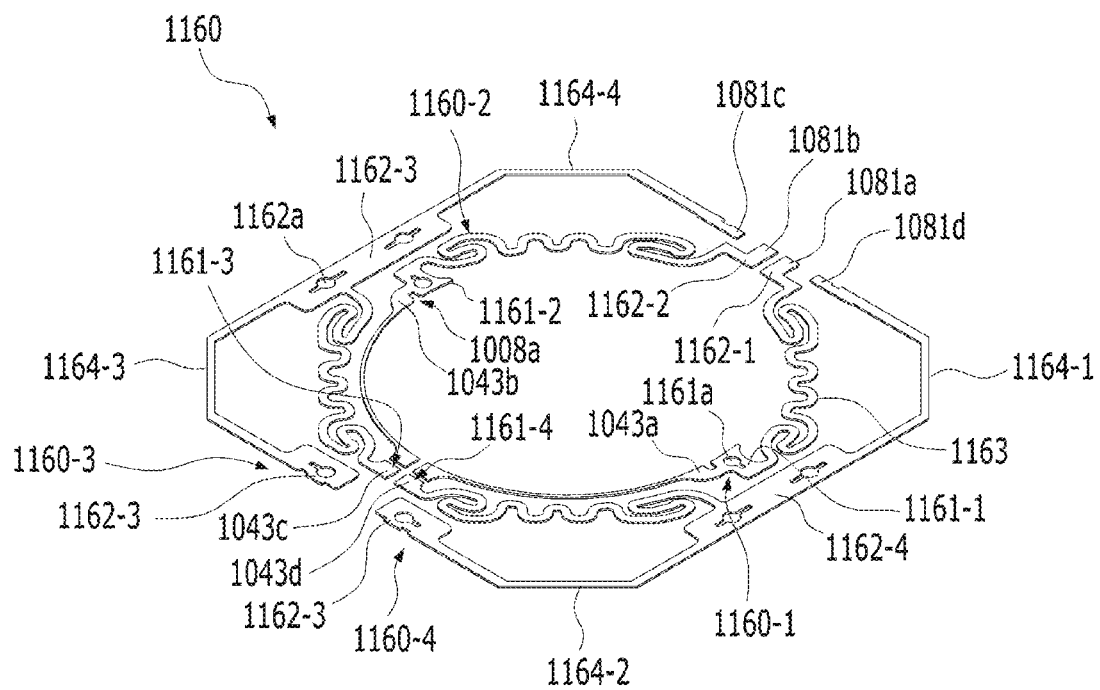
FIG. 21 is a perspective view of the lower elastic member shown in FIG. 18.
Figure 22:
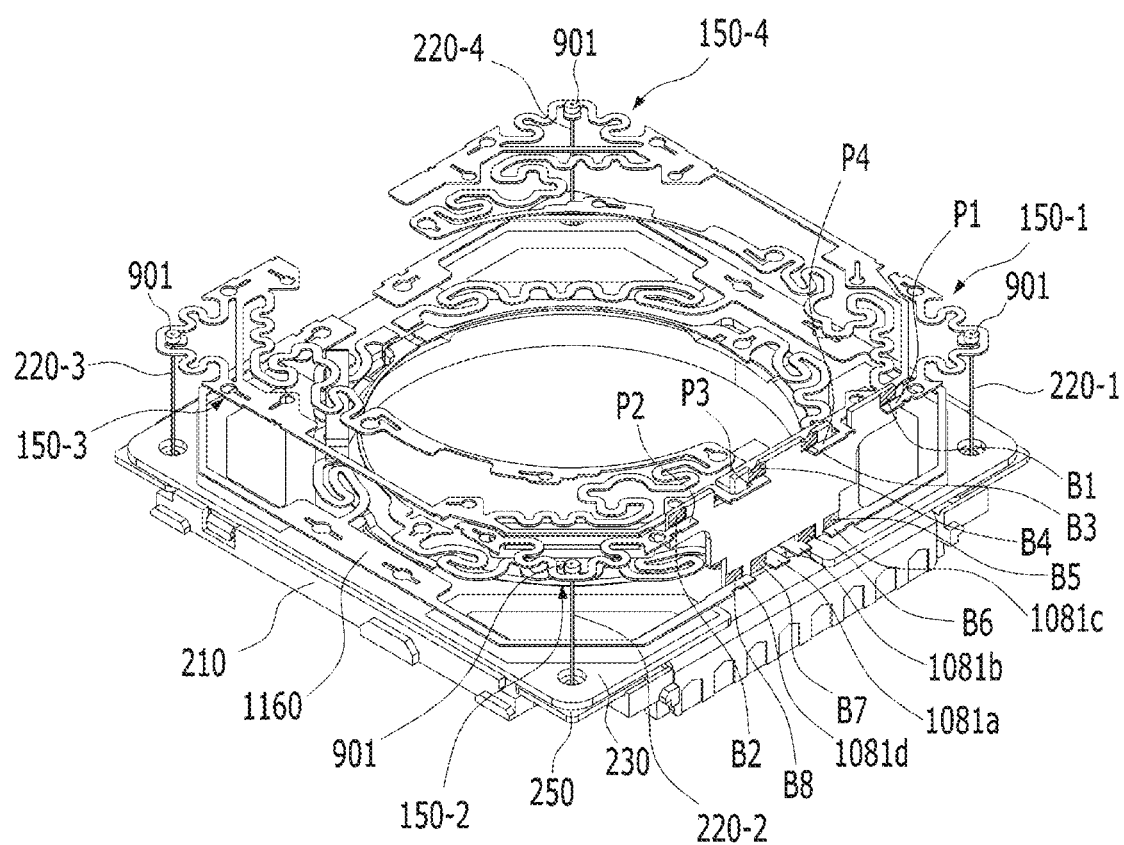
FIG. 22 is an assembled perspective view of the upper elastic member, the lower elastic member, the base, the support member, the second coil, and the circuit board, which are shown in FIG. 18.
Figure 23:
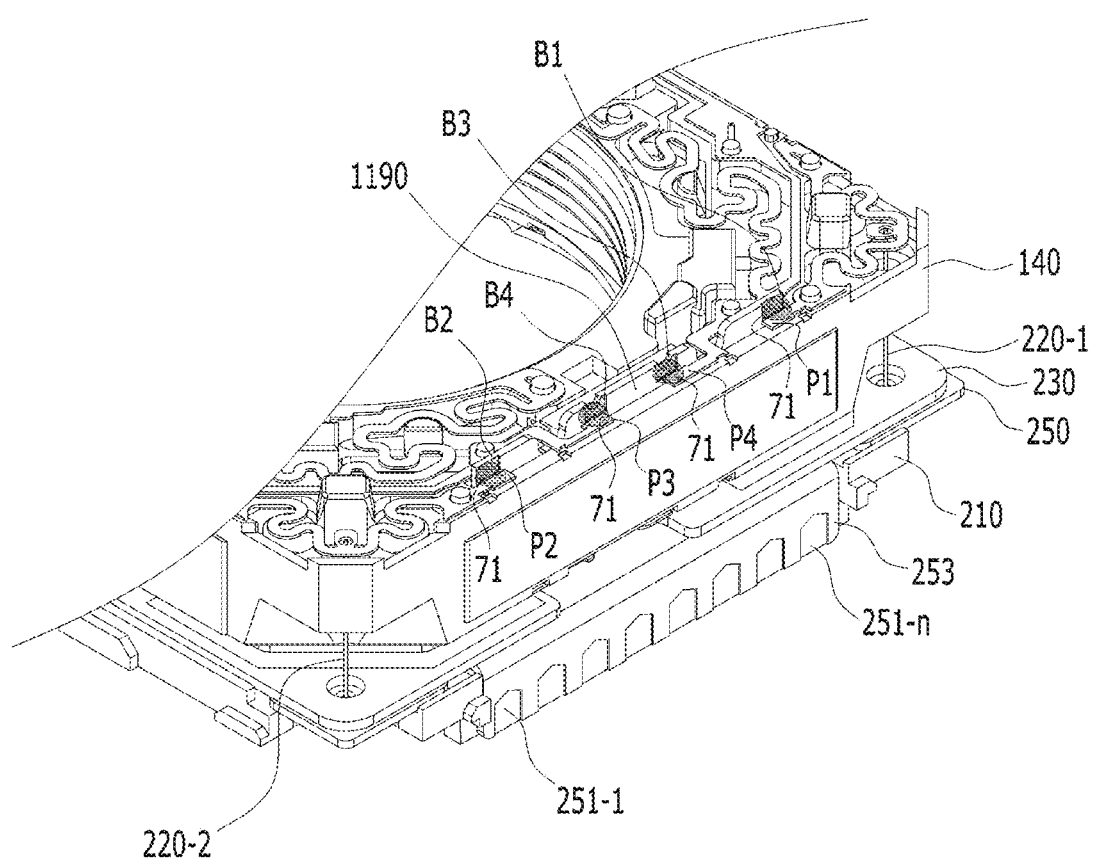
FIG. 23 is a view illustrating the coupling between the first to fourth terminals of the circuit board and the upper elastic units.
Figure 24:
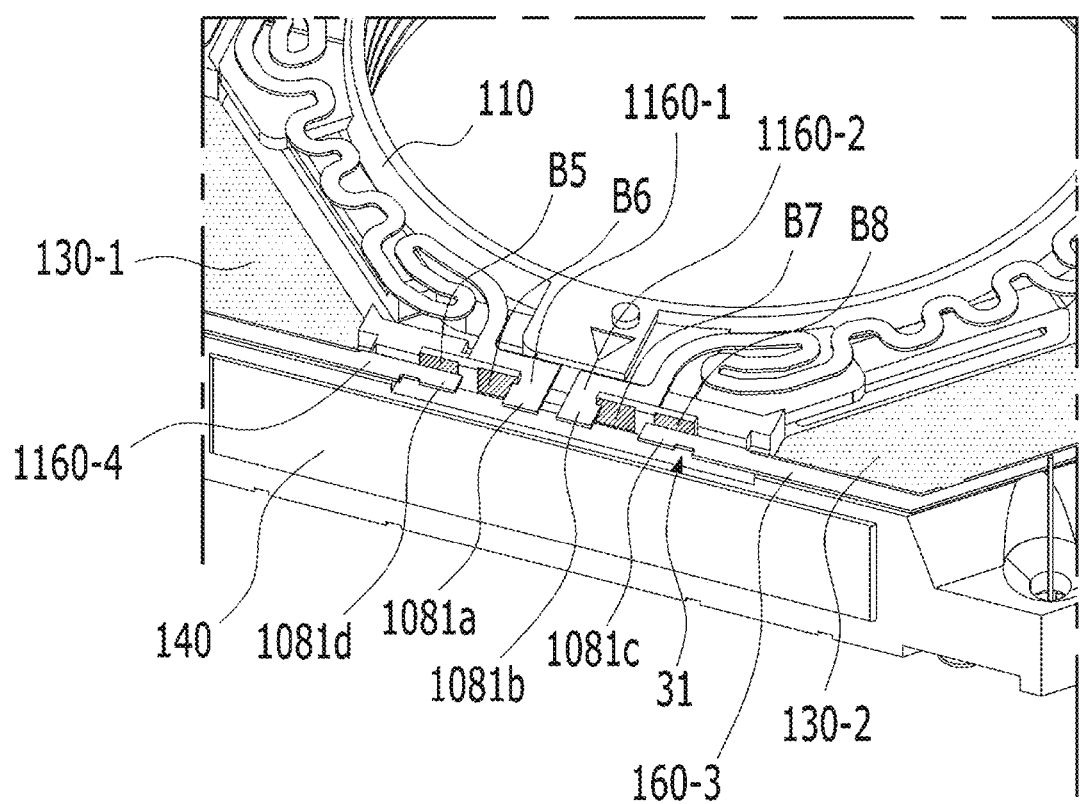
FIG. 24 is a bottom view of the fifth to eighth terminals of the circuit board and the lower elastic units shown in FIG. 18.
Figure 25:
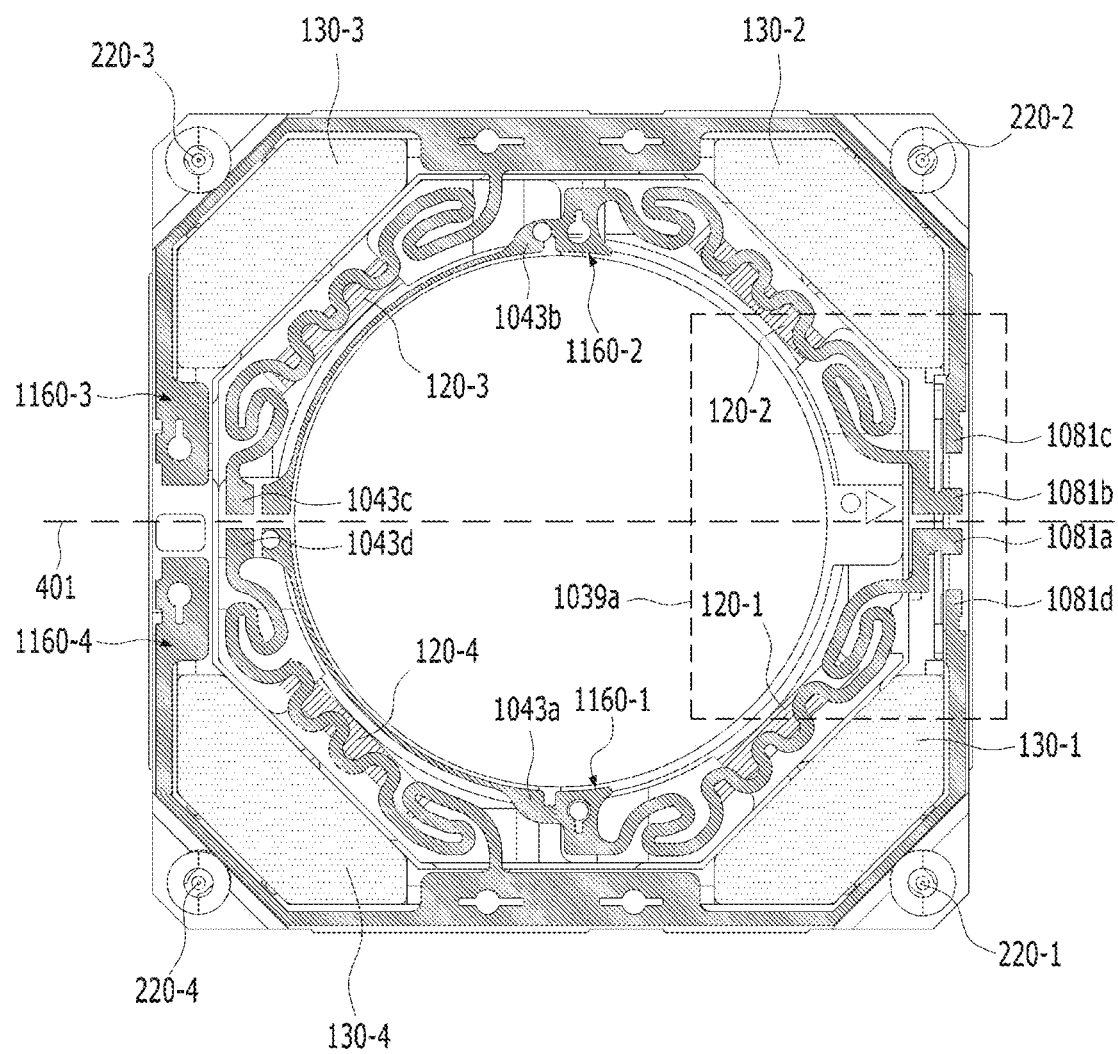
FIG. 25 is a bottom view of the housing, the first magnet, the lower elastic member, and the circuit board, which are shown in FIG. 18.
Figure 26:
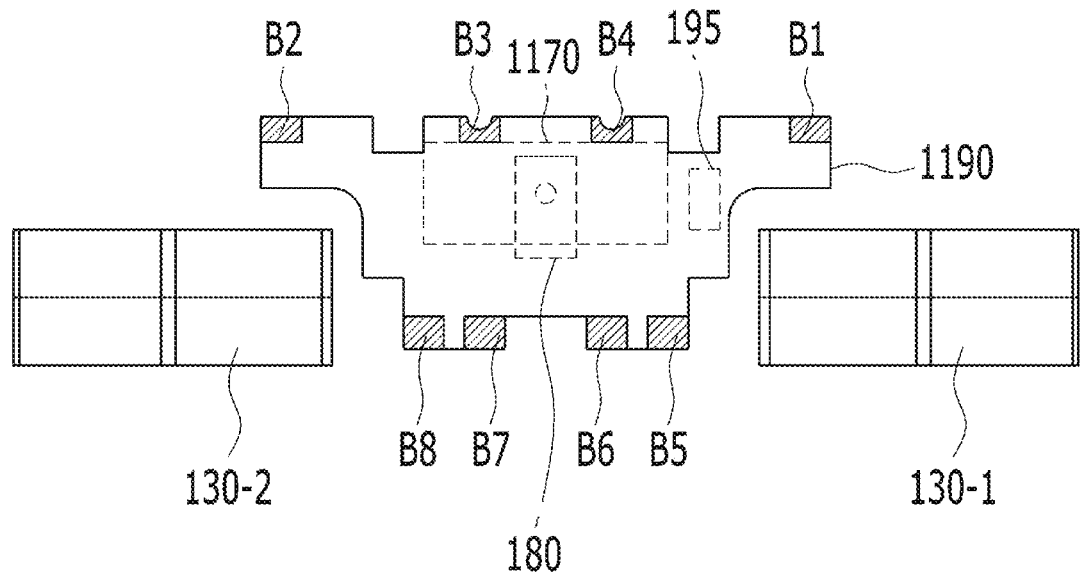
FIG. 26 is a view illustrating the disposition of the first magnet, the second magnet, the first position sensor, the capacitor, and the circuit board, which are shown in FIG. 26.
Figure 27:
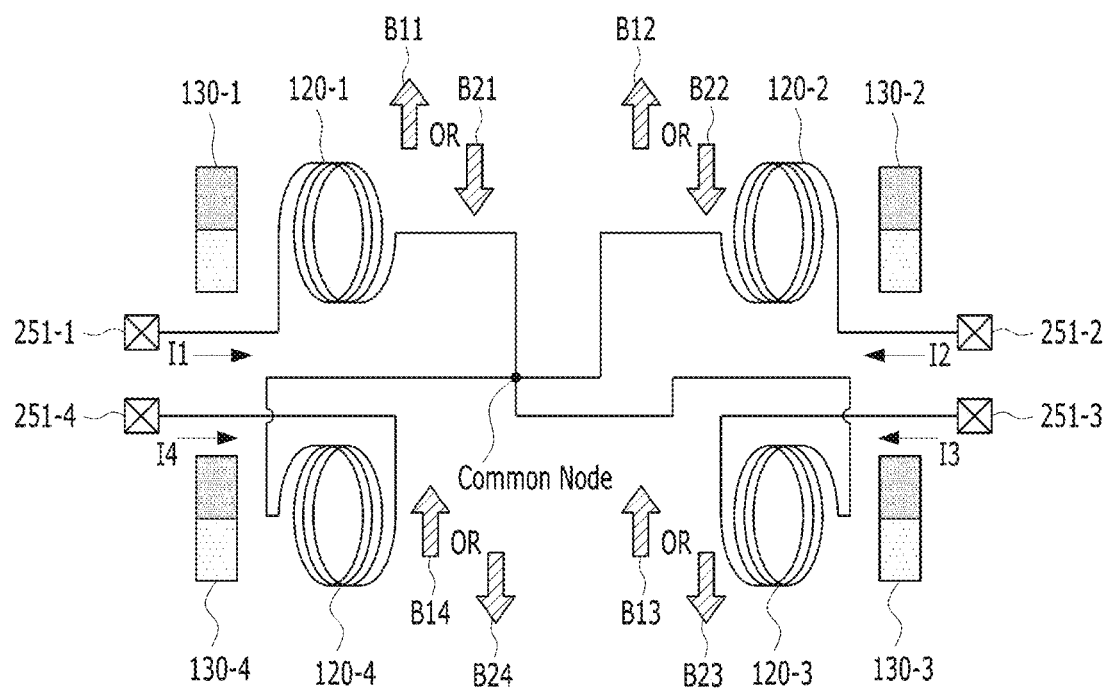
FIG. 27 is a view illustrating electromagnetic force between the coil units and the magnets in response to drive signals.

FIG. 18 is an exploded perspective view of a lens moving apparatus 1100 according to another embodiment. FIG. 19 is an assembled perspective view of the housing 140, the first magnet 130, a circuit board 1190, a first position sensor 1170 and the capacitor 195, which are shown in FIG. 18. FIG. 20A is an enlarged view of the circuit board 1190 and the first position sensor 1170 shown in FIG. 18. FIG. 20B is a schematic view of an embodiment of the first position sensor 1170 shown in FIG. 20A. FIG. 21 is a perspective view of the lower elastic member 1160 shown in FIG. 18. FIG. 22 is an assembled perspective view of the upper elastic member 150, the lower elastic member 1160, the base 210, the support member 220, the second coil 230 and the circuit board 250, which are shown in FIG. 18. FIG. 23 is a view illustrating the coupling between the first to fourth terminals P1 to P4 of the circuit board 190 and the upper elastic units 150-1 to 150-4. FIG. 24 is a bottom view of the fifth to eighth terminals B5 to B8 of the circuit board 190 and the lower elastic units 160-1 to 160-4 shown in FIG. 18. FIG. 25 is a bottom view of the housing 140, the first magnet 130, the lower elastic member 1160, and the circuit board 190, which are shown in FIG. 18. FIG. 26 is a view illustrating the disposition of the first magnet 130, the second magnet 180, the first position sensor 1170, the capacitor 195, and the circuit board 1190, which are shown in FIG. 26. FIG. 27 is a view illustrating the electromagnetic force between the coil units 120-1 to 120-4 and the magnets 130-1 to 130-3 in response to drive signals I1, I2, I3 and I4. FIG. 24 is a perspective view of the dotted region 1039a in FIG. 25.

Reference numerals in FIGS. 18 to 27, which are the same as those in FIGS. 1 to 17, denote the same components, and the description of FIGS. 1 to 17 may be applied to the same components with or without modification, in which case the description will be omitted or given briefly.

The lens moving apparatus 1100 may include the bobbin 110, the first coil 120, the first magnet 130, the housing 140, the upper elastic member 150, the lower elastic member 1160, the first position sensor 1170, the second magnet 180, the circuit board 1190, the support member 220, and the second coil 230.

In order to perform feedback handshake correction, the lens moving apparatus 1100 may further include the second position sensor 240.

The lens moving apparatus 1100 may further include at least one of the third magnet 185, the capacitor 195, the base 210, the circuit board 250, and the cover member 300.

The first to fourth coil units 120-1 to 120-4 of the first coil 120 may be independently driven.

The first to fourth coil units 120-1 to 120-4 of the first coil 120 may be provided with respective power or drive signals.

For example, the first coil unit 120-1 may be provided with a first drive signal, and the second coil unit 120-2 may be provided with a second drive signal. Furthermore, the third coil unit 120-3 may be provided with a third drive signal, and the fourth coil unit 120-4 may be provided with a fourth drive signal.

Each of the first to fourth drive signals may be a DC or AC signal, or may include both DC and AC components, and may be of a current type or a voltage type.

When a drive signal (for example, a drive current) is supplied to each of the first to fourth coil units 120-1, electromagnetic force may be created by the interaction between the first to fourth coil units 120-1 to 120-4 and the first to fourth magnets 130-1 to 130-4 respectively corresponding to the first to fourth coil units 120-1 to 120-4, and the AF operation unit (for example, the bobbin 110) may be moved in the first direction (for example, in the z-axis direction), or the AF operation unit may be tilted by virtue of the created electromagnetic force.

The capacitor 195 may be conductively connected to two terminals of the circuit board 1190 through which power (or drive signals) are supplied to the position sensor 170 from the outside.

Although the second coupler of the housing 140 shown in FIG. 19, which is to be coupled or fixed to the second outer frame 162 of the lower elastic member 160, may have a flat surface shape, the disclosure is not limited thereto. In another embodiment, the second coupler may have a protrusion shape or a groove shape.

For example, the circuit board 1190 may be disposed between the first corner portion 142-1 of the housing 140 and the second corner portion 142-2, and the first to eight terminals B1 to B8 of the circuit board 1190 may be conductively connected to the first position sensor 1170.

Referring to FIGS. 20A and 20B, the circuit board 1190 may include the plurality of terminals B1 to B8, which are to be conductively connected to external terminals or external devices.

For example, the description of the first to fourth terminals B1 to B4 of the circuit board 190 shown in FIG. 7A may be applied to the first to fourth terminals B1 to B4 of the circuit board 1190 shown in FIG. 20A, with or without modification.

The fifth to eighth terminals B5 to B8 of the circuit board 1190 may be disposed on the second surface 19a of the extension part S2 of the circuit board 1190 so as to be spaced apart from each other.

The circuit board 1190 may have a groove or a hole 1008a formed between the sixth terminal B6 and the seventh terminal B7. The groove 1008a may be depressed from the lower surface of the circuit board 1190, and may be open both at the first surface 19b and at the second surface 19a of the circuit board 190.

The distance between the sixth terminal B6 and the seventh terminal B7 may be less than the distance between two adjacent terminals, among the first to fourth terminals B1 to B4. Accordingly, since solder is not applied between the sixth terminal B6 and the seventh terminal B7 by virtue of the groove 1008a upon conductive connection to external devices, it is possible to inhibit a conductive short between the sixth terminal B6 and the seventh terminal B7.

Although not shown in FIG. 20A, at least one of the fifth to eighth terminals B5 to B8 may include a groove or a via formed in the lower surface of the circuit board 1190. In other words, at least one of the fifth to eighth terminals B5 to B8 may include a curved portion depressed from the lower surface of the circuit board 1190, for example, a semicircular via or groove. By virtue of the groove, the contact area between solder and at least one of the fifth to eighth terminals B5 to B8 is increased, thereby improving the coupling force and solderability therebetween.

The circuit board 1190 may include a circuit pattern or a wire (not shown) for conductively connecting the first to eighth terminals B1 to B8 to the first position sensor 1170.

The first position sensor 1170 may be disposed on the first surface 19b of the circuit board 1190. In another embodiment, the first position sensor 1170 may be disposed on the second surface 19a of the circuit board 1190.

The first position sensor 1170 may include the Hall sensor 61 and a driver 1062.

The driver 1062 may output a drive signal dV for driving the Hall sensor 61, and drive signals I1, I2, I3 and I4 for driving the coil units 120-1 to 120-4 of the first coil 120.

The driver 1062 may create the drive signal dV for driving the Hall sensor 61 using the clock signal SCL and the power signals VDD and GND, and the drive signals I1, I2, I3 and I4 for driving the coil units 120-1 to 120-4 of the first coil 120.

For example, the drive signal dB may be an analog signal or a digital signal, and may be of a current type or a voltage type. For example, the drive signals I1, I2, I3 and I4 may be of a current type or a voltage type.

The first position sensor 1170 may include four terminals N1 to N4 for transmitting and receiving the clock signal SCL, the data signal SDA and the power signals VDD and GND, and four terminals N5 to N8 for providing drive signals to the coil units 120-1 to 120-4 of the first coil 120.

Each of the first to fourth terminals B1 to B4 of the circuit board 1190 may be conductively connected to a corresponding one of the first to fourth terminals N1 to N4 of the first position sensor 1170. Furthermore, each of the fifth to eighth terminals B5 to B6 of the circuit board 1190 may be conductively connected to a corresponding one of the fifth to eighth terminals N5 to N8 of the first position sensor 1170.

The driver 1062 may receive the output VH from the hall sensor 61, and may transmit the clock signal SCL and the data signal SDA, pertaining to the output VH of the hall sensor 61, via data communication using a protocol such as I2C communication, to the controllers 830 and 780.

The first to fourth terminals B1 to B4 of the circuit board 1190 may be conductively connected to the terminals 251-1 to 251-n (n being a natural number greater than 1, n>1) of the circuit board 250 via the upper elastic units 150-1 to 150-4 and the support members 220-1 to 220-4. Consequently, each of the first to fourth terminals N1 to N4 of the first position sensor 1170 may be conductively connected to a corresponding one of the terminals 251-1 to 251-n (for example, n=4) of the circuit board 250.

The fifth to eighth terminals B5 to B8 of the circuit board 1190 may be conductively connected to the first to fourth lower elastic units 160-1 to 160-4, and each of the fifth to eighth terminals N5 to N8 of the first position sensor 1170 may be conductively connected to a corresponding one of the coil units 120-1 to 120-4 of the first coil 120 via the lower elastic units 160-1 to 160-4.

The upper elastic member 150 may include first to fourth upper elastic units 150-1 to 150-4, and each of the first to fourth upper elastic units 150-1 to 150-4 may be directly bonded and conductively connected to a corresponding one of the first to fourth terminals B1 to B4 of the circuit board 1190.

A portion of each of the plurality of upper elastic units 150-1 to 150-4 may be disposed on the first side portion 141-1 of the housing 140 at which the circuit board 1190 is disposed, and at least one upper elastic unit may be disposed on each of the remaining second to fourth side portions 141-2 to 141-4, other than the first side portion 141-1 of the housing 140.

The description of the upper elastic member 150 shown in FIG. 8 may be applied to the embodiment shown in FIG. 18 with or without modification.

Referring to FIG. 21, the lower elastic member 1160 may include a plurality of lower elastic units 1160-1 to 1160-4.

For example, at least one of the first to fourth lower elastic units 1160-1 to 1160-4 may include second inner frames 1161-1 to 1161-4 coupled or fixed to the lower portion, the lower surface or the lower end of the bobbin 110, second outer frames 1162-1 to 1162-4 coupled or fixed to the lower portion, the lower surface or the lower end of the housing 140, and second frame connector 1163 connecting the second inner frames 1161-1 to 1161-4 to the second outer frames 1162-1 to 1162-4.

For example, the second inner frame (for example, 1161-1, 1161-2) of at least one of the first to fourth lower elastic units 1160-1 to 1160-4 may have a hole 1161a coupled to the second coupler 117 of the bobbin 110, and the second outer frame (for example, 1162-3, 1162-4) of at least one of the first to fourth lower elastic units 1160-1 to 1160-4 may have a hole 1162a coupled to the second coupler of the housing 140.

For example, the number of second inner frames included in at least one of the first to fourth lower elastic units 1160-1 to 1160-4 may be one or more, and the number of second outer frames included in at least one of the first to fourth lower elastic units 1160-1 to 1160-4 may be one or more.

At least one of the first to fourth lower elastic units 1160-1 to 1160-4 may include connecting frames 1164-1 to 1164-4 connecting the second outer frames to each other.

Although the width of each of the connecting frames 1164-1 to 1164-4 may be less than the width of each of the second outer frames 1162-1 to 1162-4, the disclosure is not limited thereto. In another embodiment, the former width may be greater than or equal to the latter width.

In order to avoid spatial interference with the second coil 230 and the first magnet 130, the connecting frames 1164-1 to 1164-4 may be positioned outside the coil units 230-1 to 230-4 of the second coil 230 and the magnets 130-1 to 130-4.

Here, the outside of the coil units 230-1 to 230-4 of the second coil 230 and the magnets 130-1 to 130-4 may be the side opposite the region in which the center of the bobbin 110 or the center of the housing 140 is positioned, with respect to the coil units 230-1 to 230-4 and the magnets 130-1 to 130-4.

For example, although the connecting frames 1164-1 to 1164-4 may be positioned so as not to overlap the coil units 230-1 to 230-4 and/or the magnets 130-1 to 130-4 in the optical-axis direction, the disclosure is not limited thereto. In another embodiment, at least some of the connecting frames 1164-1 to 1164-4 may be aligned with or overlap the coil units 230-1 to 230-4 and/or the magnets 130-1 to 130-4 in the optical-axis direction.

Although each of the upper elastic units 150-1 to 150-4 and the lower elastic units 1160-1 to 1160-4 may be made of a leaf spring, the disclosure is not limited thereto, and the elastic unit may be embodied as a coil spring. Here, the "elastic unit" may be alternatively referred to as a "spring", and the "outer frame" may be alternatively referred to as an "outer portion". Furthermore, the "inner frame" may be alternatively referred to as an "inner portion", and the "support member" (for example, 220) may be alternatively referred to as a "wire".

As illustrated in FIG. 25, the first to fourth lower elastic units 1160-1 to 1160-4 may be symmetrically disposed with respect to the reference line 401 in a horizontal direction and in a vertical direction.

For example, the reference line 401 may be a straight line, which is parallel to a direction toward the second side portion from the first side portion of the housing 140 and extends through the center of the housing 140.

For example, the reference line may be a horizontal line, which extends between the first bonding portion 1081*a* and the second bonding portion 1081*b* and extends between the third bonding portion 1043*c* and the fourth bonding portion 1043*d* in FIG. 25.

For example, although the third lower elastic member 1160-3 may be symmetrical to the fourth lower elastic member 1160-4 with respect to the reference line 401 and the first lower elastic member 1160-1 may be symmetrical to the second lower elastic member 1160-2 with respect to the reference line 401, the disclosure is not limited thereto. In another embodiment, the two members may not be symmetrical to each other with respect to the reference line 401.

For example, although the first bonding portion 1081*a* may be symmetrical to the second bonding portion 1081*b* with respect to the reference line 401 and the third bonding portion 1043*c* may be symmetrical to the fourth bonding portion 1043*d* with respect to the reference line 401, the disclosure is not limited thereto. In another embodiment, the two bonding portions may not be symmetrical to each other.

Each of the coil units 120-1 to 120-4 of the first coil 120 may be directly connected or coupled to the second inner frame of a corresponding one of the first to fourth lower elastic units 1160-1 to 1160-4.

For example, the second inner frame 1161-1 of the first lower elastic unit 1160-1 may include a first bonding portion 1043*a* coupled to one end of the first coil unit 120-1. The other end of the first coil unit 120-1 may be connected or coupled to one upper elastic unit (for example, 150-3 or 150-4), to which the first power signal GND is supplied.

For example, the second inner frame 1161-2 of the second lower elastic unit 1160-2 may include a second bonding portion 1043*b* coupled to one end of the second coil unit 120-2. The other end of the second coil unit 120-2 may be connected or coupled to the upper elastic unit (for example, 150-3 or 150-4), to which the first power signal GND is supplied.

For example, the second inner frame 1161-3 of the third lower elastic unit 1160-3 may include a third bonding portion 1043*c*, coupled to one end of the third coil unit 120-3. The other end of the third coil unit 120-3 may be connected or coupled to the upper elastic unit (for example, 150-3 or 150-4), to which the first power signal GND is supplied.

For example, the second inner frame 1161-4 of the fourth lower elastic unit 1160-4 may include a fourth bonding portion 1043*d*, coupled to one end of the fourth coil unit 120-4. The other end of the fourth coil unit 120-4 may be connected or coupled to the upper elastic unit (for example, 150-3 or 150-4), to which the first power signal GND is supplied.

In other words, the other end of each of the first to fourth coil units 120-1 to 120-4 may be conductively connected to the upper elastic unit (for example, 150-3 or 150-4), to which the first power signal GND is supplied.

For example, the other end of each of the first to fourth coil units 120-1 to 120-3 may be coupled to the first inner frame 151 of the upper elastic unit (for example, 150-3 or 150-4), to which the first power signal GND is supplied.

For example, each of the first to fourth bonding portions 1043*a* to 1043*d* may have a groove for guiding a corresponding one of the coil units 120-1 to 120-4.

The power signals VDD and GND may be supplied to the third and fourth terminals B3 and B4 of the circuit board 1190 via the third and fourth upper elastic units 150-3 and 150-4 and the third and fourth support members 220-3 and 220-4. The first position sensor 1170 may receive the power signals VDD and GND via the third and fourth terminals B3 and B4 of the circuit board 1190.

For example, although the third terminal B3 of the circuit board 1190 may be one of the VDD terminal and the GND terminal and the fourth terminal B4 of the circuit board 1190 may be the other of the VDD terminal and the GND terminal, the disclosure is not limited thereto.

The clock signal SCL and the data signal SDA may be supplied to the first and second terminals B1 and B2 of the circuit board 1190 via the first and second support members 220-1 and 220-2 and the first and second upper elastic units 150-1 and 150-2. The first position sensor 1170 may receive the clock signal SCL and the data signal SDA via the first and second terminals B1 and B2 of the circuit board 1190.

In another embodiment, the clock signal SCL and the data signal SDA may be supplied to the third and fourth terminals B3 and B4 of the circuit board 1190 via the third and fourth upper elastic units 150-3 and 150-4 and the third and fourth support members 220-3 and 220-4, and the power signals VDD and GND may be supplied to the first and second terminals B1 and B2 of the circuit board 1190 via the first and second support members 220-1 and 220-2 and the first and second upper elastic units 150-1 and 150-2.

Each of the fifth to eighth terminals B5 to B8 of the circuit board 1190 may be connected or coupled to the second outer frames 1162-1 to 1162-4 of a corresponding one of the first to fourth lower elastic units 1160-1 to 1160-4.

For example, the second outer frame 1162-1 of the first lower elastic unit 1160-1 may include the first bonding portion 1081a, to which the seventh terminal B7 of the circuit board 1190 is coupled via solder or a conductive adhesive member.

The second outer frame 1162-2 of the second lower elastic unit 1160-2 may include the second bonding portion 1081b, to which the sixth terminal B6 of the circuit board 1190 is coupled via solder or a conductive adhesive member.

The second outer frame 1162-3 of the third lower elastic unit 1160-3 may include the third bonding portion 1081c, to which the fifth terminal B5 of the circuit board 1190 is coupled via solder or a conductive adhesive member.

The second outer frame 1162-4 of the fourth lower elastic unit 1160-4 may include the fourth bonding portion 1081d, to which the eighth terminal B8 of the circuit board 1190 is coupled via solder or a conductive adhesive member.

Referring to FIG. 24, one end (for example, the lower end or the lower surface) of each of the fifth to eighth terminals B5 to B8 of the circuit board 1190 may be positioned lower than the lower end or the lower surface of the second outer frames 1162-1 to 1162-4 of the first to fourth lower elastic units 160-1 to 160-4.

Because FIG. 24 is a bottom view, the lower surface of each of the fifth to eighth terminals B5 to B8 of the circuit board 1190 may be represented as being positioned lower than the lower end or the lower surface of the first to fourth bonding portions 1081a to 1081d of the second outer frames 1162-1 to 1162-4 when viewed in a plan view. The reason for this is to improve solderability between one end of each of the fifth to eighth terminals B5 to B8 and the first to fourth bonding portions 1081a to 1081d of the first to fourth lower elastic units 1160-1 to 1160-4.

The groove 31 in the housing may overlap the first to fourth bonding portions 1081a to 1081d of the first to fourth lower elastic units 1160-1 1160-4 in the optical-axis direction.

By virtue of the groove 31 in the housing 140, the surface area of the fifth to eighth terminals B5 to B8 of the circuit board 1190, which is exposed through the housing 140, may be increased, and sufficient space in which to seat solder or a conductive adhesive member may be ensured. Consequently, it is possible to improve solderability, and it is possible to reduce the distance that solder projects downwards from the lower surfaces of the second outer frames 1162-1 to 1162-4, thereby suppressing or inhibiting spatial interference with the second coil 230, the circuit board 250, and the base 210, which are positioned under the lower elastic units 1160-1 to 1162-4.

Although the lower surface 11c of the first magnet 130 disposed in the seating portion 141a in the housing 140 may be positioned higher than the lower surface of the housing 140 and/or the lower surfaces of the second outer frames 1162-1 to 1162-4 of the first to fourth lower elastic units 1160-1 to 1160-4, the disclosure is not limited thereto. In another embodiment, the lower surface 11c of the first magnet 130 may be positioned at a level lower than or equal to the lower surface of the housing 140.

The circuit member 231 may have the escape groove 24 formed therein in order to avoid spatial interference with the fifth to eighth terminals B5 to B8 of the circuit board 1190.

Since the embodiment is constructed such that drive signals are directly supplied to the coil units 120-1 to 120-4 of the first coil 120 from the first position sensor 1170, it is possible to reduce the number of support members and to simplify the conductive connection structure, compared to the case in which the drive signals are directly supplied to the first coil 120 via the circuit board 250.

For example, the fifth to eighth terminals B5 to B8 of the circuit board 190 may be positioned between two magnets 130-1 and 130-2 disposed on two corner portions 142-1 and 142-2 of the housing 140 adjacent to the first side portion 141-1 of the housing 140, at which the first position sensor 1170 is disposed.

According to the embodiment, in order to facilitate soldering for conductive connection to the first to fourth extension portions P1 to P4 of the upper elastic units 150-1 to 150-4 and the bonding portions 1081a to 1081d of the lower elastic units 1160-1 to 1160-4 to thus improve the solderability, the first to eighth terminals B1 to B8 may be disposed on the second surface 19a of the circuit board 190.

If the first to eighth terminals B1 to B8 are disposed on the first surface 19b of the circuit board 190, soldering may be made difficult, and foreign substances (for example, contaminants) generated by the soldering may enter the lens moving apparatus 100, thereby causing malfunction of the lens moving apparatus.

Since the third and fourth terminals B3 and B4 are disposed between the first terminal B1 and the second terminal B2 and the circuit board 190 extend or project toward the first corner portion 142-1 and the second corner portion 142-2 of the housing 140 in order to reduce the length of the path, a portion (for example, the third extension portion P3 or the fourth extension portion P4) of each of the third upper elastic unit 150-3 and the fourth upper elastic unit 150-5 may be coupled to the third and fourth terminals B3 and B4 formed on the second surface 19a of the circuit board 1190 through the circuit board 1190.

In order to facilitate coupling to the lower elastic units 116-1 to 1160-4, the fifth to eighth terminals B5 to B8 of the circuit board 1190 may be disposed on the extension part S2 of the circuit board 1190.

Referring to FIG. 27, each of the drive signals I1 to I4 may be supplied to a corresponding one of the coil units 120-1 to 120-4. In other words, the coil units 120-1 to 120-4 may be individually controlled by the drive signals. For example, one end of each of the coil units 120-1 to 120-4 may be provided with a corresponding one of the drive signals I1 to I4, and the other end of each of the coil units 120-1 to 120-4 may be connected to a common node. For example, the common node may be the upper elastic unit (for example, 150-3 or 150-4) to which the first power signal GND is supplied.

For example, although at least one of sizes of the first to fourth drive signals I1 to I4 may be different from the others, the disclosure is not limited thereto. In another embodiment, all of the sizes of the first to fourth drive signals I1 to I4 may be the same.

For example, although at least one of current directions of the first to fourth drive signals I1 to I4 may be different from the others, the disclosure is not limited thereto. In another embodiment, all of the current directions of the first to fourth drive signals I1 to I4 may be the same.

First electromagnetic force (for example, B11 or B21) may be created between the first magnet 130-1 and the first coil unit 120-1 by the first drive signal I1, and second electromagnetic force (for example, B12 or B22) may be created between the second magnet 130-2 and the second coil unit 120-2 by the second drive signal I2. Third electromagnetic force (for example, B13 or B23) may be created between the third magnet 130-3 and the third coil unit 120-3 by the third drive signal I3, and fourth electromagnetic force (for example, B14 or B24) may be created between the fourth magnet 130-4 and the fourth coil unit 120-4 by the fourth drive signal I4.

For example, the direction of each of the first to fourth electromagnetic forces may be the direction of the optical axis OA, the third direction (for example, the z-axis direction), or a direction parallel to the optical axis.

For example, the intensity of each of the first to fourth electromagnetic forces may be proportional to the intensity of a corresponding one of the first to fourth drive signals I1 to I4. Furthermore, the direction of each of the first to fourth electromagnetic forces may be determined based on the current direction of a corresponding one of the first to fourth drive signals I1 to I4.

For example, when the current directions of the first to fourth drive signals I1 to I4 are the same, the directions of the first to fourth electromagnetic forces may be the same.

For example, when the sizes (or the intensities) of the first to fourth drive signals I1 to I4 are the same, the intensities of the first to fourth electromagnetic forces may be the same.

When the first to fourth electromagnetic forces have the same direction and the same intensity, the AF operation unit may be moved in the optical-axis direction, and the AF operation unit may not be tilted by the first to fourth electromagnetic forces.

When the current directions of the first to fourth drive signals I1 to I4 are the same and at least one of the intensities of the first to fourth drive signals I1 to I4 is different from the others, the directions of the first to fourth electromagnetic forces may be the same but the intensity of at least one of the first to fourth electromagnetic forces may be different from the others. Hence, the AF operation unit may be tilted relative to a flat surface (for example, the x-y plane) perpendicular to the optical axis OA (for example, the z axis).

When at least one of the current directions of the first to fourth drive signals I1 to I4 is different from the others and at least one of the sizes of the first to fourth drive signals I1 to I4 is different from the others, at least one of the first to fourth electromagnetic forces may be different from the others, and at least one of the intensities of the first to fourth electromagnetic forces may be different from the others. Hence, the AF operation unit may be tilted relative to a flat surface (for example, the x-y plane) perpendicular to the optical axis OA (for example, the z axis).

With functional enhancement of an optical device (for example, a cellular phone), dual or triple cameras are being developed. Typically, actuators mounted on an optical device may be subjected to magnetic field interference due to the magnets mounted on the actuators.

Furthermore, with enhancement of resolving power of a camera module or an optical device, there is a need for increased electromagnetic force in order to move a lens having a large diameter.

Since the embodiment includes four separate coil units 120-1 to 120-4, in place of a single conventional AF coil, it is possible to increase the amount of electromagnetic force to be sufficient to perform an AF operation without changing the spring constant of the elastic member.

Furthermore, since the embodiment includes the bipolar magnetized magnets 130-1 to 130-4, it is possible to reduce magnetic field interference between the magnets of actuators mounted on a camera module having two or more cameras.

Furthermore, since the embodiment individually drives the four coil units 120-1 to 120-4 for AF operation, it is possible to tilt the AF operation unit in a direction opposite the direction in which the OIS operation unit is tilted. Consequently, the embodiment is able to compensate for tilting of the OIS operation unit, occurring during manufacture of the camera module, by controlling tilting of the AF operation unit, thus improving the performance of the image sensor of the camera module.

Although the first and second power signals GND and VDD, the data signal and the clock signal are supplied to the position sensor 1170 via the first to fourth upper elastic units 150-1 to 150-4 and the fifth to eighth terminals B5 to B8 of the circuit board 1190 and additional drive signals are supplied to the first to fourth coil units 120-1 to 120-4 from the position sensor 1170 via the first to fourth lower elastic members 1160-1 to 1160-4 and the first to fourth terminals B1 to B4 of the circuit board 1190 in the embodiment shown in FIGS. 18 to 27, the disclosure is not limited thereto.

In another embodiment (hereinafter, referred to as "CASE1"), the first and second power signals GND and VDD, the data signal and the clock signal may be supplied to the position sensor 1170 via the first to fourth lower elastic members and the first to fourth terminals B1 to B4 of the circuit board 1190, and additional drive signals may be supplied to the first to fourth coil units 120-1 to 120-4 from the position sensor 1170 via the first to fourth upper elastic units and the fifth to eighth terminals B5 to B8 of the circuit board 1190.

In another embodiment (CASE1), each of the first to fourth lower elastic units may be coupled to a corresponding one of the first to fourth terminals B1 to B4 of the circuit board 1190, the first to fourth lower elastic units may be conductively connected to the terminals of the circuit board 250, and the first to fourth lower elastic units may be provided with respective ones among the first and second power signals GND and VDD, the data signal and the clock signal via the terminals of the circuit board 250.

In another embodiment (CASE1), one end of each of the first to fourth coil units 120-1 to 120-4 may be coupled to a corresponding one of the first to fourth upper elastic units 150-1 to 150-4, and the other end of each of the first to fourth coil units 120-1 to 120-4 may be coupled to one of the first to fourth lower elastic units, to which the first power signal GND is supplied.

Figure 28:
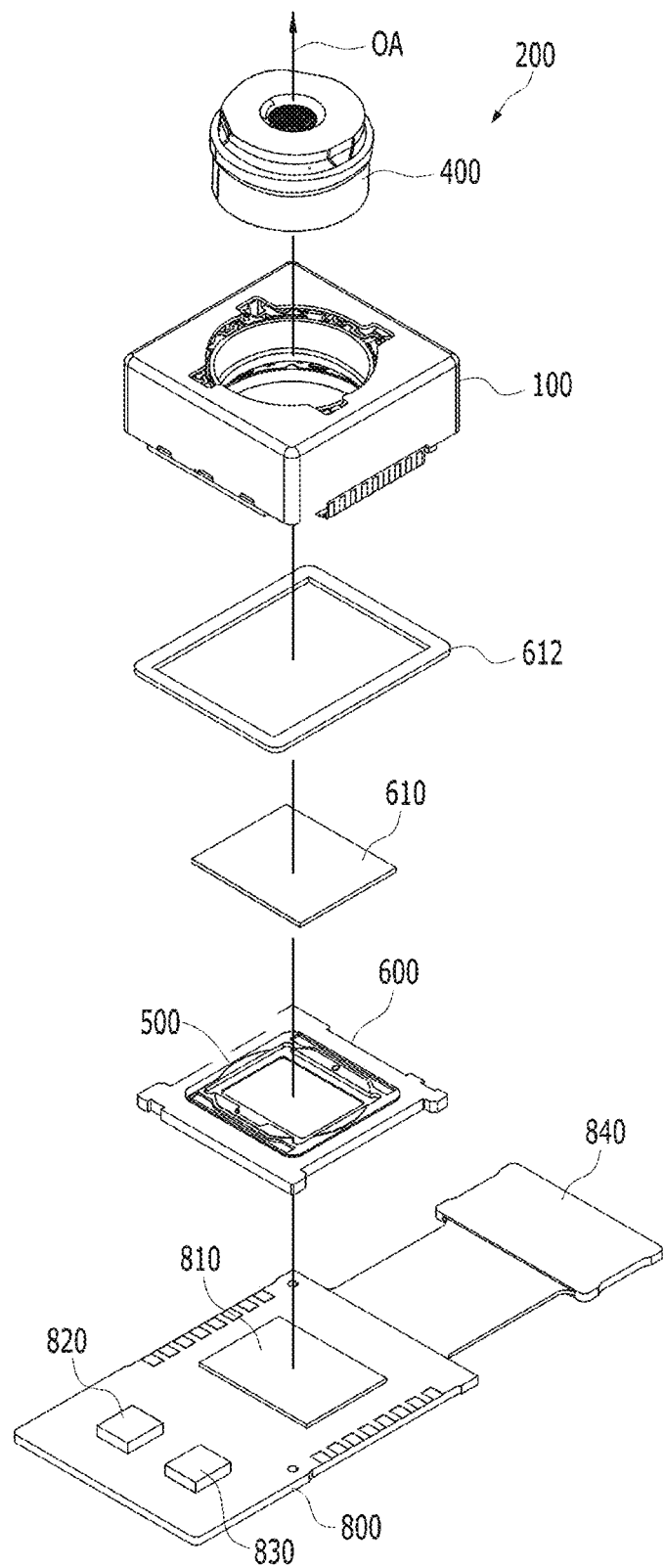
FIG. 28 is an exploded perspective view illustrating a camera module according to another embodiment.

FIG. 28 is an exploded perspective view illustrating a camera module 200 according to an embodiment.

Referring to FIG. 28, the camera module may include a lens barrel 400, the lens moving apparatus 100, an adhesive member 710, a filter 610, a first holder 600, a second holder 800, an image sensor 810, a motion sensor 820, a controller 830 and a connector 840.

The lens barrel 400 may be mounted in the bobbin 110 of the lens moving apparatus 100 or 1000. A camera module according to another embodiment may also include a lens moving apparatus 1100 shown in FIG. 18 in place of the lens moving apparatus 100.

The first holder 600 may be disposed under the base 210 of the lens moving apparatus 100. The filter 610 may be mounted on the first holder 600, and the first holder 600 may include a projection 500 on which the filter 610 is seated.

The adhesive member 612 may couple or attach the base 210 of the lens moving apparatus 100 to the first holder 600. In addition to the attachment function described above, the adhesive member 612 may serve to inhibit contaminants from entering the lens moving apparatus 100.

For example, the adhesive member 612 may be, for example, epoxy, thermohardening adhesive, or ultraviolet hardening adhesive.

The filter 610 may serve to inhibit light within a specific frequency band that passes through the lens barrel 400 from being introduced into the image sensor 810. The filter 610 may be, for example, an infrared-light-blocking filter, without being limited thereto. Here, the filter 610 may be oriented parallel to the X-Y plane.

The region of the first holder 600 in which the filter 610 is mounted may be provided with a bore in order to allow the light that passes through the filter 610 to be introduced into the image sensor 810.

The second holder 800 may be disposed under the first holder 600, and the image sensor 810 may be mounted on the second holder 800. The image sensor 810 may be the region, on which an image included in the light that passes through the filter 610 and is incident thereon is formed.

The second holder 800 may include, for example, various circuits, devices, and a controller in order to convert the image, formed on the image sensor 810, into electrical signals and to transmit the electrical signals to an external component.

The second holder 800 may be embodied as a circuit board on which the image sensor 810 may be mounted, on which a circuit pattern may be formed, and to which various devices may be coupled. The first holder 600 may be alternatively referred to as a "holder" or a "sensor base", and the second holder 800 may be alternatively referred to as a "board" or a "circuit board".

The image sensor 810 may receive an image included in the light introduced through the lens moving apparatus 100, and may convert the received image into an electrical signal.

The filter 610 and the image sensor 810 may be disposed so as to be spaced apart from each other in the state of facing each other in the first direction.

The motion sensor 820 may be mounted on the second holder 800, and may be conductively connected to the controller 830 through the circuit pattern formed on the second holder 800.

The motion sensor 820 may output information about a rotational angular speed caused by motion of the camera module 200. The motion sensor 820 may be embodied as a dual-axis or triple-axis gyro sensor or an angular speed sensor.

The controller 830 may be mounted on the second holder 800, and may be conductively connected to the second position sensor 240 of the lens moving apparatus 100 and the second coil 230. For example, the second holder 800 may be conductively connected to the circuit board 250 of the lens moving apparatus 100, and the controller 830 mounted on the second holder 800 may be conductively connected to the second position sensor 240 and the second coil 230 via the circuit board 250.

The controller 830 may transmit the clock signal SCL, the data signal SDA and the power signals VDD and GND for I2C communication with the first position sensor 120, and may receive the clock signal SCL and the data signal SDA from the first position sensor 170.

Furthermore, the controller 830 may control a drive signal capable of performing handshake correction for the OIS operation unit of the lens moving apparatus 100 based on the signals output from the second position sensor 240 of the lens moving apparatus 100.

The connector 840 may be conductively connected to the second holder 800, and may have therein a port that is intended to be conductively connected to an external device.

The lens moving apparatus 100 according to the embodiment may be included in an optical instrument, which is designed to form the image of an object in a space using reflection, refraction, absorption, interference, diffraction or the like, which are characteristics of light, to extend eyesight, to record an image obtained through a lens or to reproduce the image, to perform optical measurement, or to propagate or transmit an image. For example, although the optical instrument according to the embodiment may be a mobile phone, cellular phone, smart phone, portable smart instrument, digital camera, laptop computer, digital broadcasting terminal, PDA (Personal Digital Assistant), PMP (Portable Multimedia Player), navigation device, or the like, the disclosure is not limited thereto. Furthermore, any device capable of taking images or photographs is possible.

Figure 29:
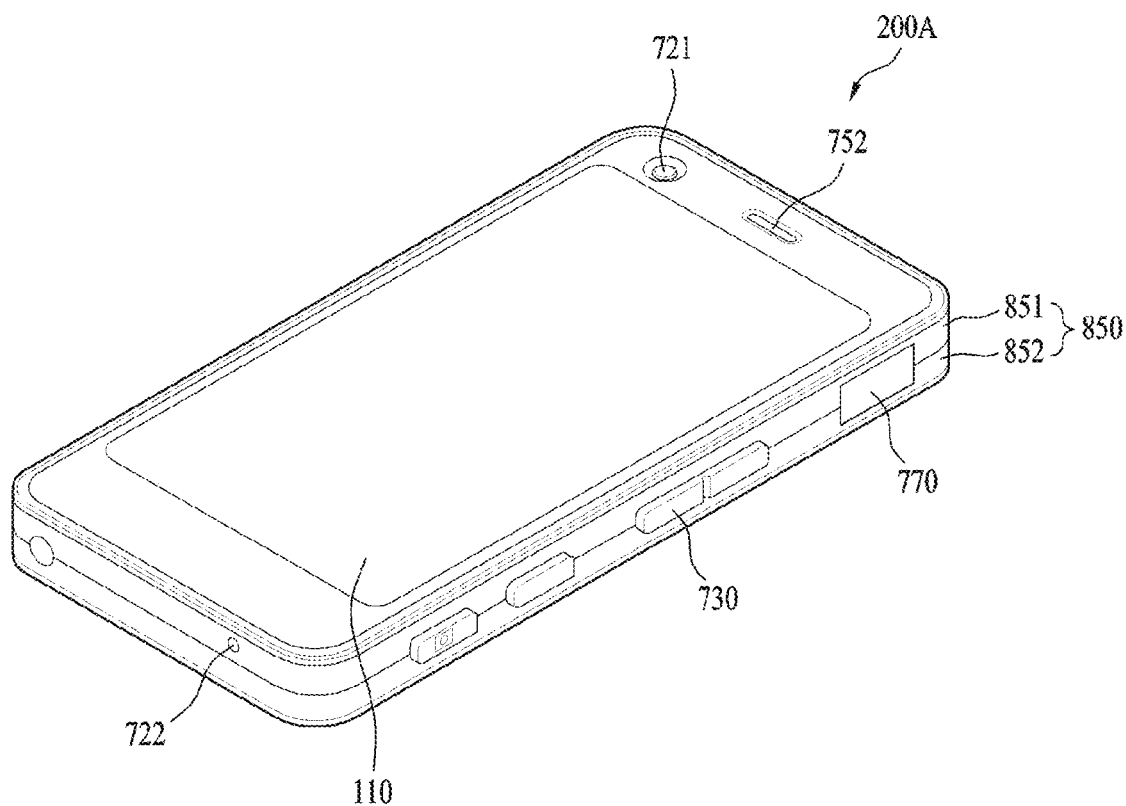
FIG. 29 is a perspective view of a portable terminal according to an embodiment.
Figure 30:
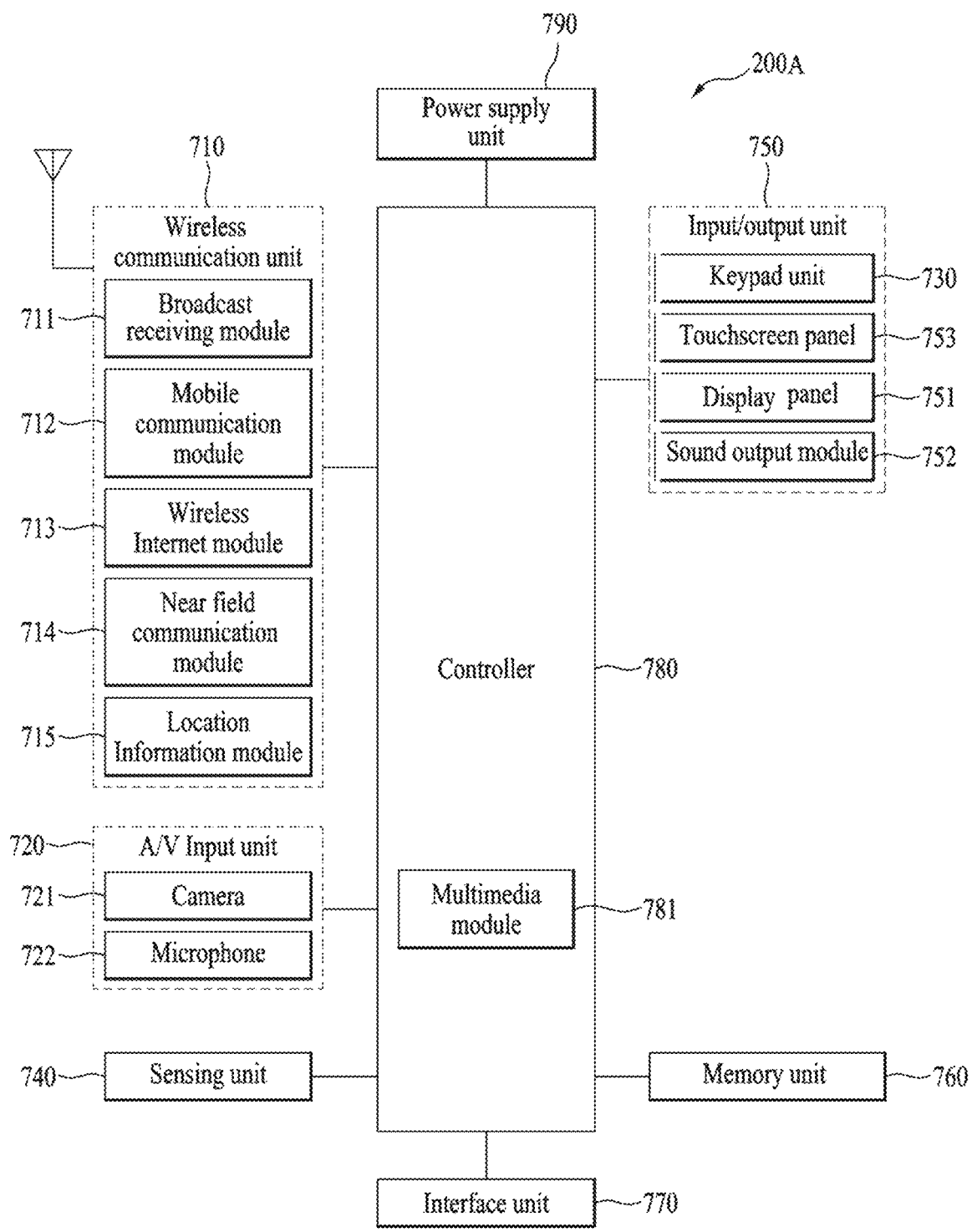
FIG. 30 is a view illustrating the configuration of the portable terminal illustrated in FIG. 29.

FIG. 29 is a perspective view illustrating a portable terminal 200A according to an embodiment. FIG. 30 is a view illustrating the configuration of the portable terminal illustrated in FIG. 29.

Referring to FIGS. 29 and 30, the portable terminal 200A (hereinafter referred to as a "terminal") may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 29 has a bar shape, without being limited thereto, and may be any of various types, such as, for example, a slide type, a folder type, a swing type, or a swivel type, in which two or more sub-bodies are coupled so as to be movable relative to each other.

The body 850 may include a case (a casing, housing, cover or the like) defining the external appearance of the terminal. For example, the body 850 may be divided into a front case 851 and a rear case 852. Various electronic components of the terminal may be accommodated in the space defined between the front case 851 and the rear case 852.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast-receiving module 711, a mobile communication module 712, a wireless Internet module 713, a nearfield communication module 714, and a location information module 715.

The A/V input unit 720 serves to input audio signals or video signals, and may include, for example, a camera 721 and a microphone 722.

The camera 721 may include the camera module 200 according to the embodiment.

The sensing unit 740 may sense the current state of the terminal 200A, such as, for example, the opening or closing of the terminal 200A, the location of the terminal 200A, the presence of a user's touch, the orientation of the terminal 200A, or the acceleration/deceleration of the terminal 200A, and may generate a sensing signal to control the operation of the terminal 200A. When the terminal 200A is, for example, a slide-type cellular phone, the sensing unit 740 may sense whether the slide-type cellular phone is opened or closed. Furthermore, the sensing unit 740 may sense the supply of power from the power supply unit 790, coupling of the interface unit 770 to an external device, and the like.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input on a keypad.

The display module 751 may include a plurality of pixels, the color of which varies depending on the electrical signals applied thereto. For example, the display module 751 may include at least one among a liquid crystal display, a thin-film transistor liquid crystal display, an organic light-emitting diode, a flexible display and a 3D display.

The sound output module 752 may output audio data received from the wireless communication unit 710 in, for example, a call-signal reception mode, a call mode, a recording mode, a voice recognition mode, or a broadcast reception mode, or may output audio data stored in the memory unit 760.

The touchscreen panel 753 may convert variation in capacitance, caused by a user's touch on a specific region of a touchscreen, into electrical input signals.

The memory unit 760 may temporarily store programs for the processing and control of the controller 780, and input/output data (for example, telephone numbers, messages, audio data, stationary images, moving images and the like). For example, the memory unit 760 may store images captured by the camera 721, for example, pictures or moving images.

The interface unit 770 serves as a path through which the lens moving apparatus is connected to an external device connected to the terminal 200A. The interface unit 770 may receive power or data from the external component, and may transmit the same to respective constituent elements inside the terminal 200A, or may transmit data inside the terminal 200A to the external component. For example, the interface unit 770 may include a wired/wireless headset port, an external charger port, a wired/wireless data port, a memory card port, a port for connection to a device equipped with an identification module, an audio input/output (I/O) port, a video input/output (I/O) port, an earphone port and the like.

The controller 780 may control the general operation of the terminal 200A. For example, the controller 780 may perform control and processing related to, for example, voice calls, data communication, and video calls.

The controller 780 may include a multimedia module 781 for multimedia playback. The multimedia module 781 may be embodied in the controller 780, or may be embodied separately from the controller 780.

The controller 780 may perform a pattern recognition process capable of recognizing writing input or drawing input carried out on a touch screen as a character and an image, respectively.

In place of the controller 780 of the camera module 200, the controller 780 of the optical device 200A may send a clock signal SCL, a data signal SDA and power signals VDD and GND for I2C communication with the first position sensor 170 and may receive the clock signal SCL and the data signal SDA from the first position sensor 170.

The power supply unit 790 may supply power required to operate the respective constituent elements upon receiving external power or internal power under the control of the controller 780.

The features, configurations, effects and the like described above in the embodiments are included in at least one embodiment, but the invention is not limited only to the embodiments. In addition, the features, configurations, effects and the like exemplified in the respective embodiments may be combined with other embodiments or modified by those skilled in the art. Accordingly, content related to these combinations and modifications should be construed as falling within the scope of the disclosure.

INDUSTRIAL APPLICABILITY

The embodiments are applicable to a lens moving apparatus and a camera module and an optical device each comprising the same, which are capable of reducing the amount of power consumed by the coil during AF operation, reducing magnetic field interference between the sensing magnet and the AF operation magnet, and compensating for tilting of the OIS operation unit caused by drooping of the OIS operation unit.

The invention claimed is:
1. A lens moving apparatus comprising:
a cover member;
a housing disposed in the cover member and comprising a first side portion, a second side portion disposed opposite to the first side portion, a third side portion disposed between the first and second side portions, and a fourth side portion disposed opposite to the third side portion;
a magnet comprising a plurality of magnet units disposed on the housing;
a bobbin disposed in the housing;
a first coil disposed on the bobbin and comprising a plurality of coil units facing the plurality of magnet units;
a first position sensor disposed in the cover member and configured to detect a displacement of the bobbin in an optical axis direction;
a sensing magnet disposed on the bobbin and facing the first position sensor; and
a balancing member disposed on the bobbin,
wherein the sensing magnet is disposed on a first surface of the bobbin corresponding to the first side portion of the housing, and the balancing member is disposed on a second surface of the bobbin corresponding to the second side portion of the housing,
wherein the bobbin is configured to move in the optical axis direction by an interaction between the magnet and the first coil,
wherein the plurality of coil units does not overlap with an imaginary line when viewed in the optical axis direction, and
wherein the imaginary line is perpendicular to the optical axis, and connects the optical axis, the sensing magnet and the balancing member.

2. The lens moving apparatus according to claim 1, wherein a lower surface of the first position sensor is lower than an upper surface of the coil, and a lower surface of the sensing magnet is higher than the lower surface of the first position sensor.

3. The lens moving apparatus according to claim 2, wherein an upper surface of the sensing magnet is higher than the lower surface of the first position sensor.

4. The lens moving apparatus according to claim 1, wherein at least one of the plurality of magnet units comprises:
a first magnet part comprising a first N pole and a first S pole;
a second magnet part comprising a second S pole and a second N pole and disposed under the first magnet part; and
a first partition wall disposed between the first magnet part and the second magnet part;
wherein the first magnet part and the second magnet part are spaced apart from each other in the optical-axis direction, and the third magnet part and the fourth magnet part are spaced apart from each other in the optical-axis direction.

5. The lens moving apparatus according to claim 1, wherein the first coil is a coil block, which is wound by itself about a reference line, or has a ring shape, the reference line being perpendicular to the optical axis and being in parallel to a direction toward an outer surface of the bobbin, at which the first coil is disposed, from the optical axis.

6. The lens moving apparatus according to claim 1, wherein the sensing magnet does not overlap the plurality of coil units in the optical-axis direction, and does not overlap the plurality of coil units in a direction in parallel to a line that is perpendicular to the optical axis and extends through the optical axis.

7. The lens moving apparatus according to claim 1, wherein the sensing magnet and the plurality of coil units overlap each other on a plane perpendicular to the optical axis.

8. The lens moving apparatus according to claim 1, comprising a first circuit board comprising terminals electrically connected to the first position sensor.

9. The lens moving apparatus according to claim 8, comprising:
an upper elastic member coupled to an upper portion of the bobbin and an upper portion of the bobbin; and
a support member coupled to the upper elastic member;
a second coil disposed to face the magnet in the optical-axis direction; and
a second circuit board electrically connected to the second coil,
wherein the housing is configured to move by an interaction between the magnet and the second coil.

10. The lens moving apparatus according to claim 9, comprising a base disposed under the second circuit board, and
wherein the second circuit board comprises an upper surface disposed on an upper surface of the base and at least one terminal member bent from the upper surface thereof.

11. The lens moving apparatus according to claim 9, wherein the upper elastic member comprises a first coupler coupled to the housing, a second coupler coupled to the support member, and a connector connecting the first coupler and the second coupler.

12. The lens moving apparatus according to claim 1, wherein the first position sensor comprises a Hall sensor and a driver.

13. The lens moving apparatus according to claim 1, wherein the first position sensor is configured to supply a drive signal to the first coil.

14. The lens moving apparatus according to claim 1, wherein the plurality of coil units are not disposed on the first and second side surfaces of the bobbin.

15. The lens moving apparatus according to claim 1, comprising:
a base disposed under a second circuit board, and
a second position sensor configured to detect a displacement of the housing in a direction perpendicular to the optical axis.

16. The lens moving apparatus according to claim 15, wherein the second position sensor comprises a first OIS sensor and a second OIS sensor, and
wherein the base comprise a first seating groove in which the first OIS sensor is disposed and a second seating groove in which the second OIS sensor is disposed.

17. A camera module comprising:
a lens;
the lens moving apparatus according to claim 1; and
an image sensor.

18. A lens moving apparatus comprising:
a cover member;
a housing disposed in the cover member and comprising a first side portion, a second side portion disposed opposite to the first side portion, a third side portion disposed between the first and second side portions, and a fourth side portion disposed opposite to the third side portion;
a magnet comprising a plurality of magnet units disposed on the housing;
a bobbin disposed in the housing;
a first coil comprising a plurality of coil units disposed on the bobbin and configured to move the bobbin in a first direction;
a position sensor disposed in the cover member and configured to detect a displacement of the bobbin in an optical axis direction;
a sensing magnet disposed on the bobbin so as to face the position sensor;
a balancing member disposed on the bobbin;
an upper elastic member coupled to an upper portion of the bobbin and an upper portion of the housing; and
a support member coupled to the upper elastic member and disposed at a corner portion of the housing,
wherein the sensing magnet is disposed on a first surface of the bobbin corresponding to the first side portion of the housing, and the balancing member is disposed on a second surface of the bobbin corresponding to the second side portion of the housing,
wherein the bobbin is configured to move in the optical axis direction by an interaction between the magnet and the first coil,
wherein the plurality of coil units does not overlap with an imaginary line when viewed in the optical axis direction, and
wherein the imaginary line is perpendicular to the optical axis, and connects the optical axis, the sensing magnet and the balancing member.

* * * * *